US012555776B2

(12) United States Patent
Liu et al.

(10) Patent No.: US 12,555,776 B2
(45) Date of Patent: Feb. 17, 2026

(54) ANODE MATERIALS FOR RECHARGEABLE LITHIUM-ION BATTERIES, AND METHODS OF MAKING AND USING THE SAME

(71) Applicant: Tyfast, San Diego, CA (US)

(72) Inventors: Haodong Liu, San Diego, CA (US); Ping Liu, San Diego, CA (US); Gerardo Jose La O', San Mateo, CA (US)

(73) Assignee: Tyfast Energy Corp., San Diego, CA (US)

( * ) Notice: Subject to any disclaimer, the term of this patent is extended or adjusted under 35 U.S.C. 154(b) by 852 days.

(21) Appl. No.: 17/877,239

(22) Filed: Jul. 29, 2022

(65) Prior Publication Data

US 2023/0120748 A1 Apr. 20, 2023

Related U.S. Application Data

(60) Provisional application No. 63/295,455, filed on Dec. 30, 2021, provisional application No. 63/255,953, filed on Oct. 14, 2021.

(51) Int. Cl.
*H01M 4/36* (2006.01)
*C01G 31/00* (2006.01)
(Continued)

(52) U.S. Cl.
CPC ............ *H01M 4/366* (2013.01); *C01G 31/02* (2013.01); *H01M 4/485* (2013.01); *H01M 4/525* (2013.01);
(Continued)

(58) Field of Classification Search
CPC ................. H01M 4/485; H01M 4/587; H01M 2004/021; H01M 4/625; H01M 4/366;
(Continued)

(56) References Cited

U.S. PATENT DOCUMENTS

| 8,133,617 B2 * | 3/2012 | Kozono | H01M 4/1391 |
| | | | 429/231.1 |
| 2003/0082446 A1 * | 5/2003 | Chiang | H01M 4/0404 |
| | | | 429/210 |

(Continued)

FOREIGN PATENT DOCUMENTS

| WO | 2018071856 A1 | 4/2018 | |
| WO | WO-2019204359 A1 * | 10/2019 | ........ H01M 10/0525 |
| WO | 2021079103 A1 | 4/2021 | |

OTHER PUBLICATIONS

Mario D. Ninago, Lithium Naphthalenides in non-polar or in low-polarity media: some insights regarding their use as initiators in anionic polymerizations, Polym. Bull, (2017), vol. 74, pp. 307-323 (Year: 2017).*

(Continued)

*Primary Examiner* — Niki Bakhtiari
*Assistant Examiner* — Ryan K. Blackwell-Rudasill
(74) *Attorney, Agent, or Firm* — O'Connor & Company; Ryan P. O'Connor

(57) ABSTRACT

A lithium-ion battery anode material containing surface-coated disordered rocksalt lithium vanadium oxide is disclosed. The surface coating contains a species selected from the group consisting of carbon, a metal oxide, a metalloid oxide, a metal fluoride, a metalloid fluoride, a metal phosphate, a metalloid phosphate, and combinations thereof. Materials, designs, synthesis methods, and devices related to fast-charging lithium-ion batteries are provided. This invention fills a technology gap by providing anode materials with disordered rocksalt lithium vanadium oxides to achieve fast charging in 10 minutes or less, greater than 200 W·h/kg energy density, a lifetime of at least 10,000 cycles, and improved battery safety. Methods of making and using the optionally surface-coated disordered rocksalt lithium vana- (Continued)

dium oxide are disclosed. Many experimental examples are included, demonstrating several remarkable attributes of this battery technology.

17 Claims, 32 Drawing Sheets

(51) Int. Cl.

| | | |
|---|---|---|
| *C01G 31/02* | (2006.01) | |
| *H01M 4/02* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 4/62* | (2006.01) | |
| *H01M 10/0525* | (2010.01) | |

(52) U.S. Cl.
CPC ............ *H01M 4/625* (2013.01); *C01G 31/00* (2013.01); *C01P 2002/76* (2013.01); *C01P 2004/03* (2013.01); *C01P 2004/61* (2013.01); *C01P 2004/62* (2013.01); *C01P 2004/64* (2013.01); *H01M 2004/021* (2013.01); *H01M 2004/027* (2013.01); *H01M 2004/028* (2013.01); *H01M 4/505* (2013.01); *H01M 4/5825* (2013.01); *H01M 10/0525* (2013.01); *Y02E 60/10* (2013.01)

(58) Field of Classification Search
CPC ...... H01M 4/483; H01M 4/505; H01M 4/525; H01M 4/5825; H01M 10/0525; H01M 2004/027; H01M 2004/028; C01G 31/00; C01G 31/006; C01P 2002/52; C01P 2004/61; C01P 2004/62
USPC ........................................................ 429/220
See application file for complete search history.

(56) References Cited

U.S. PATENT DOCUMENTS

| | | | |
|---|---|---|---|
| 2003/0124423 A1 | 7/2003 | Sasaki et al. | |
| 2008/0118840 A1* | 5/2008 | Yew | ...................... C01G 37/006 |
| | | | 429/231.95 |
| 2010/0112440 A1 | 5/2010 | Guyomard et al. | |
| 2018/0309093 A1* | 10/2018 | Amatucci | ............ H01M 50/119 |
| 2021/0184210 A1* | 6/2021 | Liu | ...................... C01G 31/006 |

OTHER PUBLICATIONS

Christian K. Christensen, Structrural Evolution of Disordered LixV2O5 Bronzes in V2O5 Cathodes for Li-Ion Batteries, Dec. 20, 2018, Chemistry of Materials, vol. 31, pp. 512-520 (Year: 2018).*
Entegris POCO Materials, Graphite Properties and Characteristics, 2020, p. 5 (Year: 2020).*
Haodong Liu, A disordered rock salt anode for fast-charging lithium-ion batteries, Sep. 2, 2020, Nature, vol. 585, pp. 63-67) (Year: 2020).*
Jing Xie, A retrospective on lithium-ion batteries, May 19, 2020, Nature Communications, pp. 1-3 (Year: 2020).*
Xi Zhang, Recent progress in rate and cycling performance modification of vanadium oxides cathode for lithium-ion batteries, Nov. 20, 2020, Journal of Energy Chemistry, vol. 21, pp. 343-363 (Year: 2020).*
International Search Report and Written Opinion, PCT/US2022/038979 dated Mar. 31, 2023.
Liu et al., "A disordered rock salt anode for fast-charging lithium-ion batteries", Nature, vol. 585, Sep. 3, 2020.
Clement et al., "Cation-disordered rocksalt transition metal oxides and oxyfluorides for high energy lithium-ion cathodes", Energy Environ. Sci., 2020, 13, 345.
Kie et al., "A retrospective on lithium-ion batteries", Nature Communications, 2020, 11:2499.
Mishra et al., "Electrode materials for lithium-ion batteries", Materials Science for Energy Technologies 1, 2018, 182-187.

* cited by examiner

ANODE MATERIALS FOR RECHARGEABLE LITHIUM-ION BATTERIES, AND METHODS OF MAKING AND USING THE SAME

PRIORITY DATA

This patent application claims priority to U.S. Provisional Patent App. No. 63/255,953, filed on Oct. 14, 2021, and U.S. Provisional Patent App. No. 63/295,455, filed on Dec. 30, 2021, each of which is hereby incorporated by reference herein.

FIELD

The present disclosure generally relates to lithium-ion batteries. More particularly, various embodiments relate to improved anode materials for lithium-ion batteries.

BACKGROUND

Rechargeable lithium-ion (Li-ion) batteries that can be safely charged and discharged at high rates are desirable for electrified transportation, portable electronics, grid storage, and other applications. Rechargeable Li-ion batteries have made mobile devices and personal computers an essential necessity in modern society. While important advancements in battery technology (e.g., energy density and structural stability) have continued, fast charging is an area that still requires significant advances for Li-ion batteries. Li-ion batteries may possess high energy density; however, the rate at which the battery can charge is limited by the anode material of the battery.

Graphite has so far been the dominant anode material for rechargeable lithium-ion batteries due to its low cost, high reversibility, and working potential close to lithium metal. These attributes have led to batteries with high specific energy and long cycle life. The current commercial high-energy-density Li-ion batteries based on graphite anodes achieve a high energy density greater than 250 W·h/kg. However, these Li-ion batteries require several hours to charge. Demand for ultrafast charging poses significant challenges for graphite. Under high charging rates, the anode potential in graphite can be driven to below the potential of lithium plating, leading to lithium deposition and the associated losses in lifetime and safety. Decreasing the battery charging time to minutes sacrifices energy and severely reduces cycle life for Li-ion batteries using graphite anodes.

Raising the anode potential slightly can overcome lithium plating. The state-of-the-art commercially available anode for ultra-fast-charge Li-ion batteries is lithium titanate, $Li_4Ti_5O_{12}$ (LTO). $Li_4Ti_5O_{12}$ is a generally safe material that can charge in less than 10 minutes for many cycles, but its energy density is less than 90 W·h/kg. $Li_4Ti_5O_{12}$ has a potential of about 1.5 V vs. $Li/Li^+$, which leads to a 2.5 V Li-ion battery when paired with a commercial 4 V cathode. The low energy density has limited the application of LTO primarily to buses and utility vehicles.

The potentials for other intercalation anodes, such as $LiV_{0.5}Ti_{0.5}S_2$, are around 1 V, still far higher than desired. Alloy anodes (e.g., anodes using aluminum alloys) can have ideal potentials of 0.5 V and large capacities, but their cycling stabilities remain questionable even under normal operating conditions—let alone for extremely fast charging. None of the state-of-the-art systems can achieve both high energy density combined with high power density, thus defining a technology gap.

There remains a need for improved anode materials for Li-ion batteries. What is especially desired is a Li-ion battery anode that can achieve fast charging in less than 10 minutes, has at least 200 W·h/kg energy density, is capable of operating for at least 20,000 cycles, and does not compromise the safety of the battery.

SUMMARY

The present disclosure addresses the aforementioned needs in the art, as will now be summarized and then further described in detail below.

Some variations provide an anode material comprising a plurality of anode-material particles, wherein the anode-material particles comprise an internal phase containing lithium vanadium oxide and a surface coating disposed on external surfaces of the internal phase, wherein the lithium vanadium oxide has a composition given by $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated, and wherein the surface coating contains a species selected from the group consisting of carbon, a metal oxide, a metalloid oxide, a metal fluoride, a metalloid fluoride, a metal phosphate, a metalloid phosphate, and combinations thereof.

In some embodiments, the surface coating contains carbon. The carbon may be predominantly in sp form, predominantly in $sp^2$ form, or predominantly in $sp^3$ form, in various embodiments. In some embodiments, the carbon is a combination of sp carbon and $sp^2$ carbon, a combination of sp carbon and $sp^3$ carbon, a combination of $sp^2$ carbon and $sp^3$ carbon, or a combination of sp carbon, $sp^2$ carbon, and $sp^3$ carbon.

When the surface coating contains carbon, the carbon may be in the form of graphene, graphite, carbon nanotubes, carbon fibers, ultrafine carbon, carbon black, nanodiamonds, hard carbon, soft carbon, or a combination thereof.

In some embodiments, the surface coating has an average coating thickness selected from about 0.1 nanometers to about 100 nanometers.

In some embodiments, the anode-material particles have a shape selected from the group consisting of spherical, columnar, cubic, irregular, and combinations thereof. The anode-material particles may have an average effective diameter selected from about 0.01 microns to about 100 microns, for example.

In some embodiments, the surface coating is a dense, non-porous coating. In other embodiments, the surface coating is a porous coating. The surface coating may have an average porosity selected from about 1% to about 95%, for example.

In some embodiments, the anode material is characterized in that it is chemically stable in the presence of air. In these or other embodiments, the anode material is characterized in that it is chemically stable in the presence of water.

In some embodiments, the $Li_aV_bO_c$ is crystalline. Preferably, at least 10 wt % of the $Li_aV_bO_c$ has a disordered rocksalt structure in the $Fm\bar{3}m$ space group. More preferably, at least 50 wt % of the $Li_aV_bO_c$ has a disordered rocksalt structure in the $Fm\bar{3}m$ space group. Even more preferably, at least 90 wt % of the $Li_aV_bO_c$ has a disordered rocksalt structure in the $Fm\bar{3}m$ space group. Most preferably, essentially all of the $Li_aV_bO_c$ has a disordered rocksalt structure in the $Fm\bar{3}m$ space group.

The $Li_aV_bO_c$ may be selected from the group consisting of $Li_3V_2O_5$, $Li_4V_2O_5$, $Li_5V_2O_5$, $LiV_2O_5$, $Li_{0.001}V_2O_5$, $Li_2V_2O_5$, $Li_{0.001}VO_2$, $LiVO_2$, $Li_2VO_2$, $Li_{0.001}VO_3$, $LiVO_3$, $Li_2VO_3$, $Li_3VO_3$, $Li_{0.001}V_3O_8$, $LiV_3O_8$, $Li_2V_3O_8$, $Li_3V_3O_8$, $Li_{0.001}V_2O_3$, $LiV_2O_3$, $Li_2V_2O_3$, $Li_3V_2O_3$, and combinations thereof.

In some embodiments, the lithium vanadium oxide further contains a dopant M that is chemically or physically contained within the lithium vanadium oxide such that its composition is given by $Li_aV_bO_cM_d$, wherein d=0.001-3, wherein a, b, c, and d are selected to charge-balance the $Li_aV_bO_cM_d$, and wherein the $Li_aV_bO_cM_d$ is capable of being reversibly lithiated. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. Preferably, when the lithium vanadium oxide further contains a dopant M, from about 10 wt % to 100 wt % of the $Li_aV_bO_c$ has a disordered rocksalt structure in the $Fm\overline{3}m$ space group. In some embodiments, from about 10 wt % to 100 wt % of the $Li_aV_bO_cM_d$ has a disordered rocksalt structure in the $Fm\overline{3}m$ space group In some embodiments, the anode material further comprises one or more additional anode-material components selected from the group consisting of silicon, silicon oxides, tin, tin oxides, phosphorus, carbonaceous species, and combinations thereof, and wherein the carbonaceous species is distinct from the carbon, if any, contained in the surface coating. The carbonaceous species may be graphite, non-graphitized carbon, or a combination thereof.

The anode material may have a density of about 1.5 g/cm³ to about 4.5 g/cm³, for example. The anode material may have an anode-material volumetric porosity selected from about 5% to about 80%, for example.

In preferred embodiments, the $Li_aV_bO_c$ is characterized in that during one lithiation-delithiation cycle, the $Li_aV_bO_c$ undergoes a volume change from about 0% to about 20%. Preferably, the volume change of the $Li_aV_bO_c$ during the lithiation-delithiation cycle is from about 0% to about 10%, and more preferably from about 0% to about 5%.

Some variations of the invention provide an anode comprising the disclosed anode material.

The anode may further comprise one or more additional anode components selected from the group consisting of silicon, silicon oxides, tin, tin oxides, phosphorus, carbonaceous species, and combinations thereof, wherein the carbonaceous species is distinct from the carbon, if any, contained in the surface coating. The additional anode components may collectively range in total concentration from about 0.25 wt % to about 80 wt % of the anode, for example.

When the anode comprises a carbonaceous species, the carbonaceous species may be graphite, non-graphitized carbon, or a combination thereof.

In some embodiments, the anode further contains one or more binders. The binders may be aqueous-based binders selected from the group consisting of carboxymethyl cellulose, styrene-butadiene rubber, styrene-butadiene copolymer, polyacrylic acid, lithium-substituted polyacrylic acid, and combinations thereof, for example. Alternatively, or additionally, the binders may be non-aqueous-based binders selected from the group consisting of polyvinylidene fluoride, poly(vinylidenefluoride-co-hexafluoropropylene), and combinations thereof, for example. The binders may range in concentration from about 0.25 wt % to about 50 wt % of the anode, for example.

In some embodiments, the anode has a volumetric anode porosity selected from about 5% to about 80%.

In some embodiments, the anode has an average anode thickness from about 200 nanometers to about 500 microns.

The anode may be present in a cell. In a typical cell, there is a plurality of anode layers, a plurality of cathode layers, a plurality of separator layers each disposed between individual anode and cathode layers, and a packet foil surrounding the multilayer sub-structure (i.e., the plurality of anode layers, the plurality of separator layers, and the plurality of cathode layers). Each separator layer is configured to electrically separate an anode layer from a cathode layer. The anode may be disposed on a first substrate (e.g., copper foil), and the cathode may be disposed on a second substrate (e.g., aluminum foil). There are typically many layers of anode, first substrate, separator, cathode, and second substrate, in a layered cell configuration.

In some embodiments, the anode has an anode material loading selected from about 20 wt % to about 100 wt %. In some embodiments, the anode has an anode material areal loading selected from about 0.2 mg/cm² to about 50 mg/cm² on at least one side of the anode. In some embodiments, the anode has an anode material areal capacity selected from about 0.05 mA·h/cm² to about 10 mA·h/cm² on at least one side of the anode.

The cathode may comprise a cathode material selected from the group consisting of $LiFePO_4$; $LiMn_2O_4$; $LiNi_{0.5}Mn_{1.5}O_4$; $LiNi_xCo_yMn_zO_2$, wherein x+y+z=1; $LiCoO_2$; $LiNi_xCo_yAl_zO_2$, wherein x+y+z=1; $LiFe_xMn_yPO_4$, wherein x+y=1; $aLiNi_xCo_yMn_zO_2 \cdot (1-a)Li_2MnO_3$, wherein a=0-1 and x+y+z=1; and combinations thereof.

In some embodiments, the cell further contains an electrolyte. The electrolyte may be selected from liquid electrolytes, polymer gel electrolytes, solid electrolytes, or a combination thereof.

Other variations of the invention provide a method of synthesizing an anode material, the method comprising:

(a) applying a reducing agent to a precursor material, wherein the reducing agent comprises lithium, and wherein the precursor material comprises vanadium oxide, lithium vanadium oxide, or a combination thereof, thereby generating a reduced material;

(b) introducing a surface coating onto the reduced material, after step (a) and/or during step (a), wherein the surface coating contains a species selected from the group consisting of carbon, a metal oxide, a metalloid oxide, a metal fluoride, a metalloid fluoride, a metal phosphate, a metalloid phosphate, and combinations thereof; and (c) recovering an anode material comprising a plurality of anode-material particles, wherein the anode-material particles comprise an internal phase containing lithium vanadium oxide and the surface coating disposed on external surfaces of the internal phase, wherein the lithium vanadium oxide has a composition given by $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated.

In some methods, at least 10 wt % of the $Li_aV_bO_c$ has a disordered rocksalt structure in the $Fm\overline{3}m$ space group. Preferably, at least 50 wt %, at least 90%, or essentially all of the $Li_aV_bO_c$ has a disordered rocksalt structure in the $Fm\overline{3}m$ space group.

In some methods, the precursor material comprises $V_2O_5$, $LiV_2O_5$, $Li_2V_2O_5$, or a combination thereof.

In some methods, the reducing agent is selected from the group consisting of butyl lithium ($LiC_4H_9$), lithium naphthalene ($LiC_{10}H_8$), lithium anthracenide ($LiC_{14}H_9$), and combinations thereof. In certain embodiments, the reducing agent is lithium naphthalene prepared by dissolving the lithium into a solution containing naphthalene and a solvent, wherein the solvent is selected from the group consisting of tetrahydrofuran, 1,2-dimethoxyethane, dimethyl carbonate, and combinations thereof.

In some methods, the precursor material further comprises a dopant M. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

In some methods, the $Li_aV_bO_c$ is characterized in that during one lithiation-delithiation cycle, the $Li_aV_bO_c$ undergoes a volume change from about 0% to about 20%, such as from about 0% to about 10%, or from about 0% to about 5%.

Some methods further comprise:
dissolving the precursor material (e.g., using $H_2O_2$) to form a sol-gel;
mixing a precursor of the surface coating with the sol-gel to form a homogeneous mixture;
drying the homogeneous mixture, thereby forming a dried powder; and
calcining the dried powder in air, wherein the precursor of the surface coating is converted into the surface coating; and
recovering the anode-material particles.

When the surface coating in step (b) contains carbon, the carbon may be in sp form, $sp^2$ form, and/or $sp^a$ form. The carbon may be in the form of graphene, graphite, carbon nanotubes, carbon fibers, ultrafine carbon, carbon black, nanodiamonds, hard carbon, soft carbon, or a combination thereof.

In some methods, the precursor material has a precursor-material shape selected from the group consisting of spherical, columnar, cubic, irregular, and combinations thereof.

In some methods, the precursor material has an average effective diameter selected from about 0.1 microns to about 100 microns. The precursor material may have a bimodal particle-size distribution.

In some methods, the precursor material is $V_2O_5$. The $V_2O_5$ may be present in the precursor material in a purity range from about 90 wt % to about 100 wt %, for example.

The surface coating may have an average coating thickness selected from about 0.1 nanometers to about 100 nanometers, for example. The surface coating may have an average porosity selected from 0% to about 95%, for example.

The anode material may have an anode-material volumetric porosity selected from about 5% to about 80%, for example.

The method may further comprise introducing, to the anode material, one or more additional components optionally selected from the group consisting of silicon, silicon oxides, tin, tin oxides, phosphorus, carbonaceous species, and combinations thereof, and wherein the carbonaceous species is distinct from the carbon, if any, contained in the surface coating.

The method may further comprise introducing, to the anode, one or more binders optionally selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods, a cathode material is cast on multiple layers of a second substrate to form a plurality of cathode layers. Separator layers are disposed on each of the plurality of anode layers, and each of the cathode layers is stacked on a separator layer. A packet foil is configured to surround the plurality of anode layers, the plurality of separator layers, and the plurality of cathode layers to form a cell.

In some methods, the lithiated anode has an anode material loading selected from about 20 wt % to about 100 wt %. In some methods, the lithiated anode has an anode material areal loading selected from about 0.2 $mg/cm^2$ to about 50 $mg/cm^2$ on at least one side of the lithiated anode. In some methods, the lithiated anode has an anode material areal capacity selected from about 0.05 $mA·h/cm^2$ to about 10 $mA·h/cm^2$ on at least one side of the lithiated anode.

The method may further comprise, following step (c), lithiating and delithiating the $Li_aV_bO_c$ in a lithiation-delithiation cycle. In that lithiation-delithiation cycle, the $Li_aV_bO_c$ preferably undergoes a volume change from about 0% to about 20%, more preferably from about 0% to about 10%, and most preferably from about 0% to about 5%, during the lithiation-delithiation cycle.

Still other variations of the invention provide a method of manufacturing a cell, the method comprising:
(a) casting an anode material on a first substrate to form an anode, wherein the anode material comprises a plurality of anode-material particles, wherein the anode-material particles comprise an internal phase containing lithium vanadium oxide and an optional surface coating disposed on external surfaces of the internal phase, wherein the lithium vanadium oxide has a composition given by $Li_xV_yO_z$, wherein x=0-10, y=1-3, z=1-9, and x, y, and z are selected to charge-balance the $Li_xV_yO_z$;
(b) applying a reducing agent to the anode material, wherein the reducing agent comprises lithium, thereby generating a lithiated anode material comprising $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated;
(c) optionally, removing excess reducing agent, if any, from the lithiated anode material;
(d) casting a cathode material onto a second substrate, to form a cathode;
(e) stacking a separator onto the anode;
(f) stacking the cathode onto the separator; and
(g) surrounding multiple layers of the anode, multiple layers of the separator, and multiple layers of the cathode with a packet foil, to form a cell.

In some methods of manufacturing a cell, the $Li_xV_yO_z$ is selected from the group consisting of $V_2O_5$, $Li_{0.001}V_2O_5$, $LiV_2O_5$, $Li_2V_2O_5$, $Li_3V_2O_5$, $Li_4V_2O_5$, $Li_5V_2O_5$, and combinations thereof.

In some methods of manufacturing a cell, at least 10 wt % of the $Li_aV_bO_c$ has a disordered rocksalt structure in the Fm$\bar{3}$m space group. Preferably, at least 50 wt %, at least 90%, or essentially all of the $Li_aV_bO_c$ has a disordered rocksalt structure in the Fm$\bar{3}$m space group.

In some methods of manufacturing a cell, the surface coating is present and is disposed on external surfaces of the internal phase, wherein the surface coating contains a species selected from the group consisting of carbon, a metal oxide, a metalloid oxide, a metal fluoride, a metalloid fluoride, a metal phosphate, a metalloid phosphate, and combinations thereof.

When the surface coating is present and contains carbon, the carbon may be in sp form, $sp^2$ form, and/or $sp^a$ form. Exemplary forms of carbon include graphene, graphite, carbon nanotubes, carbon fibers, ultrafine carbon, carbon black, nanodiamonds, hard carbon, soft carbon, or a combination thereof.

In some methods of manufacturing a cell, the anode material further comprises a dopant M, wherein the dopant M is optionally selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

The method of manufacturing a cell may further comprise introducing, to the anode material, one or more additional components selected from the group consisting of silicon, silicon oxides, tin, tin oxides, phosphorus, carbonaceous species, and combinations thereof, and wherein the carbonaceous species is distinct from the carbon, if any, contained in the surface coating, if present.

The method of manufacturing a cell may further comprise introducing, to the anode, one or more binders selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods of manufacturing a cell, the $Li_aV_bO_c$ is characterized in that during one lithiation-delithiation cycle, the $Li_aV_bO_c$ undergoes a volume change from about 0% to about 20%, preferably from about 0% to about 10%, and more preferably from about 0% to about 5%.

In some methods of manufacturing a cell, the anode has an anode material loading selected from about 20 wt % to about 100 wt %.

In some methods of manufacturing a cell, the anode has an anode material areal loading selected from about 0.2 mg/cm$^2$ to about 50 mg/cm$^2$ on at least one side of the anode.

In some methods of manufacturing a cell, the anode has an anode material areal capacity selected from about 0.05 mA·h/cm$^2$ to about 10 mA·h/cm$^2$ on at least one side of the anode.

The method of manufacturing a cell may further comprise injecting an electrolyte into the cell.

In some methods of manufacturing a cell, the first substrate is a copper foil with a thickness from about 1 micron to about 100 microns, for example. The second substrate may be an aluminum foil with a thickness from about 1 micron to about 100 microns, for example.

Yet other variations of the invention provide a method of manufacturing a cell, the method comprising:

(a) casting an anode material on a first substrate to form an anode, wherein the anode material comprises a plurality of anode-material particles, wherein the anode-material particles comprise an internal phase containing $Li_xV_yO_z$, wherein x=0-10, y=1-3, z=1-9, and x, y, and z are selected to charge-balance the $Li_xV_yO_z$, and wherein an optional surface coating is disposed on external surfaces of the internal phase;

(b) pressing lithium onto the anode, to form a pressed anode;

(c) casting a cathode material onto a second substrate, to form a cathode;

(d) stacking a separator onto the pressed anode;

(e) stacking the cathode onto the separator;

(f) surrounding multiple layers of the anode, multiple layers of the separator, and multiple layers of the cathode with a packet foil, to form a cell;

(g) injecting an electrolyte into the cell; and (h) converting the pressed anode into a lithiated anode comprising $Li_aV_bO_c$, wherein a=0.001-10, b=1-3, c=1-9, and a, b, and c are selected to charge-balance said $Li_aV_bO_c$, wherein said $Li_aV_bO_c$ is capable of being reversibly lithiated.

In some methods of manufacturing a cell, the $Li_xV_yO_z$ is selected from the group consisting of $V_2O_5$, $Li_{0.001}V_2O_5$, $LiV_2O_5$, $Li_2V_2O_5$, $Li_3V_2O_5$, $Li_4V_2O_5$, $Li_5V_2O_5$, and combinations thereof. The $Li_xV_yO_z$ may be present in the internal phase in an internal-phase purity range from about 90 wt % to about 100 wt %, for example.

In some methods of manufacturing a cell, the anode-material particles have an anode-material shape selected from the group consisting of spherical, columnar, cubic, irregular, and combinations thereof.

In some methods of manufacturing a cell, at least 10 wt % of the $Li_aV_bO_c$, formed in step (g), has a disordered rocksalt structure in the Fm$\bar{3}$m space group. Preferably, at least 50 wt %, at least 90 wt %, or essentially all of the $Li_aV_bO_c$ has a disordered rocksalt structure in the Fm$\bar{3}$m space group.

In some methods of manufacturing a cell, the surface coating is present and is disposed on external surfaces of the internal phase. The surface coating may contain a species selected from the group consisting of carbon, a metal oxide, a metalloid oxide, a metal fluoride, a metalloid fluoride, a metal phosphate, a metalloid phosphate, and combinations thereof.

When the surface coating is present and contains carbon, the carbon may be in sp form, sp$^2$ form, and/or sp$^a$ form. Exemplary forms of carbon include graphene, graphite, carbon nanotubes, carbon fibers, ultrafine carbon, carbon black, nanodiamonds, hard carbon, soft carbon, or a combination thereof.

In some methods of manufacturing a cell, the anode material further comprises a dopant M, and wherein the dopant M is optionally selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

Some methods of manufacturing a cell further comprise introducing, to the anode material, one or more additional components selected from the group consisting of silicon, silicon oxides, tin, tin oxides, phosphorus, carbonaceous species, and combinations thereof, and wherein the carbonaceous species is distinct from the carbon, if any, contained in the surface coating, if present.

Some methods of manufacturing a cell further comprise introducing, to the anode, one or more binders selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods of manufacturing a cell, the $Li_aV_bO_c$ is characterized in that during one lithiation-delithiation cycle, the $Li_aV_bO_c$ undergoes a volume change from about 0% to about 20%, preferably from about 0% to about 10%, and more preferably from about 0% to about 5%.

In some methods of manufacturing a cell, the anode has an anode material loading selected from about 20 wt % to about 100 wt %, an anode material areal loading selected from about 0.2 mg/cm$^2$ to about 50 mg/cm$^2$ on at least one side of the anode, and an anode material areal capacity selected from about 0.05 mA·h/cm$^2$ to about 10 mA·h/cm$^2$ on at least one side of the anode.

In some methods of manufacturing a cell, the first substrate is a copper foil with a thickness from about 1 micron to about 100 microns, for example. The second substrate may be an aluminum foil with a thickness from about 1 micron to about 100 microns, for example.

In some methods of manufacturing a cell, step (b) does not utilize a solvent to form the pressed anode.

In some methods of manufacturing a cell, steps (f) and (g) are conducted simultaneously rather than sequentially.

DETAILED DESCRIPTION OF EMBODIMENTS

Figure 1:
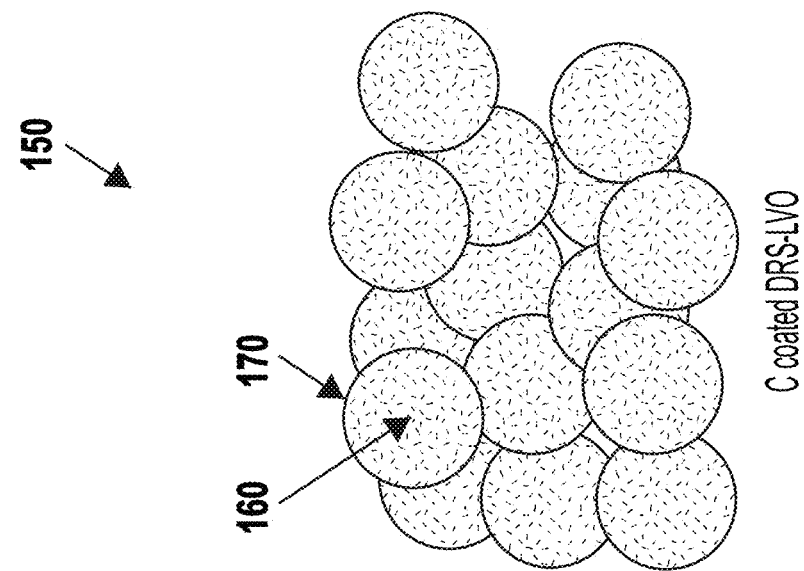
FIG. 1 is a schematic illustration of carbon-coated $V_2O_5$ and carbon-coated disordered rocksalt lithium vanadium oxide (DRS-LVO), in some embodiments of the invention.
Figure 1:
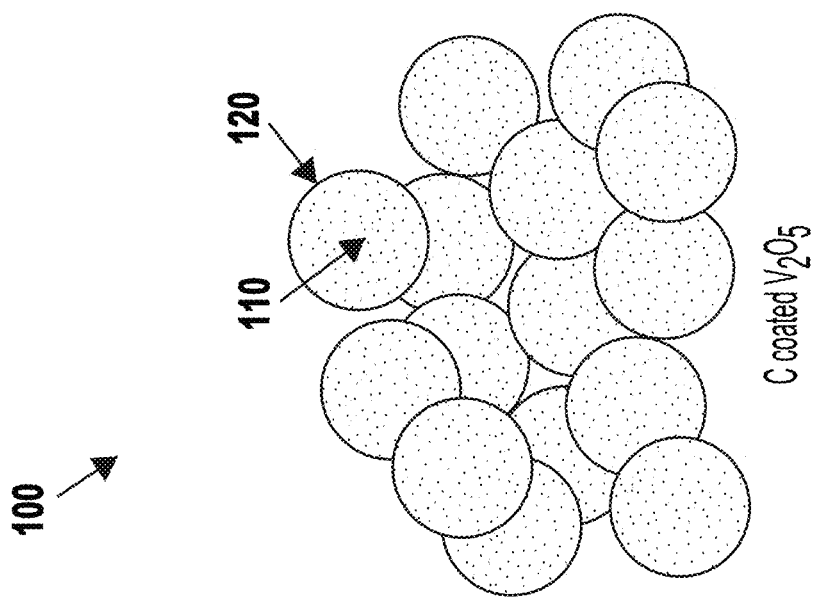

The principles, compositions, materials, systems, and methods of the present disclosure will be described in detail by reference to various non-limiting embodiments of the technology.

This description will enable one skilled in the art to make and use the technology, and it describes several embodiments, adaptations, variations, alternatives, and uses of the technology. These and other embodiments, features, and advantages of the present technology will become more apparent to those skilled in the art when taken with reference to the following detailed description in conjunction with the accompanying drawings.

Unless defined otherwise, all technical and scientific terms used herein have the same meaning as is commonly understood by one of ordinary skill in the art to which this technology belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising" (synonymously, "including"), "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of" The term "including" should be read as meaning "including, without limitation" or the like; the term "example" is used to provide exemplary instances of the item in discussion, not an exhaustive or limiting list thereof.

Adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this patent application refers to technologies that would be apparent or known to one of ordinary skill in the art, such technologies encompass those apparent or known to the skilled artisan now or at any time in the future.

As used in this specification and the appended claims, the singular forms "a," "an," and "the" include plural referents unless the context clearly indicates otherwise. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Materials, designs, synthesis methods, and devices related to fast-charging lithium-ion batteries are provided in this disclosure. The fast-charging Li-ion battery may include an anode, a cathode, an electrolyte, a separator, and a packet foil. The Li-ion batteries may be able to charge on the scale of minutes instead of hours. The battery may be one or more of a pouch-type cell, cylinder cell, button cell, prismatic cell, or other battery types.

This invention, in some variations, fills a technology gap by providing anode materials with disordered rocksalt lithium vanadium oxides to achieve fast charging in 10 minutes or less, greater than 200 W·h/kg energy density, a lifetime of at least 10,000 cycles, and improved battery safety.

In some embodiments, $Li_3V_2O_5$ having an disordered rocksalt structure may be introduced as an anode material that is capable of reversibly inserting two lithium atoms into the $Li_3V_2O_5$ to form $Li_5V_2O_5$. In some embodiments, the anode material works at a voltage at about 0.6 V. In some embodiments, the anode material, during use, undergoes little or no lithium plating, allows fast charging, and provides a lithium-ion battery with a cell voltage about 1 V higher compared to a $Li_4Ti_5O_{12}$ conventional anode.

Some variations provide an anode material comprising a plurality of anode-material particles, wherein the anode-material particles comprise an internal phase containing lithium vanadium oxide and a surface coating disposed on external surfaces of the internal phase, wherein the lithium vanadium oxide has a composition given by $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated, and wherein the surface coating contains a species selected from the group consisting of carbon, a metal oxide, a metalloid oxide, a metal fluoride, a metalloid fluoride, a metal phosphate, a metalloid phosphate, and combinations thereof.

Non-integer values of a, b, and c are possible, as long as the $Li_aV_bO_c$ is charge-balanced. In some embodiments of $Li_aV_bO_c$, a=0.001-5. In various embodiments of $Li_aV_bO_c$, a is about, at least about, or at most about 0.001, 0.002, 0.005, 0.01, 0.02, 0.03, 0.04, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 2.95, 3.0, 3.05, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, 8.0, 8.5, 9.0, 9.5, or 10.0, including any intervening ranges.

In some embodiments of $Li_aV_bO_c$, b=1.5-2.5. In various embodiments of $Li_aV_bO_c$, b is about, at least about, or at most about 1.0, 1.1, 1.2, 1.3, 1.4, 1.5, 1.6, 1.7, 1.8, 1.9, 1.95, 2.0, 2.05, 2.1, 2.2, 2.3, 2.4, 2.5, 2.6, 2.7, 2.8, 2.9, or 3.0, including any intervening ranges.

In some embodiments of $Li_aV_bO_c$, c=3-7. In various embodiments of $Li_aV_bO_c$, c is about, at least about, or at most about 1.0, 1.5, 2.0, 2.5, 3.0, 3.5, 4.0, 4.5, 4.6, 4.7, 4.8, 4.9, 4.95, 5.0, 5.05, 5.1, 5.2, 5.3, 5.4, 5.5, 6.0, 6.5, 7.0, 7.5, 8.0, 8.5, or 9.0, including any intervening ranges.

A surface coating may be used to enhance the electrical conductivity of the $Li_aV_bO_c$, to improve the interfacial stability of the $Li_aV_bO_c$, to reduce electrolyte penetration into the $Li_aV_bO_c$, and/or for other purposes.

In some embodiments, the surface coating contains carbon. The carbon may be predominantly in sp form, predominantly in $sp^2$ form, or predominantly in $sp^3$ form, in various embodiments. In some embodiments, the carbon is a combination of sp carbon and $sp^2$ carbon, a combination of sp carbon and $sp^3$ carbon, a combination of $sp^2$ carbon and $sp^3$ carbon, or a combination of sp carbon, $sp^2$ carbon, and $sp^3$ carbon.

In some embodiments, the surface coating contains a metal oxide and/or a metalloid oxide. Exemplary oxides include, but are not limited to, $TiO_2$, ZnO, $Al_2O_3$, $B_2O_3$, $SiO_2$, MgO, $Y_2O_3$, $ZrO_2$, $WO_3$, or combinations thereof. In this disclosure, metalloids include B, Si, Ge, As, Sb, Te, and Po.

In some embodiments, the surface coating contains a metal fluoride and/or a metalloid fluoride. Exemplary fluorides include, but are not limited to, $MgF_2$, $AlF_3$, $ZnF_2$, LiF, $SiF_4$, or combinations thereof.

In some embodiments, the surface coating contains a metal phosphate and/or a metalloid phosphate. Exemplary phosphates include, but are not limited to, $(Mg)_3(PO_4)_2$, $AlPO_4$, $Li_3PO_4$, $Si_3(PO_4)_4$, or combinations thereof.

In some embodiments, the surface coating contains (a) carbon and (b) a metal oxide and/or a metalloid oxide. In some embodiments, the surface coating contains (a) carbon and (b) a metal fluoride and/or a metalloid fluoride. In some embodiments, the surface coating contains (a) carbon and (b) a metal phosphate and/or a metalloid phosphate. In some embodiments, the surface coating contains (a) a metal oxide and/or a metalloid oxide and (b) a metal fluoride and/or a metalloid fluoride. In some embodiments, the surface coating contains (a) a metal oxide and/or a metalloid oxide and (b) a metal phosphate and/or a metalloid phosphate. In some embodiments, the coating contains (a) a metal fluoride and/or a metalloid fluoride and (b) a metal phosphate and/or a metalloid phosphate. In certain embodiments, the surface coating contains three of (a) carbon, (b) a metal oxide and/or a metalloid oxide, (c) a metal fluoride and/or a metalloid fluoride, and (d) a metal phosphate and/or a metalloid phosphate. In certain embodiments, the surface coating contains all of (a) carbon, (b) a metal oxide and/or a metalloid oxide, (c) a metal fluoride and/or a metalloid fluoride, and (d) a metal phosphate and/or a metalloid phosphate.

When the surface coating contains carbon, the carbon may be in the form of graphene, graphite, carbon nanotubes, carbon fibers, fullerenes, ultrafine carbon, carbon black, nanodiamonds, hard carbon, soft carbon, or a combination thereof. The carbon may generally be amorphous, crystalline, semi-crystalline, or a combination thereof.

The surface coating may be continuous or discontinuous on the surface of the lithium vanadium oxide. The surface coating may be fully dense or porous. The surface coating may have a thickness ranging from nanometers thickness to micron-level thickness. The thickness of the coating may be uniform or non-uniform across the surface. The surface coating may be a single layer or may be a multi-layer coating.

FIG. 1 is a schematic illustration of carbon-coated $V_2O_5$ 100 and carbon-coated disordered rocksalt lithium vanadium oxide (DRS-LVO) 150, in some embodiments of the invention. The carbon-coated $V_2O_5$ 100 contains an internal phase 110 comprising $V_2O_5$ and a coating 120 comprising carbon. The carbon-coated disordered rocksalt lithium vanadium oxide 150 contains an internal phase 160 comprising lithium vanadium oxide (e.g., $Li_3V_2O_5$) and a coating 170 comprising carbon. The coating 170 may be compositionally and/or structurally the same as the coating 120, or the coatings may be different, if the lithiation of $V_2O_5$ changes the carbon coating. In this disclosure, "lithiation" means the incorporation of at least one lithium atom into a material.

In some embodiments, the surface coating has an average coating thickness selected from about 0.1 nanometers to about 100 nanometers. In various embodiments, the surface coating has an average coating thickness of about, at least about, or at most about 0.1, 0.2, 0.5, 1, 1.5, 2, 2.5, 3, 4, 5, 10, 15, 25, 50, 75, or 100 nanometers, including any intervening ranges.

In some embodiments, the anode-material particles have a shape selected from the group consisting of spherical, columnar, cubic, irregular, and combinations thereof. The anode-material particles may have an average effective diameter selected from about 0.01 microns to about 100 microns, for example. In various embodiments, the average effective diameter of the anode-material particles is about, at least about, or at most about 0.01, 0.05, 0.1, 0.2, 0.3, 0.4, 0.5, 1, 1.5, 2, 2.5, 3, 4, 5, 10, 15, 20, 25, 30, 40, 50, 60, 70, 80, 90, or 100 microns, including any intervening ranges. The anode-material particles may have a unimodal or a multimodal size distribution.

In some embodiments, the surface coating is a dense, non-porous coating. In other embodiments, the surface coating is a porous coating. The surface coating may have an average porosity selected from about 1% to about 95%, for example. In various embodiments, the surface coating has an average porosity of about, at least about, or at most about 1%, 2%, 5%, 10%, 15%, 20%, 25%, 30%, 35%, 40%, 45%, 50%, 55%, 60%, 65%, 70%, 75%, 80%, 85%, 90%, or 95%, including any intervening ranges.

In some embodiments, the anode material is characterized in that it is chemically stable in the presence of air. In this disclosure, chemical stability in the presence of air is determined at atmospheric pressure (1 bar) and room temperature (25° C.) for at least 1 day, preferably at least 1 week, and more preferably at least 1 month.

In some, the anode material is characterized in that it is chemically stable in the presence of water. In this disclosure, chemical stability in the presence of water is determined at atmospheric pressure (1 bar) and room temperature (25° C.), in a water soak, for at least 1 hour, preferably at least 2 hours, and more preferably at least 3 hours.

Preferably, at least 10 wt % of the $Li_aV_bO_c$ has a disordered rocksalt structure in the $Fm\overline{3}m$ space group. More preferably, at least 50 wt % of the $Li_aV_bO_c$ has a disordered rocksalt structure in the $Fm\overline{3}m$ space group. Even more preferably, at least 90 wt % of the $Li_aV_bO_c$ has a disordered rocksalt structure in the $Fm\overline{3}m$ space group. Most preferably, essentially all of the $Li_aV_bO_c$ has a disordered rocksalt structure in the $Fm\overline{3}m$ space group. In various embodiments, at least 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, 99.5 wt %, or 99.9 wt % (such as 100 wt %) of the $Li_aV_bO_c$ has a disordered rocksalt structure in the $Fm\overline{3}m$ space group.

A disordered rocksalt structure is described by Liu et al., "A disordered rock salt anode for fast-charging lithium-ion batteries", Nature volume 585, pages 63-67 (2020), which is hereby incorporated by reference. The disordered rocksalt crystal structure can be indexed in the Fm$\bar{3}$m space group, with a cubic lattice parameter a=4.095 Å. The disordered rocksalt crystal structure of $Li_aV_bO_c$ is a crystal lattice containing a disordered (rather than strictly periodic) arrangement of lithium (Li) and transition metal (V) on the cation lattice. The oxygen atoms are close packed to form the face-centered-cubic structure. The majority of the lithium (Li) and transition metal (V) locate at octahedral sites formed by oxygen. Lithium (Li) can be also distributed in tetrahedral sites formed by oxygen.

A disordered rocksalt crystal structure contrasts with an ordered rocksalt crystal structure, such as with NaCl, in which the sodium and chloride ions form regular, orderly structures. In a disordered rocksalt crystal structure, the precise sites for the metal ions vary, but there is still an overall crystal structure. This specification hereby incorporates by reference *International Tables for Crystallography* Volume A: Space-group symmetry, Second online edition, edited by Aroyo, 2016.

A disordered rocksalt crystal structure also contrasts with an disordered amorphous structure that lacks a crystalline lattice. For example, when $Li_aV_bO_c$ is nominally $Li_3V_2O_5$, an amorphous structure would mean that the Li, V, and O atoms are randomly placed in the material, randomly bonded with each other, and do not form a crystal. Crystalline solids have well-defined edges and faces, diffract X-rays, and tend to have sharp melting points. In contrast, amorphous solids have irregular or curved surfaces, do not give well-resolved X-ray diffraction patterns, and melt over a wide range of temperatures. In this invention, the $Li_aV_bO_c$ is preferably crystalline, or has a crystallinity of at least 80%, at least 85%, at least 90%, at least 95%, at least 99%, or 100%. $Li_aV_bO_c$ with a crystallinity of at least 80% is referred to herein as crystalline LVO, or c-LVO. LVO crystallinity may be measured using X-ray diffraction.

A $Li_aV_bO_c$ precursor that does not contain any lithium—typically, vanadium pentoxide, $V_2O_5$—may itself be crystalline or amorphous. In principle, a disordered rocksalt structure does not become possible until there is at least one lithium atom inserted into $V_2O_5$ (i.e., a>0 in $Li_aV_bO_c$). During lithiation, as the value of a increases, the rocksalt structure is preferably maintained, even to very high values of a, such as 4, 5, or even greater. For example, in preferred embodiments, the disordered rocksalt structure is maintained through conversion of $Li_3V_2O_5$ to $Li_4V_2O_5$ or $Li_5V_2O_5$. During lithiation, following the initial formation of a disordered rocksalt structure upon the introduction of lithium atoms, there may be a further increase in the fraction of the $Li_aV_bO_c$ that has a disordered rocksalt crystal structure. In other embodiments, the fraction of the $Li_aV_bO_c$ that has a disordered rocksalt crystal structure stays relatively constant as the degree of lithiation (the value of a) increases. In certain embodiments, at the first discharge, the $Li_aV_bO_c$ may exhibit a superstructure of the rocksalt lattice which disappears upon further cycling. The disappearance of the superstructure does not affect the disordered rocksalt structure and electrochemical performance.

The $Li_aV_bO_c$ may be present in a pre-lithiated state, wherein a=0 in the $Li_aV_bO_c$. During use of the anode material, and potentially prior to use of the anode material, the $Li_aV_bO_c$ is present in a lithiated state, wherein a>0 in the $Li_aV_bO_c$.

The $Li_aV_bO_c$ may be selected from the group consisting of $Li_3V_2O_5$, $Li_4V_2O_5$, $Li_5V_2O_5$, $LiV_2O_5$, $Li_{0.001}V_2O_5$, $Li_2V_2O_5$, $Li_{0.001}VO_2$, $LiVO_2$, $Li_2VO_2$, $Li_{0.001}VO_3$, $LiVO_3$, $Li_2VO_3$, $Li_3VO_3$, $Li_{0.001}V_3O_8$, $LiV_3O_8$, $Li_2V_3O_8$, $Li_3V_3O_8$, $Li_{0.001}V_2O_3$, $LiV_2O_3$, $Li_2V_2O_3$, $Li_3V_2O_3$, and combinations thereof.

The $Li_aV_bO_c$ may have a density of about 1.5 g/cm$^3$ to about 5.5 g/cm$^3$. In various embodiments, the $Li_aV_bO_c$ has a density of about, at least about, or at most about 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.35, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, or 5.5 g/cm$^3$, including any intervening ranges.

In some embodiments, the lithium vanadium oxide further contains a dopant M that is chemically or physically contained within the lithium vanadium oxide such that its composition is given by $Li_aV_bO_cM_d$, wherein a=0.001-10, b=1-3, c=1-9, and d=0.001-3, wherein a, b, c, and d are selected to charge-balance the $Li_aV_bO_cM_d$, and wherein the $Li_aV_bO_c M_d$ is capable of being reversibly lithiated. The formula $Li_aV_bO_cM_d$ is a stoichiometric convenience and does not necessarily mean that the dopant M is chemically bonded with any other species present.

The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof, for example. The dopants may include one or more divalent, trivalent, tetravalent, pentavalent, or hexavalent dopants. Multiple dopants may be present in $Li_aV_bO_cM_d$, in which case each dopant in the empirical formula may have d=0.1-3.

Dopants may be used to modify the properties of the lithium vanadium oxide. For example, dopants may be used to adjust lithiation, delithiation, or other kinetics; lithiation capacity; anode stability; lithiation-delithiation potential; anode material electronic conductivity; lithium-ion diffusivity in anode material crystal structures; and/or other factors.

In some embodiments, surface-coated $Li_aV_bO_c$ represents a base composition to which dopants may be added. The doped composition may have a disordered rocksalt structure. The disordered rocksalt crystal lattice may or may not incorporate the dopant elements. That is, when there is a dopant M, in some embodiments, the disordered rocksalt crystal structure of $Li_aV_bO_cM_d$ is a crystal lattice containing a disordered arrangement of Li atoms, V atoms, and M atoms on the cation lattice site. Alternatively, or additionally, the dopant M may be in a different position than within the cation lattice of the disordered rocksalt crystal structure, such as randomly placed, or in a different crystalline lattice governing the relationship of M with other atoms, potentially superimposed on the disordered rocksalt crystal structure. In certain embodiments, the presence of a dopant M reduces the optimal amount of vanadium (the value of b) in the disordered rocksalt anode material.

The $Li_aV_bO_cM_d$ (doped anode material) may have a density of about 1.5 g/cm$^3$ to about 4.5 g/cm$^3$. Preferably, at least 50 wt % or at least 90 wt % of the $Li_aV_bO_cM_d$ has a disordered rocksalt structure in the Fm$\bar{3}$m space group. In various embodiments, at least 50 wt %, 60 wt %, 70 wt %, 80 wt %, 90 wt %, 95 wt %, or 99 wt % (such as 100 wt %) of the $Li_aV_bO_cM_d$ has a disordered rocksalt structure in the Fm$\bar{3}$m space group.

The doped lithium vanadium oxide, $Li_aV_bO_cM_d$, may contain a surface coating selected from the group consisting of (a) carbon, (b) a metal oxide and/or a metalloid oxide, (c) a metal fluoride and/or a metalloid fluoride, (d) a metal phosphate and/or a metalloid phosphate, and combinations thereof.

The raw material for the disordered rocksalt $Li_aV_bO_c$ or $Li_aV_bO_cM_d$ may be a vanadium oxide, such as $V_2O_5$ (vanadium pentoxide), of varying initial purity such as a low-grade material, <98 wt % $V_2O_5$; a medium-grade material, 98-99 wt % $V_2O_5$; or a high-grade material, >99 wt % $V_2O_5$. The $V_2O_5$ may be monocrystalline, polycrystalline, or amorphous. The $V_2O_5$ may be in the form of a hydrate. The particle size of the $V_2O_5$ (or other vanadium oxide, such as VO, $VO_2$, or $V_2O_3$) may be from about 0.2 microns to about 100 microns, for example, and may have a narrow, medium, or large size distribution or a multimodal size distribution. The particles of vanadium oxide may be spherical, columnar, cubic, flake, irregular, or a mixture of different shapes.

When a dopant is utilized, the dopant may be incorporated following lithiation, i.e., the dopant is added to $Li_aV_bO_c$ to form $Li_aV_bO_cM_d$. Alternatively, or additionally, the dopant may be incorporated into $V_2O_5$ prior to lithiation, to form doped vanadium oxide, $V_bO_cM_d$, wherein b=1-3, c=1-9, and d=0.001-3. The doped vanadium oxide may have be a low-grade material, <98 wt % $V_bO_cM_d$, a medium-grade material, 98-99 wt % $V_bO_cM_d$, or a high-grade material, >99 wt % $V_bO_cM_d$. The $V_bO_cM_d$ may be monocrystalline, polycrystalline, or amorphous. The particle size of the $V_bO_cM_d$ may be from about 0.2 microns to about 100 microns, for example, and may have a narrow, medium, or large size distribution or a multimodal size distribution. The particles of doped vanadium oxide $V_bO_cM_d$ may be spherical, columnar, cubic, flake, irregular, or a mixture of different shapes.

Particle sizes may be measured by a variety of techniques, including dynamic light scattering, laser diffraction, or image analysis, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

Exemplary specifications of vanadium oxide or doped vanadium oxide are as follows:
  Purity: >99.0 wt %
  Average Particle Size: 3-5
  Crystal Density: 3.36 g/cm$^3$
  Tap Density: >2.5 g/cm$^3$ Exemplary specifications of lithium vanadium oxide or doped lithium vanadium oxide, as an anode material, are as follows:
  Purity: >99.0 wt %
  Average Particle Size: 3-5
  Crystal Density: 3.95 g/cm$^3$
  Tap Density: >2.8 g/cm$^3$
  Nominal Voltage vs. Li/Li$^+$: 0.59 V
  Nominal Capacity at 0.5 C: >225 mA·h/g
  Capacity at 20 C: >150 mA·h/g
  First Cycle Efficiency: >90%
  Maximum Charge Voltage: 2.0 V vs. Li/Li$^+$
  Maximum Charge Current: 100 C
  Cutoff Voltage for Discharge: 0.01 V vs. Li/Li$^+$
  Maximum Discharge Current: 100 C The discharge current may be expressed as a C-rate in order to normalize against battery capacity. A C-rate is a measure of the rate at which a battery is discharged relative to its maximum capacity. A 1 C rate means that the discharge current will discharge the battery in 1 hour. For a battery with a capacity of 10 A·h (amp-hours), this equates to a discharge current of 10 A (amps). A 20 C rate for this battery would be 200 A, and a C/2 rate would be 5 A.

In some embodiments, the anode material further comprises one or more additional anode-material components selected from the group consisting of silicon, silicon oxides, tin, tin oxides, phosphorus, carbonaceous species, and combinations thereof, and wherein the carbonaceous species is distinct from the carbon, if any, contained in the surface coating. The carbonaceous species may be graphite, non-graphitized carbon, hard carbon, soft carbon, or a combination thereof. The additional anode-material components may collectively range in total concentration from about 0.25 wt % to about 99.75 wt % of the anode, for example. In various embodiments, the additional anode components collectively have a total concentration of about, at least about, or at most about 0.25 wt %, 0.5 wt %, 1 wt %, 2 wt %, 5 wt %, 10 wt %, 15 wt %, 20 wt %, 25 wt %, 30 wt %, 40 wt %, 50 wt %, 60 wt %, 70 wt %, 80 wt %, 90 wt %, 95 wt %, 97 wt %, 98 wt %, 99 wt %, 99.5 wt %, or 99.75 wt %, including any intervening ranges.

The anode material may have a density of about 1.5 g/cm$^3$ to about 5.0 g/cm$^3$, for example. In various embodiments, the anode material has a density of about, at least about, or at most about 1.5 g/cm$^3$, 2.5 g/cm$^3$, 3.0 g/cm$^3$, 3.5 g/cm$^3$, 4.0 g/cm$^3$, 4.5 g/cm$^3$, or 5.0 g/cm$^3$, including any intervening ranges.

The anode material may have an anode-material volumetric porosity selected from about 5% to about 80%, for example. In various embodiments, the anode material has an anode-material volumetric porosity of about, at least about, or at most about 5%, 10%, 15%, 20%, 25%, 30%, 40%, 50%, 60%, 70%, or 80%, including any intervening ranges.

In preferred embodiments, the $Li_aV_bO_c$ is characterized in that during one lithiation-delithiation cycle, the $Li_aV_bO_c$ undergoes a volume change from about 0% to about 20%. Preferably, the volume change of the $Li_aV_bO_c$ during the lithiation-delithiation cycle is from about 0% to about 10%, and more preferably from about 0% to about 5%. In various embodiments, during one lithiation-delithiation cycle, the $Li_aV_bO_c$ undergoes a volume change of about, or at most about, 0%, 1%, 2%, 3%, 4%, 5%, 6%, 7%, 8%, 9%, 10%, 11%, 12%, 13%, 14%, 15%, or 20%, including any intervening ranges.

Some variations of the invention provide an anode comprising the disclosed anode material.

The anode may further comprise one or more additional anode components selected from the group consisting of silicon, silicon oxides, tin, tin oxides, phosphorus, carbonaceous species, and combinations thereof, wherein the carbonaceous species is distinct from the carbon, if any, contained in the surface coating. The additional anode components may collectively range in total concentration from about 0.25 wt % to about 97 wt % of the anode, for example. In various embodiments, the additional anode components collectively have a total concentration of about, at least about, or at most about 0.25 wt %, 0.5 wt %, 1 wt %, 2 wt %, 5 wt %, 10 wt %, 15 wt %, 20 wt %, 25 wt %, 30 wt %, 40 wt %, 50 wt %, 60 wt %, 70 wt %, 80 wt %, 90 wt %, 95 wt %, or 97 wt %, including any intervening ranges.

When the anode comprises a carbonaceous species, the carbonaceous species may be graphite, non-graphitized carbon, hard carbon, soft carbon, or a combination thereof. The carbonaceous species may be useful as a conductive additive to improve the rate performance of a cell as well as the energy density of a cell. Conductive carbon additives may include one or more of carbon nanotubes, carbon black, carbon fibers (e.g., vapor-grown carbon fiber), ultrafine carbon, graphene, graphite, hard carbon, soft carbon, or other carbon additives.

In some embodiments, the anode further contains one or more binders. Binders may hold active anode material together as well as place the active anode material in contact with the anode substrate (e.g., copper foil). The binders may also help keep conductive carbon additives in place against the active material.

The binders may be aqueous-based binders selected from the group consisting of carboxymethyl cellulose, styrene-butadiene rubber, styrene-butadiene copolymer, polyacrylic acid, lithium-substituted polyacrylic acid, and combinations thereof, for example. Alternatively, or additionally, the binders may be non-aqueous-based binders selected from the group consisting of polyvinylidene fluoride, poly(vinylidenefluoride-co-hexafluoropropylene), and combinations thereof, for example.

The binders may range in concentration from about 0.25 wt % to about 50 wt % of the anode, for example. In various embodiments, the binders collectively have a total concentration of about, at least about, or at most about 0.25 wt %, 0.5 wt %, 1 wt %, 2 wt %, 5 wt %, 10 wt %, 15 wt %, 20 wt %, 25 wt %, 30 wt %, 40 wt %, 50 wt %, 60 wt %, 70 wt %, or 80 wt %, including any intervening ranges.

In some embodiments, the anode further contains an additional lithium source, beyond the lithium provided by the lithium vanadium oxide. The additional lithium source may be pure lithium (Li) or lithiated carbon (e.g., $LiC_6$), for example.

In some embodiments, the anode has a volumetric anode porosity selected from about 5% to about 80%. In various embodiments, the anode has a volumetric anode porosity of about, at least about, or at most about 5%, 10%, 15%, 20%, 25%, 30%, 40%, 50%, 60%, 70%, or 80%, including any intervening ranges.

In some embodiments, the anode has an average anode thickness from about 100 nanometers to about 500 microns. In various embodiments, the anode has an average anode thickness of about, at least about, or at most about 100 nm, 200 nm, 300 nm, 400 nm, 500 nm, 1 μm, 2 μm, 5 μm, 10 μm, 15 μm, 20 μm, 25 μm, 30 μm, 40 μm, 50 μm, 60 μm, 70 μm, 80 μm, 90 μm, 100 μm, 200 μm, 300 μm, 400 μm, or 500 μm, including any intervening ranges.

The anode may be present in a cell. A "cell" is an electrochemical cell that is capable of either generating electrical energy from chemical reactions or using electrical energy to cause chemical reactions.

The cell may further comprise a cathode, a separator, and a packet foil surrounding the anode, the separator, and the cathode, and wherein the separator is configured to electrically separate the anode from the cathode. The anode composite may be disposed on a first substrate (e.g., copper foil) to form an anode, and the cathode composite may be disposed on a second substrate (e.g., aluminum foil) to form a cathode. There may be multiple layers of anode, separator, and cathode, in a layered cell configuration. The layers are repeatedly stacked to form multi-layer stackings in a cell configuration, forming anode, separator, cathode, separator, anode, separator, cathode, separator . . . and so on, depending on total number of layers.

In some embodiments, the anode has an anode material loading selected from about 20 wt % to about 100 wt %, such as about 20 wt %, 30 wt %, 40 wt %, 50 wt %, 60 wt %, 70 wt %, 80 wt %, 90 wt %, or 100 wt %, including any intervening ranges.

In some embodiments, the anode has an anode material areal loading selected from about 0.2 $mg/cm^2$ to about 50 $mg/cm^2$ on at least one side of the anode, such as about 0.2, 0.5, 1, 2, 5, 10, 15, 20, 25, 30, 35, 40, 45, or 50 $mg/cm^2$, including any intervening ranges, on at least one side of the anode (e.g., on both sides of the anode).

In some embodiments, the anode has an anode material areal capacity selected from about 0.05 $mA·h/cm^2$ to about 10 $mA·h/cm^2$ on at least one side of the anode, such as about 0.05, 0.1, 0.2, 0.5, 1, 2, 3, 4, 5, 6, 7, 8, 9, or 10 $mA·h/cm^2$, including any intervening ranges, on at least one side of the anode (e.g., on both sides of the anode).

In some embodiments, the anode has a capacity ranging from about 50 mA·h/g to about 500 mA·h/g, such as about 50, 100, 150, 200, 250, 300, 350, 400, 450, or 500 mA·h/g, including any intervening ranges.

In some embodiments, the anode has a negative to positive electrode ratio (N/P ratio) ranging from about 0.5 to about 1.5, such as about 0.5, 0.6, 0.7, 0.8, 0.9, 1.0, 1.1, 1.2, 1.3, 1.4, or 1.5, including any intervening ranges.

A copper foil, or other metal foil, may be used as a substrate upon which to place the anode material. In some embodiments, the copper foil thickness may range from about 1 to about 100 μm, such as about 1, 5, 10, 20, 30, 40, or 50 μm, including any intervening ranges. In some embodiments, the anode press density may range from about 0.3 $g/cm^3$ to about 5 $g/cm^3$, such as about 0.3, 0.4, 0.5, 1, 1.5, 2, 2.5, 3, 3.5, 4, 4.5, or 5 $g/cm^3$, including any intervening ranges.

When the anode material is disposed on a substrate, typically the anode material is disposed on both sides of a substrate layer. This is referred to as a double layer. Within a cell, the number of double layers may vary widely, such as from 1 to about 50, e.g. about 1, 2, 3, 4, 5, 10, 15, 20, 25, 30, 35, 40, 45, 50, or more.

The anode material may be able to facilitate Li-ion battery charging on the scale of minutes without a complicated nanosizing process. The anode material may enable a fast charge battery without sacrificing energy density. In some embodiments, the anode material may show a voltage plateau ranging from about 0 V to about 2 V. In some embodiments, the voltage plateau may be about 0.6 V, such as about 0.55 V, about 0.56 V, 0.57 V, 0.58 V, 0.59 V, 0.60 V, 0.61 V, 0.62 V, 0.63 V, or 0.64 V. The range of the voltage potential may ensure that under high current, the anode potential achieves a value that does not cause lithium plating. The range of the voltage potential may also ensure that the average cell voltage does not decrease to less than about 1.5 V, when a common cathode material is used.

As described above, the cell may include a cathode. The cathode may comprise a cathode material selected from the group consisting of $LiFePO_4$; $LiMn_2O_4$; $LiNi_{0.5}Mn_{1.5}O_4$; $LiNi_xCo_yMn_zO_2$, wherein x+y+z=1; $LiCoO_2$; $LiNi_xCo_yAl_zO_2$, wherein x+y+z=1; $LiFe_xMn_yPO_4$, wherein x+y=1; $aLiNi_xCo_yMn_zO_2·(1-a)Li_2MnO_3$, wherein a=0-1 and x+y+z=1; and combinations thereof. Other cathode materials may be utilized. The cathode may be paired with an anode based on each electrode's composition.

In some embodiments, the cathode may have a capacity ranging from about 50 mA·h/g to about 400 mA·h/g, for example. In some embodiments, the active cathode material loading may range from about 50 wt % to about 100 wt %. In some embodiments, the coating weight for each side of the cathode may range from about 0.5 $mg/cm^2$ to about 30 mg/cm². In some embodiments, the areal capacity for each side of the cathode may range from about 0.2 mA·h/cm² to about 10 mA·h/cm².

In some embodiments, the cathode press density may range from about 0.3 g/cm³ to about 5 g/cm³. Aluminum foil may be used as a substrate upon which to place the cathode material. In some embodiments, the aluminum foil thickness may range from about 1 μm to about 100 μm. The number of cathode double layers may range from 1 to about 50, for example.

In some embodiments, the cell further contains an electrolyte. The electrolyte may be selected from liquid electrolytes (including non-aqueous electrolytes or aqueous electrolytes), polymer gel electrolytes, solid electrolytes, ionic liquids, or a combination thereof. The electrolyte may be used to fill the separator to promote the movement of ions between the cathode and the anode during charge and discharge. During charging, the lithium ions transport from cathode to anode; while discharging the lithium ions transport from anode to cathode.

Examples of the solvent that can be used in the electrolyte include, but are not limited to, propylene carbonate, ethylene carbonate, butylene carbonate, ethyl methyl carbonate, dimethyl carbonate, diethyl carbonate, methyl ethyl carbonate, methyl propionate, fluoroethylene carbonate, dimethoxyethane, bis(2,2,2-trifluoroethyl) ether, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones.

The electrolytes may further contain lithium salts, such as $LiPF_6$, $LiClO_4$, $LiBF_4$, $LiAsF_6$, $LiCF_3SO_3$, $LiCF_3CO_2$, $LiN(FSO_2)_2$, $LiN(CF_3SO_2)_2$, $LiBF_2(C_2O_4)$, $LiB(C_2O_4)_2$, $LiPO_2F_2$, $LiSbF_6$, $LiAlCl_4$, LiCl, LiBr, and LiI, or other salts, or a combination thereof. As is known in the art, other minor components and impurities can be present in the electrolyte.

In some embodiments, the electrolyte may have an electrolyte capacity value ranging from about 0.5 g/A·h to about 10 g/A·h. In various embodiments, the electrolyte has an electrolyte capacity value of about 0.5, 1, 2, 3, 4, 5, 6, 7, 8, 9, or 10 g/A·h, including any intervening ranges.

The separator electrically insulates the cathode from the anode. The separator may have no electrical conductivity, or low electrical conductivity. The separator may be made of one or more of natural or synthetic rubber, glass fiber, cellulose, nanocellulose, polyolefins (e.g., polyethylene or polypropylene), or other materials. The separator may be porous to hold the electrolyte. In some embodiments, the separator pore size ranges from about 10 nm to about 150 nm. The separator may be made to close the pores when the temperature breaches a threshold, in order to prevent the reaction from escalating. In some embodiments, the separator thickness ranges from about 5 μm to about 50 μm. In some embodiments, the separator porosity ranges from about 30% to about 70%. In some embodiments, the separator is coated with another material that will close over the pores to prevent overheating.

The packet foil insulates the anode-separator-cathode assembly from the external environment. The packet foil may be fabricated from polymers, such as polyamide, polyester-polyurethane, polypropylene, and/or metals, such as aluminum. The thickness of the packet foil may range from about 20 μm to about 200 μm.

Exemplary methods of making and using lithium vanadium oxide will now be further described. The disorder rocksalt LVO may be prepared via wet chemical synthesis and/or in situ electrochemical methods, for example.

Figure 2:
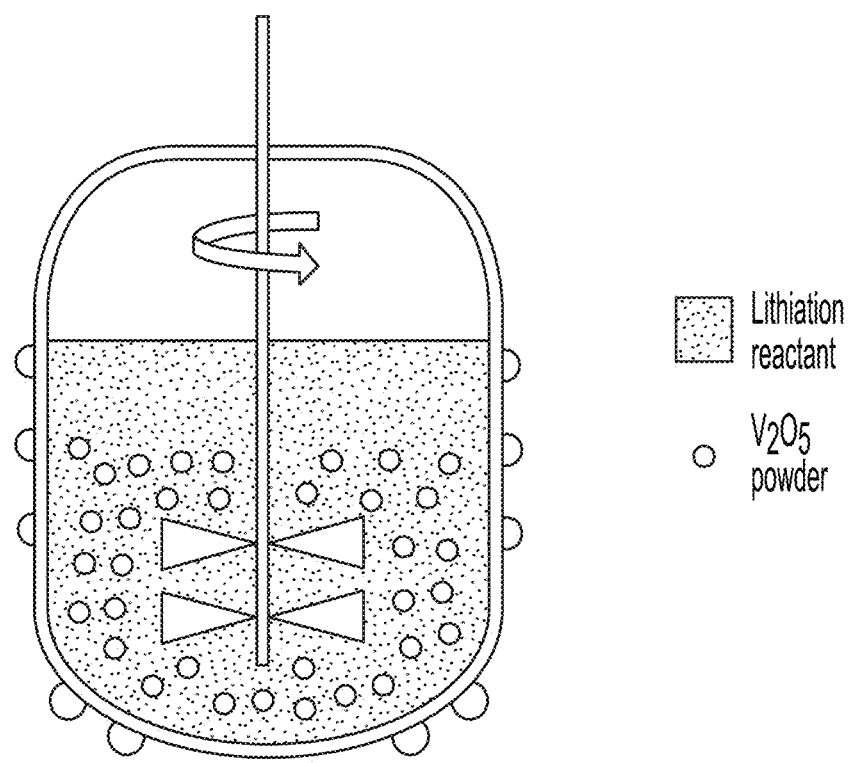
FIG. 2 is a schematic illustration of chemical synthesis of the disordered rocksalt lithium vanadium oxide from starting $V_2O_5$ powders, in accordance with some embodiments of the invention.

FIG. 2 is a schematic illustration of chemical synthesis of the disordered rocksalt lithium vanadium oxide from starting $V_2O_5$ powders, in accordance with some embodiments of the invention. As illustrated in FIG. 2, starting $V_2O_5$ powders may dispersed and stirred in a liquid lithiation reactant. The $V_2O_5$ powders may be supplied from a vanadium mine and may be further milled to desired particle sizes. The $V_2O_5$ powders may be coated with carbon to enhance their electronic conductivity, and/or coated with another material as described above. The $V_2O_5$ powders may be doped with one or more dopants. The lithiation reactant may be a lithium-containing organic compound dissolved into a solvent, for example, n-butyllithium ($LiC_4H_9$) in hexane solution or lithium naphthalene ($LiC_{10}H_8$) in tetrahydrofuran (THF). The lithiation reactant reduces $V_2O_5$ while inserting $Li^+$ into the $V_2O_5$ to form disordered rocksalt $Li_3V_2O_5$. In the case of lithium naphthalene, the reaction is:

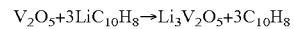

$$V_2O_5 + 3LiC_{10}H_8 \rightarrow Li_3V_2O_5 + 3C_{10}H_8$$

Figure 3:
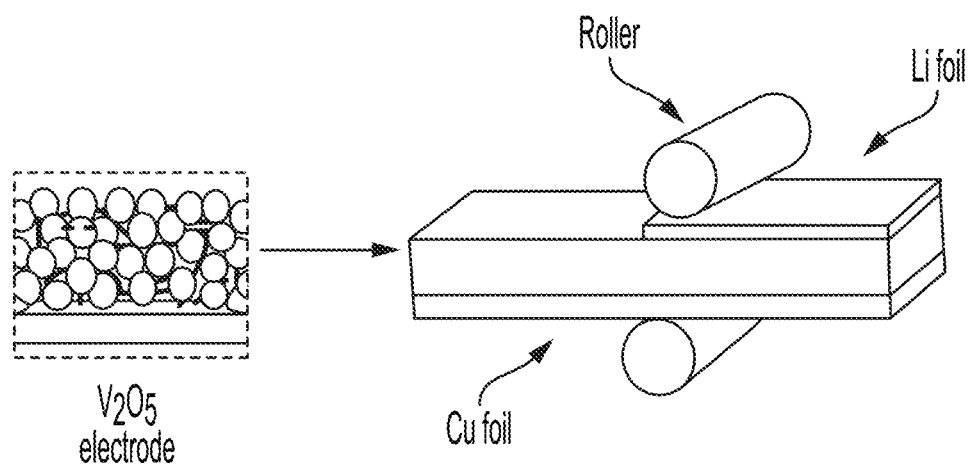
FIG. 3 is a schematic illustration of in situ electrochemical reactions to synthesize the disordered rocksalt lithium vanadium oxide from $V_2O_5$, in accordance in accordance with some embodiments of the invention.

FIG. 3 is a schematic illustration of in situ electrochemical reactions to synthesize the disordered rocksalt lithium vanadium oxide from $V_2O_5$, in accordance in accordance with some embodiments of the invention. As illustrated in FIG. 3, starting $V_2O_5$ powders may be mixed with carbon additive and binders, then cast on Cu foil to form the anode. Lithium metal is pressed on the $V_2O_5$ electrode. The $V_2O_5$ powders may be supplied by a vanadium mine and may be further milled to desired particle sizes. The $V_2O_5$ powders may be coated with carbon to enhance their electronic conductivity, and/or coated with another material as described above. The $V_2O_5$ powders may be doped with one or more dopants. The lithium metal serves as a reductant and a lithium source, either as foil or powder (or both). The lithiation reaction takes place when there is an electrolyte injection. The electrolyte dissolves the Li metal and transfers Li ions into the $V_2O_5$ to form disordered rocksalt $Li_3V_2O_5$.

Some variations of the invention provide a method of synthesizing an anode material, the method comprising:
(a) applying a reducing agent to a precursor material, wherein the reducing agent comprises lithium, and wherein the precursor material comprises vanadium oxide, lithium vanadium oxide, or a combination thereof, thereby generating a reduced material;
(b) introducing a surface coating onto the reduced material, after step (a) and/or during step (a), wherein the surface coating contains a species selected from the group consisting of carbon, a metal oxide, a metalloid oxide, a metal fluoride, a metalloid fluoride, a metal phosphate, a metalloid phosphate, and combinations thereof; and
(c) recovering an anode material comprising a plurality of anode-material particles, wherein the anode-material particles comprise an internal phase containing lithium vanadium oxide and the surface coating disposed on external surfaces of the internal phase, wherein the lithium vanadium oxide has a composition given by $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated.

In some methods, at least 10 wt % of the $Li_aV_bO_c$ has a disordered rocksalt structure in the $Fm\bar{3}m$ space group. Preferably, at least 50 wt %, at least 90%, or essentially all of the $Li_aV_bO_c$ has a disordered rocksalt structure in the $Fm\bar{3}m$ space group.

In some methods, the precursor material comprises $V_2O_5$, $LiV_2O_5$, $Li_2V_2O_5$, or a combination thereof. Generally, the precursor material contains less lithium than the desired anode material to be formed via lithiation.

In some methods, the reducing agent is selected from the group consisting of n-butyllithium ($LiC_4H_9$), lithium naphthalene ($LiC_{10}H_8$), lithium anthracenide ($LiC_{14}H_9$), and combinations thereof. In certain embodiments, the reducing agent is lithium naphthalene prepared by dissolving the lithium into a solution containing naphthalene and a solvent, wherein the solvent is selected from the group consisting of tetrahydrofuran, 1,2-dimethoxyethane, dimethyl carbonate, and combinations thereof. Lithium naphthalene may be considered as organic salt with the chemical formula $Li^+C_{10}H_8^-$. Other alkyllithiums (linear, branched, or cyclic) than $LiC_4H_9$, and other lithium aromatics than $LiC_{10}H_8$ or $LiC_{14}H_9$, may be utilized as the reducing agent. An example of another alkyllithium is methyllithium, $LiCH_3$. Other reductive organolithium reagents may be used.

In some methods, the precursor material further comprises a dopant M. The dopant M may be selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

In some methods, the $Li_aV_bO_c$ is characterized in that during one lithiation-delithiation cycle, the $Li_aV_bO_c$ undergoes a volume change from about 0% to about 20%, such as from about 0% to about 10%, or from about 0% to about 5%.

In typical methods of using the anode material, a cell is repeatedly charged and discharged over multiple charge-discharge cycles, wherein the $Li_aV_bO_c$ is reversibly lithiated and delithiated a plurality of times. The cell may be charged and discharged over at least 1000 cycles, for example. In various embodiments, the number of charge-discharge cycles is 1, 2, 3, 4, 5, 10, 20, 30, 40, 50, 60, 70, 80, 90, 100, 200, 300, 400, 500, 600, 700, 800, 900, 1000, 1100, 1200, 1500, 2000, 2500, 3000, 3500, 4000, 4500, or 5000, or even more, for example.

When the cell undergoes at least one charge-discharge cycle, the lithium vanadium oxide material preferably has a volume change from 0% to about 20% during the charge-discharge cycle(s). In various embodiments, after one charge-discharge cycle, the lithium vanadium oxide material has a volume change of about, or at most about 20%, 19%, 18%, 17%, 16%, 15%, 14%, 13%, 12%, 11%, 10%, 9%, 8%, 7%, 6%, 5.5%, 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, or 0.0%, including any intervening ranges. In various embodiments, after 2, 3, 4, 5, 10, 20, 30, 40, 50, 60, 70, 80, 90, 100, 200, 300, 400, 500, 600, 700, 800, 900, or 1000 charge-discharge cycles, the lithium vanadium oxide material has a volume change of about, or at most about 20%, 19%, 18%, 17%, 16%, 15%, 14%, 13%, 12%, 11%, 10%, 9%, 8%, 7%, 6%, 5.5%, 5%, 4.5%, 4%, 3.5%, 3%, 2.5%, 2%, 1.5%, 1%, 0.9%, 0.8%, 0.7%, 0.6%, 0.5%, 0.4%, 0.3%, 0.2%, 0.1%, or 0.0%, including any intervening ranges.

Some methods further comprise:
dissolving the precursor material (e.g., using $H_2O_2$) to form a sol-gel (which is preferably a uniform sol-gel);
mixing (e.g., magnetic stirring) a precursor of the surface coating with the sol-gel to form a homogeneous mixture;
drying the homogeneous mixture (e.g., in an oven), thereby forming a dried powder; and
calcining the dried powder in air, wherein the precursor of the surface coating is converted into the surface coating; and
recovering the anode-material particles.

When the surface coating in step (b) contains carbon, the carbon may be in sp form, $sp^2$ form, and/or $sp^a$ form. The carbon may be in the form of graphene, graphite, carbon nanotubes, carbon fibers (e.g., vapor-grown carbon fibers), ultrafine carbon, carbon black, nanodiamonds, hard carbon, soft carbon, or a combination thereof.

In some methods, the precursor material has a precursor-material shape selected from the group consisting of spherical, columnar, cubic, irregular, and combinations thereof.

In some methods, the precursor material has an average effective diameter selected from about 0.1 microns to about 100 microns. The precursor material may have a bimodal particle-size distribution.

In some methods, the precursor material is $V_2O_5$. The $V_2O_5$ may be present in the precursor material in a purity range from about 90 wt % to about 100 wt %, for example.

The precursor material may be dissolved to form a sol-gel using hydrogen peroxide ($H_2O_2$) or another suitable compound.

The surface coating may have an average coating thickness selected from about 0.1 nanometers to about 100 nanometers, for example. The surface coating may have an average porosity selected from 0% to about 95%, for example.

The anode material may have an anode-material volumetric porosity selected from about 5% to about 80%, for example.

The method may further comprise introducing, to the anode material, one or more additional components optionally selected from the group consisting of silicon, silicon oxides, tin, tin oxides, phosphorus, carbonaceous species, and combinations thereof, and wherein the carbonaceous species is distinct from the carbon, if any, contained in the surface coating.

The method may further comprise introducing, to the anode, one or more binders optionally selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods, the anode material is cast on a first substrate to form a lithiated anode. A cathode material may be cast on a second substrate to form a cathode. A separator may be stacked on the lithiated anode, and the cathode may be stacked on the separator. A packet foil may be configured to surround the anode, the separator, and the cathode to form a cell.

In some methods, the lithiated anode has an anode material loading selected from about 20 wt % to about 100 wt %. In some methods, the lithiated anode has an anode material areal loading selected from about 0.2 mg/cm² to about 50 mg/cm² on at least one side of the lithiated anode. In some methods, the lithiated anode has an anode material areal capacity selected from about 0.05 mA·h/cm² to about 10 mA·h/cm² on at least one side of the lithiated anode.

The method may further comprise, following step (c), lithiating and delithiating the $Li_aV_bO_c$ in a lithiation-delithiation cycle. In that lithiation-delithiation cycle, the $Li_aV_bO_c$ preferably undergoes a volume change from about 0% to about 20%, more preferably from about 0% to about 10%, and most preferably from about 0% to about 5%, during the lithiation-delithiation cycle.

Still other variations of the invention provide a method of manufacturing a cell, the method comprising:

(a) casting an anode material on a first substrate to form an anode, wherein the anode material comprises a plurality of anode-material particles, wherein the anode-material particles comprise an internal phase containing lithium vanadium oxide and an optional surface coating disposed on external surfaces of the internal phase, wherein the lithium vanadium oxide has a composition given by $Li_xV_yO_z$, wherein x=0-10, y=1-3, z=1-9, and x, y, and z are selected to charge-balance the $Li_xV_yO_z$;

(b) applying a reducing agent to the anode material, wherein the reducing agent comprises lithium, thereby generating a lithiated anode material comprising $Li_aV_bO_c$, wherein a=0.001-10, b=1-3, c=1-9, and a, b, and c are selected to charge-balance the $Li_aV_bO_c$, wherein the $Li_aV_bO_c$ is capable of being reversibly lithiated;

(c) optionally, removing excess reducing agent, if any, from the lithiated anode material;

(d) casting a cathode material onto a second substrate, to form a cathode;

(e) stacking a separator onto the anode;

(f) stacking the cathode onto the separator; and (g) surrounding the anode, the separator, and the cathode with a packet foil, to form a cell.

In some methods of manufacturing a cell, at least 10 wt % of the $Li_aV_bO_c$ has a disordered rocksalt structure in the Fm$\bar{3}$m space group. Preferably, at least 50 wt %, at least 90%, or essentially all of the $Li_aV_bO_c$ has a disordered rocksalt structure in the Fm$\bar{3}$m space group.

In some methods of manufacturing a cell, the surface coating is present and is disposed on external surfaces of the internal phase, wherein the surface coating contains a species selected from the group consisting of carbon, a metal oxide, a metalloid oxide, a metal fluoride, a metalloid fluoride, a metal phosphate, a metalloid phosphate, and combinations thereof.

When the surface coating is present and contains carbon, the carbon may be in sp form, $sp^2$ form, and/or $sp^a$ form. Exemplary forms of carbon include graphene, graphite, carbon nanotubes, carbon fibers, ultrafine carbon, carbon black, nanodiamonds, hard carbon, soft carbon, or a combination thereof.

In some methods of manufacturing a cell, the anode material further comprises a dopant M, wherein the dopant M is optionally selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

The method of manufacturing a cell may further comprise introducing, to the anode material, one or more additional components selected from the group consisting of silicon, silicon oxides, tin, tin oxides, phosphorus, carbonaceous species, and combinations thereof, and wherein the carbonaceous species is distinct from the carbon, if any, contained in the surface coating, if present.

The method of manufacturing a cell may further comprise introducing, to the anode, one or more binders selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods of manufacturing a cell, the $Li_aV_bO_c$ is characterized in that during one lithiation-delithiation cycle, the $Li_aV_bO_c$ undergoes a volume change from about 0% to about 20%, preferably from about 0% to about 10%, and more preferably from about 0% to about 5%.

In some methods of manufacturing a cell, the anode has an anode material loading selected from about 20 wt % to about 100 wt %.

In some methods of manufacturing a cell, the anode has an anode material areal loading selected from about 0.2 $mg/cm^2$ to about 50 $mg/cm^2$ on at least one side of the anode.

In some methods of manufacturing a cell, the anode has an anode material areal capacity selected from about 0.05 $mA \cdot h/cm^2$ to about 10 $mA \cdot h/cm^2$ on at least one side of the anode.

The method of manufacturing a cell may further comprise injecting an electrolyte into the cell.

In some methods of manufacturing a cell, the first substrate is a copper foil with a thickness from about 1 micron to about 100 microns, for example. The second substrate may be an aluminum foil with a thickness from about 1 micron to about 100 microns, for example.

Yet other variations of the invention provide a method of manufacturing a cell, the method comprising:

(a) casting an anode material on a first substrate to form an anode, wherein the anode material comprises a plurality of anode-material particles, wherein the anode-material particles comprise an internal phase containing $Li_xV_yO_z$, wherein x=0-10, y=1-3, z=1-9, and x, y, and z are selected to charge-balance the $Li_xV_yO_z$, and wherein an optional surface coating is disposed on external surfaces of the internal phase;

(b) pressing lithium onto the anode, to form a pressed anode;

(c) casting a cathode material onto a second substrate, to form a cathode;

(d) stacking a separator onto the pressed anode;

(e) stacking the cathode onto the separator;

(f) surrounding multiple layers of the anode, multiple layers of the separator, and multiple layers of the cathode with a packet foil, to form a dry cell;

(g) injecting an electrolyte into the cell; and (h) converting the pressed anode into a lithiated anode comprising $Li_aV_bO_c$, wherein a=0.001-10, b=1-3, c=1-9, and a, b, and c are selected to charge-balance said $Li_aV_bO_c$, wherein said $Li_aV_bO_c$ is capable of being reversibly lithiated.

In some embodiments, the anode is fabricated by mixing active materials, conductive carbon additives, and binders to be pressed or calendared into an electrode sheet without solvent (dry process). The anode may also be fabricated by mixing active materials, conductive carbon additives, and binders to form a slurry using water or non-aqueous solvent, followed by casting the slurry on a substrate (e.g., current collector).

In some methods of manufacturing a cell, the $Li_aV_yO_z$ is $V_2O_5$. The $V_2O_5$ may be present in the internal phase in an internal-phase purity range from about 90 wt % to about 100 wt %, for example.

In some methods of manufacturing a cell, the anode-material particles have an anode-material shape selected from the group consisting of spherical, columnar, cubic, irregular, and combinations thereof.

In some methods of manufacturing a cell, at least 10 wt % of the $Li_aV_bO_c$, formed in step (h), has a disordered rocksalt structure in the Fm$\bar{3}$m space group. Preferably, at least 50 wt %, at least 90 wt %, or essentially all of the $Li_aV_bO_c$ has a disordered rocksalt structure in the $Fm\overline{3}m$ space group.

In some methods of manufacturing a cell, the surface coating is present and is disposed on external surfaces of the internal phase. The surface coating may contain a species selected from the group consisting of carbon, a metal oxide, a metalloid oxide, a metal fluoride, a metalloid fluoride, a metal phosphate, a metalloid phosphate, and combinations thereof.

When the surface coating is present and contains carbon, the carbon may be in sp form, $sp^2$ form, and/or $sp^a$ form. Exemplary forms of carbon include graphene, graphite, carbon nanotubes, carbon fibers, ultrafine carbon, carbon black, nanodiamonds, hard carbon, soft carbon, or a combination thereof.

In some methods of manufacturing a cell, the anode material further comprises a dopant M, and wherein the dopant M is optionally selected from the group consisting of Be, Mg, Ca, Zn, Fe, Cu, Sc, B, Y, Al, La, Si, Ge, Sn, Ti, Zr, Mn, P, Nb, Ta, Cr, Mo, W, Se, and combinations thereof.

Some methods of manufacturing a cell further comprise introducing, to the anode material, one or more additional components selected from the group consisting of silicon, silicon oxides, tin, tin oxides, phosphorus, carbonaceous species, and combinations thereof, and wherein the carbonaceous species is distinct from the carbon, if any, contained in the surface coating, if present.

Some methods of manufacturing a cell further comprise introducing, to the anode, one or more binders selected from the group consisting of carboxymethyl cellulose, styrene-butadiene rubber, styrene-butadiene copolymer, polyacrylic acid, lithium-substituted polyacrylic acid, polyvinylidene fluoride, and combinations thereof.

In some methods of manufacturing a cell, the $Li_aV_bO_c$ is characterized in that during one lithiation-delithiation cycle, the $Li_aV_bO_c$ undergoes a volume change from about 0% to about 20%, preferably from about 0% to about 10%, and more preferably from about 0% to about 5%.

In some methods of manufacturing a cell, the anode has an anode material loading selected from about 20 wt % to about 100 wt %, an anode material areal loading selected from about 0.2 $mg/cm^2$ to about 50 $mg/cm^2$ on at least one side of the anode, and an anode material areal capacity selected from about 0.05 $mA \cdot h/cm^2$ to about 10 $mA \cdot h/cm^2$ on at least one side of the anode.

In some methods of manufacturing a cell, step (b) does not utilize a solvent to form the pressed anode.

In some methods of manufacturing a cell, steps (g) and (h) are conducted simultaneously rather than sequentially.

In some methods of manufacturing a cell, the first substrate is a copper foil with a thickness from about 1 micron to about 100 microns, for example. Copper foil is a common anode current collector in Li-ion batteries. Copper foil is highly electrically conductive and also dissipates the heat generated by the battery. The anode material disposed on the copper foil may together be referred to as "tape" or "anode tape". Other foil substrates may be used, and foil modifications may be used, such as to enhance bonding with the foil or to adjust conductivity.

In some methods of manufacturing a cell, the second substrate is an aluminum foil with a thickness from about 1 micron to about 100 microns, for example. Aluminum foil is a common cathode current collector in Li-ion batteries.

In some variations, the method further includes casting the anode material on a first substrate to form an anode; stacking a separator on the anode, wherein the separator includes an electrolyte; casting a cathode material on a second substrate to form a cathode; stacking the cathode on the separator; and surrounding the anode, the separator, and the cathode with a packet foil to form a cell. In typical embodiments, there are many layers of the anode, separator, and cathode in the cell.

In some embodiments, the presently disclosed technology may be used in a battery system that is superior to conventional graphite battery packs and which has a lower number of cells in the battery pack. This battery system may utilize any one (or more) of the disclosed anode materials, and may be coupled with a 4 V high-capacity cathode, such as $LiCoO_2$, Li-rich oxides, and/or $Li(NiMnCo)O_2$ layered oxides. The battery system is suitable for many commercial applications, including electric vehicles, smart devices, and high-power portable devices with high energy density.

The battery system may be safely operated at a wide temperature range, such as from −30° C. to 60° C.

The battery system may be rechargeable in about, or less than about, 30, 25, 20, 15, 10, 9, 8, 7, 6, 5, 4, 3, 2, or 1 minute, in various embodiments.

One skilled in the battery art will appreciate that the principles of battery design, including calculations, modeling, simulations, and engineering may be carried out using the benefit of the present disclosure and the anode materials. One skilled in the battery art, with the benefit of this disclosure, will understand how to scale a battery cell larger or smaller for different battery applications.

In some embodiments of the invention, an anode material is produced and then sent to another party for incorporating into an anode. In some embodiments of the invention, an anode (e.g., an anode tape) is produced and then sent to another party for incorporating into a cell. In some embodiments of the invention, a cell is produced and then sent to another party for incorporating into a final device or vehicle. In some embodiments of the invention, a cell is produced and then sent to another party for incorporating into a module. In some embodiments of the invention, a module is produced and then sent to another party for incorporating into a final device or vehicle. In some embodiments of the invention, a cell is produced and then sent to another party for incorporating into a pack. In some embodiments of the invention, a module is produced and then sent to another party for incorporating into a pack. In some embodiments of the invention, a pack is produced and then sent to another party for incorporating into a final device or vehicle.

There are a large number of use cases for the invention.

In applications pertaining to wearable devices and consumer electronics, battery capacities may range from 0.005 A·h to 15 A·h, gravimetric energy densities may range from 120 to 220 W·h/kg, volumetric energy densities may range from 250 to 650 W·h/L, charge times may range from 10 seconds to 10 hours, and cycle lifetimes may range from 50 to 100,000 cycles, for example.

In applications pertaining to robotics, micromobilities, and power tools, battery capacities may range from 1 to 20 A·h, gravimetric energy densities may range from 150 to 220 W·h/kg, volumetric energy densities may range from 350 to 650 W·h/L, charge times may range from 10 seconds to 10 hours, and cycle lifetimes may range from 50 to 100,000 cycles, for example.

In applications pertaining to electric vehicles and stationary energy storage, battery capacities may range from 2 to 250 A·h, gravimetric energy densities may range from 150 to 220 W·h/kg, volumetric energy densities may range from 350 to 650 W·h/L, charge times may range from 10 seconds to 10 hours, and cycle lifetimes may range from 50 to 100,000 cycles, for example.

Table 1 is an exemplary cell design for a 221 A·h pouch cell. Table 2 is an exemplary cell design for a 25 A·h pouch cell. Table 3 is an exemplary cell design for a 2.3 A·h pouch cell. Table 4 is an exemplary cell design for a 0.44 A·h pouch cell.

TABLE 1

Cell Design for 221 A·h Pouch Cell.

| Dimension | Width × Height × Thickness (all mm) | 900 × 100 × 15 |
|---|---|---|
| Cathode | Capacity (mA·h/g) | 200 |
| | Active Material Loading | 90% |
| | Coating Weight (mg/cm² each side) | 16.6 |
| | Areal Capacity (mA·h/cm² each side) | 3.32 |
| | Electrode Press Density (g/cm³) | 2.56 |
| | Electrode Thickness (single side) (μm) | 65 |
| | Al Foil Thickness (μm) | 10 |
| | Double Layers | 30 |
| Anode | Cell Balance (N/P ratio) | 1.1 |
| | Capacity (mA·h/g) | 225 |
| | Active Material Loading | 90% |
| | Coating Weight (mg/cm² each side) | 16.3 |
| | Areal Capacity (mA·h/cm² each side) | 3.66 |
| | Electrode Press Density (g/cm³) | 2.14 |
| | Electrode Thickness (single side) (μm) | 76 |
| | Cu Foil Thickness (μm) | 10 |
| | Double Layers | 31 |
| Cell | Voltage (V) | 3.2 |
| | Capacity (A·h) | 221 |
| | Energy (W·h) | 707 |
| | Energy density (W·h/kg) | >200 |
| | Energy density (W·h/L) | >600 |

TABLE 2

Cell Design for 25 A·h Pouch Cell.

| Dimension | Width × Height × Thickness (all mm) | 105 × 145 × 10 |
|---|---|---|
| Cathode | Capacity (mA·h/g) | 200 |
| | Active Material Loading | 90% |
| | Coating Weight (mg/cm² each side) | 16.6 |
| | Areal Capacity (mA·h/cm² each side) | 3.32 |
| | Electrode Press Density (g/cm³) | 2.56 |
| | Electrode Thickness (single side) (μm) | 65 |
| | Al Foil Thickness (μm) | 10 |
| | Double Layers | 30 |
| Anode | Cell Balance (N/P ratio) | 1.1 |
| | Capacity (mA·h/g) | 225 |
| | Active Material Loading | 90% |
| | Coating Weight (mg/cm² each side) | 16.3 |
| | Areal Capacity (mA·h/cm² each side) | 3.66 |
| | Electrode Press Density (g/cm³) | 2.14 |
| | Electrode Thickness (single side) (μm) | 76 |
| | Cu Foil Thickness (μm) | 10 |
| | Double Layers | 31 |
| Cell | Voltage (V) | 3.2 |
| | Capacity (A·h) | 25.29 |
| | Energy (W·h) | 80.9 |
| | Energy density (W·h/kg) | >200 |
| | Energy density (W·h/L) | >600 |

TABLE 3

Cell Design for 2.3 A·h Pouch Cell.

| Dimension | Width × Height × Thickness (all mm) | 45 × 58 × 5 |
|---|---|---|
| Cathode | Capacity (mA·h/g) | 200 |
| | Active Material Loading | 90% |
| | Coating Weight (mg/cm² each side) | 16.6 |
| | Areal Capacity (mA·h/cm² each side) | 3.32 |
| | Electrode Press Density (g/cm³) | 2.56 |
| | Electrode Thickness (single side) (μm) | 65 |
| | Al Foil Thickness (μm) | 10 |
| | Double Layers | 14 |
| Anode | Cell Balance (N/P ratio) | 1.1 |
| | Capacity (mA·h/g) | 225 |
| | Active Material Loading | 90% |
| | Coating Weight (mg/cm² each side) | 16.3 |
| | Areal Capacity (mA·h/cm² each side) | 3.66 |
| | Electrode Press Density (g/cm³) | 2.14 |
| | Electrode Thickness (single side) (μm) | 76 |
| | Cu Foil Thickness (μm) | 10 |
| | Double Layers | 15 |
| Cell | Voltage (V) | 3.2 |
| | Capacity (A·h) | 2.3 |
| | Energy (W·h) | 7.4 |
| | Energy density (W·h/kg) | >180 |
| | Energy density (W·h/L) | >540 |

TABLE 4

Cell Design for 0.44 A·h Pouch Cell.

| Dimension | Width × Height × Thickness (all mm) | 40 × 10 × 5 |
|---|---|---|
| Cathode | Capacity (mA·h/g) | 200 |
| | Active Material Loading | 90% |
| | Coating Weight (mg/cm² each side) | 16.6 |
| | Areal Capacity (mA·h/cm² each side) | 3.32 |
| | Electrode Press Density (g/cm³) | 2.56 |
| | Electrode Thickness (single side) (μm) | 65 |
| | Al Foil Thickness (μm) | 10 |
| | Double Layers | 14 |
| Anode | Cell Balance (N/P ratio) | 1.1 |
| | Capacity (mA·h/g) | 225 |
| | Active Material Loading | 90% |
| | Coating Weight (mg/cm² each side) | 16.3 |
| | Areal Capacity (mA·h/cm² each side) | 3.66 |
| | Electrode Press Density (g/cm³) | 2.14 |
| | Electrode Thickness (single side) (μm) | 76 |
| | Cu Foil Thickness (μm) | 10 |
| | Double Layers | 15 |
| Cell | Voltage (V) | 3.2 |
| | Capacity (A·h) | 0.44 |
| | Energy (W·h) | 1.4 |
| | Energy density (W·h/kg) | >150 |
| | Energy density (W·h/L) | >450 |

Examples

The following experiments were performed to demonstrate various embodiments of the disclosed technology. The experiments, data, and images are not intended to limit the scope of the invention in any way. In the drawings, "DRS" refers to a disordered rocksalt.

Figure 4:
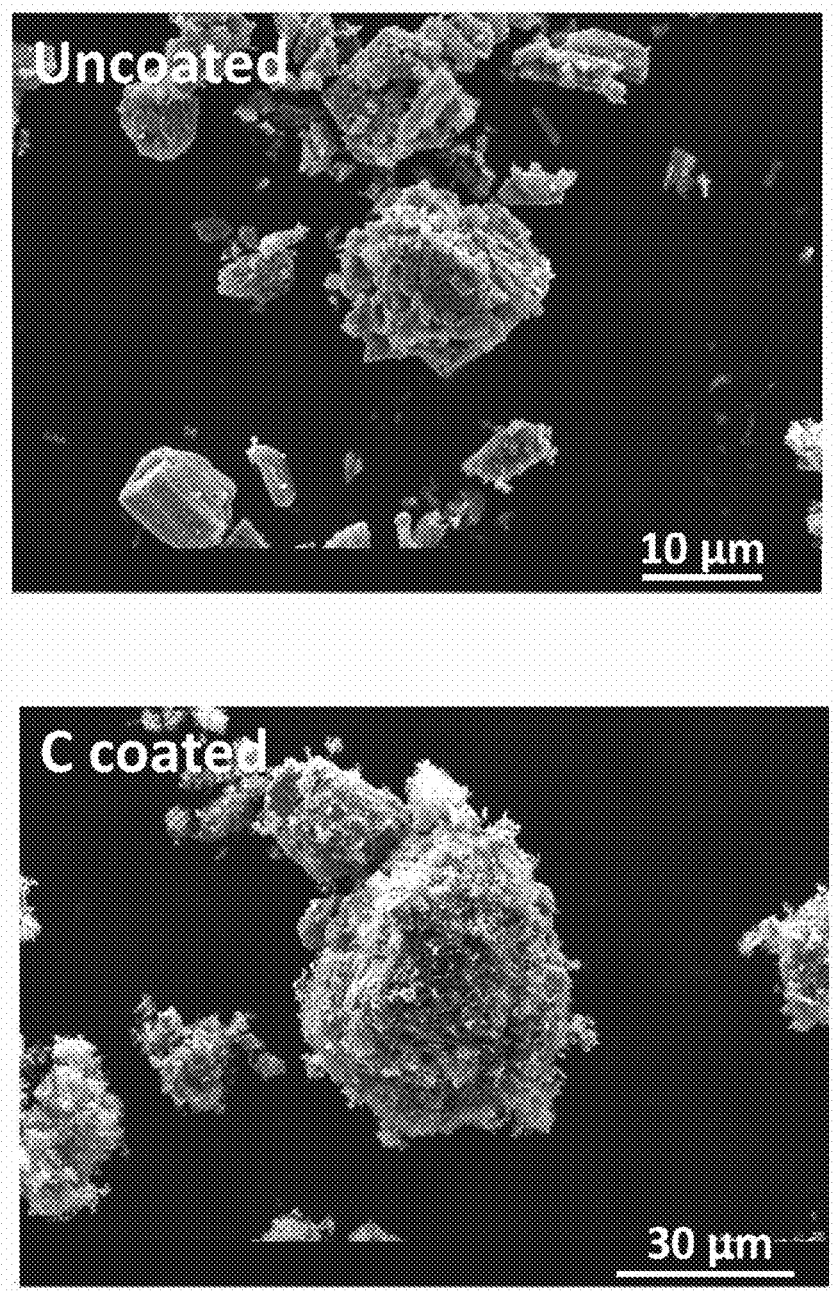
FIG. 4 illustrates images captured using a scanning electron microscope (SEM) of uncoated $V_2O_5$ and carbon-coated $V_2O_5$, indicating that for the carbon-coated $V_2O_5$, carbon particles cover the surface of $V_2O_5$ particles, in accordance with the Examples herein.

$V_2O_5$ powders with particles sizes of about 1 μm to about 20 μm were coated with carbon by physical ball milling with nanometer-sized Super P carbon. FIG. 4 illustrates images captured using a scanning electron microscope (SEM) of uncoated $V_2O_5$ and carbon-coated $V_2O_5$. The morphology of the $V_2O_5$ powders before and after ball milling with Super P carbon is revealed. Carbon particles cover the surface of $V_2O_5$ particles. As illustrated, the nano-sized carbon sticks to the surface of the $V_2O_5$ powders after the mechanical treatment.

Figure 5:
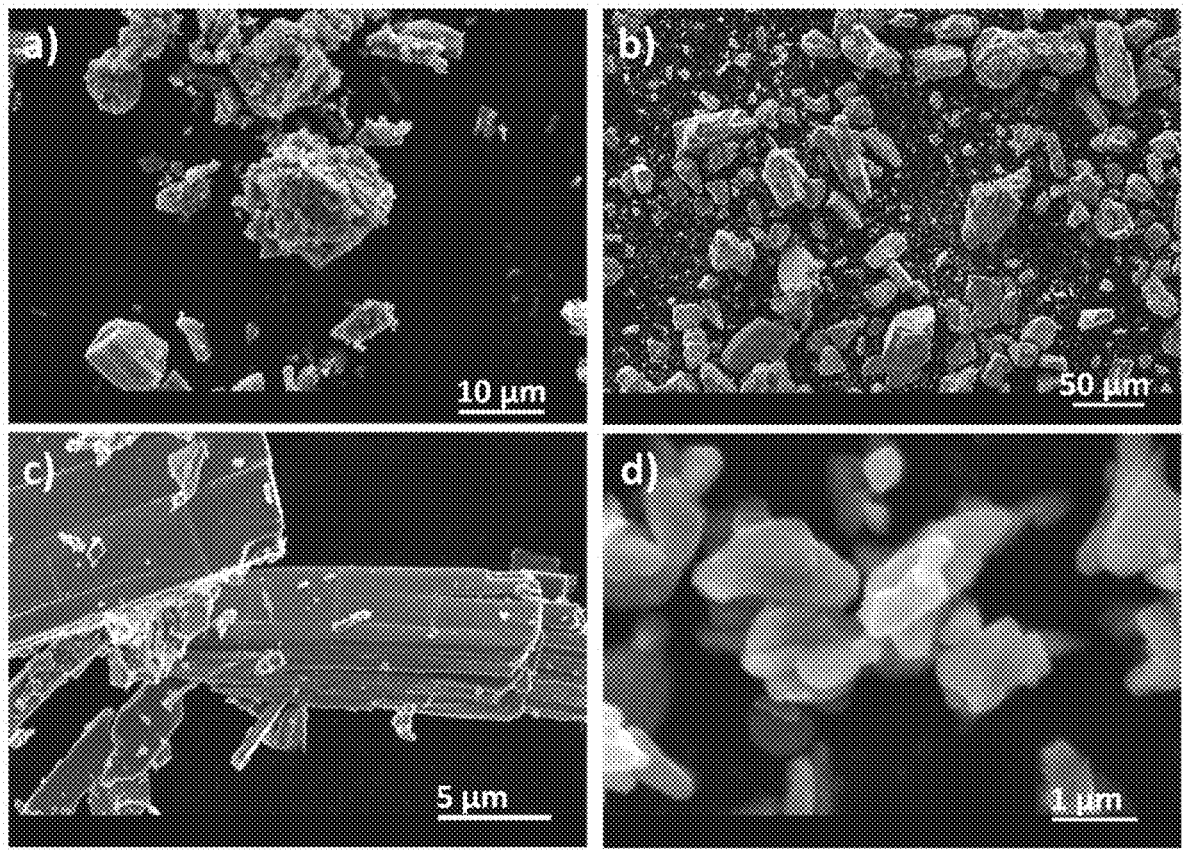
FIG. 5 illustrates SEM images of the disordered rocksalt $Li_3V_2O_5$ powders with various morphologies, in accordance with the Examples herein.

The morphologies of the disordered rocksalt lithium vanadium oxide have been examined by scanning electron microscopy (SEM). FIG. 5 illustrates SEM images of exemplary disordered rocksalt $Li_3V_2O_5$ powders with various morphologies. FIG. 5(a) shows the disordered rocksalt lithium vanadium oxide primary particles agglomerated into spherical secondary particles with sizes ranging from about 5 μm to about 20 μm; the primary particle sizes are in the range of about 200 nm to about 2 μm. FIG. 5(b) shows the disordered rocksalt lithium vanadium oxide primary particles agglomerated into big irregular chunks ranging from about 5 μm to about 50 μm; the primary particle sizes range from about 200 nm to about 2 μm. FIG. 5(c) demonstrates the disordered rocksalt lithium vanadium oxide in the form of flakes. The width of the flakes ranges from about 2 μm to about 10 μm, and the length of the flakes ranges from about 5 μm to about 50 μm. FIG. 5(d) demonstrates the disordered rocksalt lithium vanadium oxide single crystals. The primary single-crystal particles are well-dispersed, with sizes of about 200 nm to about 5 μm. These examples in FIGS. 5(a)-(d) show that the morphology of the disordered rocksalt lithium vanadium oxide is controllable.

Figure 6:
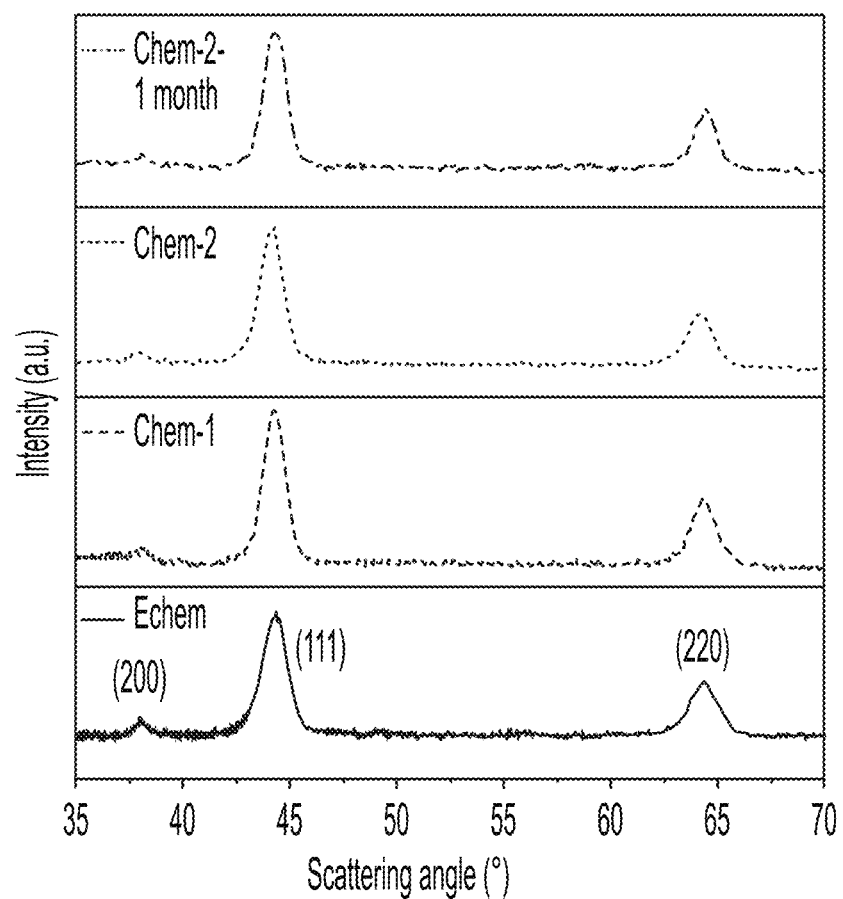
FIG. 6 illustrates X-ray diffraction (XRD) graphs of disordered rocksalt lithium vanadium oxides prepared by different methods, and the stability of disordered rocksalt lithium vanadium oxide in ambient air after 1 month, indicating that stable, pure-phase disordered rocksalt $Li_3V_2O_5$ can be synthesized from $V_2O_5$ powders via chemical approaches, in accordance with the Examples herein.

FIG. 6 illustrates X-ray diffraction (XRD) graphs of disordered rocksalt lithium vanadium oxides synthesized from $V_2O_5$ powders via different chemical approaches. In FIG. 6, the "Echem" lithium vanadium oxide was $Li_3V_2O_5$ prepared via discharging a Li||$V_2O_5$ cell to 1.5 V. The "Chem-1" lithium vanadium oxide was the $Li_3V_2O_5$ product of reacting $V_2O_5$ powder with n-butyllithium ($LiC_4H_9$). The "Chem-2" lithium vanadium oxide was the $Li_3V_2O_5$ product of reacting $V_2O_5$ powder with lithium naphthalene ($LiC_{10}H_8$).

One example of the synthesis procedure is as follows. First, put $V_2O_5$ and naphthalene into a glass reactor, with molar ratio 1:a (a=0.05-3). Second, add tetrahydrofuran (THF) into the reactor as the solvent. The amount of THF is calculated to get the naphthalene concentration in the range of 0.005-2 mol/L. Under mechanical stirring, the naphthalene can be quickly dissolved in THF. The $V_2O_5$ powder will be dispersed in the solution in orange color. Third, feed a stoichiometric amount of Li into the solution while stirring. The Li will react with naphthalene, and the solution color will be dark blue; $V_2O_5$ will be immediately lithiated, and the dispersed $Li_xV_2O_5$ will turn the solution color black. The reaction temperature may be controlled at room temperature or heated up to 80° C. The reaction duration may range from 15 mins to 24 hours. The reaction is under inert atmosphere, namely, moisture-free and oxygen-free. Fourth, after reaction, the $Li_3V_2O_5$ powders are filtered and washed by organic solvent, for example, ethanol, THF, etc. The washed powders are filtered and dried under vacuum to achieve the final $Li_3V_2O_5$. The drying temperature may range from room temperature to 200° C. The vacuum drying duration may range from 15 mins to 24 hours.

All the lithium vanadium oxides in FIG. 6 exhibited a disordered rocksalt structure in the $Fm\bar{3}m$ space group. The long-term stability of the disordered rocksalt $Li_3V_2O_5$ in ambient air was tested by exposing the Chem-2 lithium vanadium oxide to the environment (air) for one month, resulting in the sample labeled "Chem-2-1 month" in FIG. 6. The XRD pattern of this aged $Li_3V_2O_5$ sample shows a pure disordered rocksalt structure, indicating that the disordered rocksalt $Li_3V_2O_5$ was stable in air.

Figure 7:
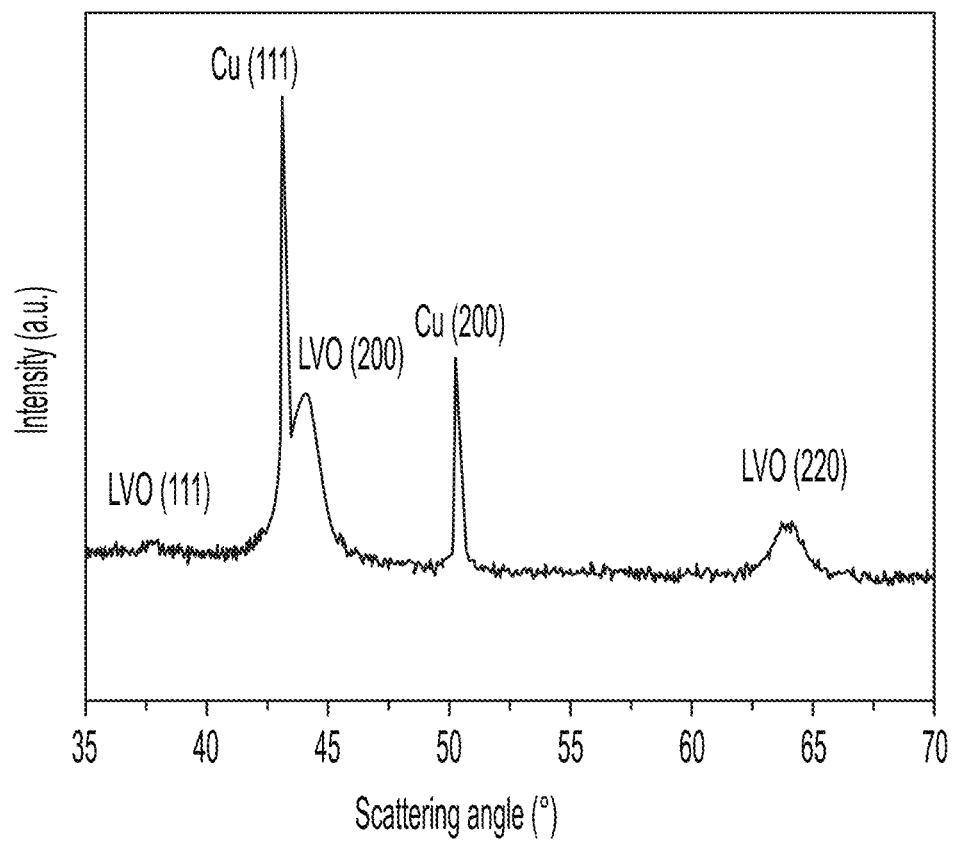
FIG. 7 illustrates a XRD graph of a disordered rocksalt $Li_3V_2O_5$ anode material prepared by in situ electrochemical reaction, indicating that the pure-phase disordered rocksalt $Li_3V_2O_5$ can be synthesized from $V_2O_5$ via in situ electrochemical reactions, in accordance with the Examples herein.

FIG. 7 illustrates a XRD graph of a disordered rocksalt $Li_3V_2O_5$ anode material prepared by in situ electrochemical reaction. The disordered rocksalt $Li_3V_2O_5$ anode material was prepared by pressing a thin Li foil on a $V_2O_5$ electrode. A few drops of 1 M $LiPF_6$ in ethylene carbonate/ethyl methyl carbonate (3:7 volume ratio) electrolyte was filled between the $V_2O_5$ electrode and the Li foil to enable the electrochemical lithiation. The XRD shows a pure disordered rocksalt $Li_3V_2O_5$ structure on a Cu current collector. FIG. 7 demonstrates that the pure-phase disordered rocksalt $Li_3V_2O_5$ can be synthesized from $V_2O_5$ via in situ electrochemical reactions.

Figure 8:
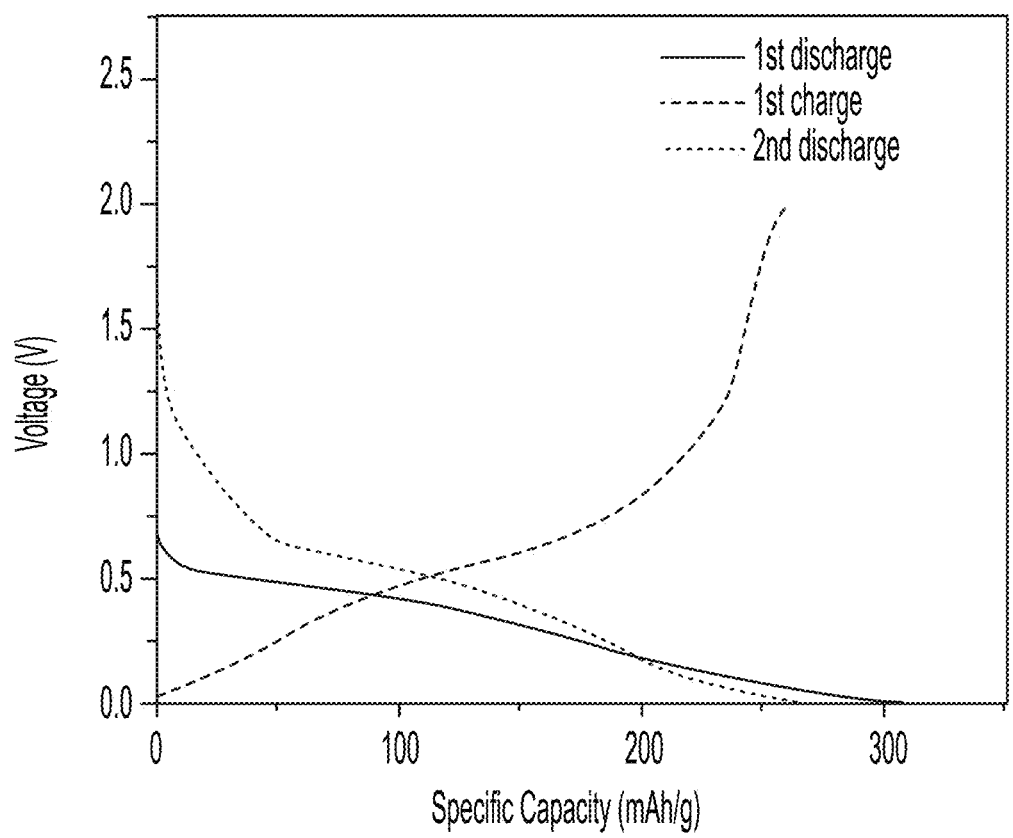
FIG. 8 illustrates charge/discharge voltage profiles of a $Li_3V_2O_5$ electrode prepared by in situ electrochemical reaction, in accordance with the Examples herein.

FIG. 8 illustrates charge/discharge voltage profiles of a $Li_3V_2O_5$ anode material prepared by in situ electrochemical reaction. The disordered rocksalt $Li_3V_2O_5$ anode material was assembled into a coin cell. Using 100 mA/g current density, the charge/discharge voltage profile was between 0.01 V and 2 V, as shown in FIG. 8 for a first discharge, a first charge, and a second discharge. The initial discharge capacity was 307 mA·h/g. The average working potential was around 0.6 V, with a reversible capacity of 260 mA·h/g.

Figure 9:
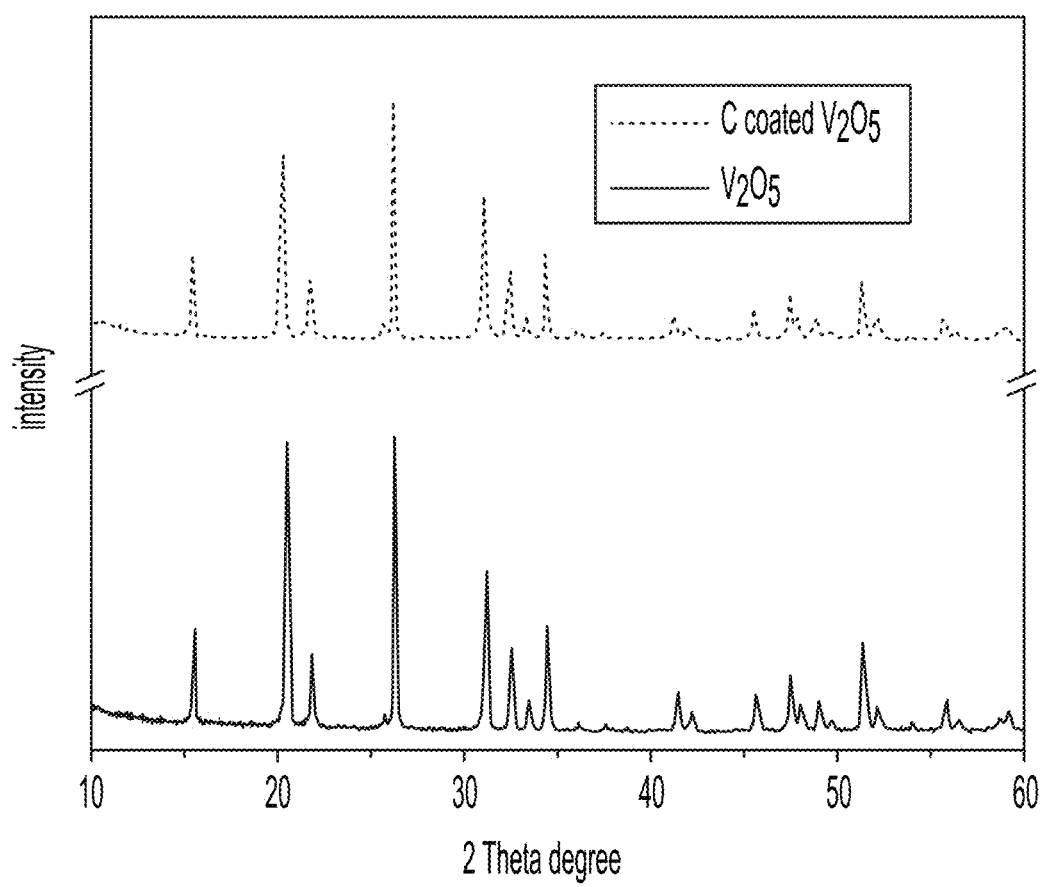
FIG. 9 illustrates XRD graphs of $V_2O_5$ and carbon-coated $V_2O_5$, indicating that the carbon-coated $V_2O_5$ maintains the original structure of the $V_2O_5$, in accordance with the Examples herein.

FIG. 9 illustrates XRD graphs of $V_2O_5$ and carbon-coated $V_2O_5$. A carbon coating layer was applied to the $V_2O_5$ powder to improve the electronic conductivity of the $V_2O_5$ and its lithiated form, i.e. the disordered rocksalt $Li_3V_2O_5$. Glucose was used as the carbon source. The $V_2O_5$ powders were well-dispersed into the glucose solution. Glucose-coated $V_2O_5$ powders were made by heating the solution to remove the water. Then, the glucose-coated $V_2O_5$ powders were sintered at 400-600° C. under $N_2$ to form a layer of nanocarbon coating on the surface of $V_2O_5$. The XRD data in FIG. 9 shows that the carbon-coated $V_2O_5$ maintains the original pure-phase structure of the $V_2O_5$.

Figure 10:
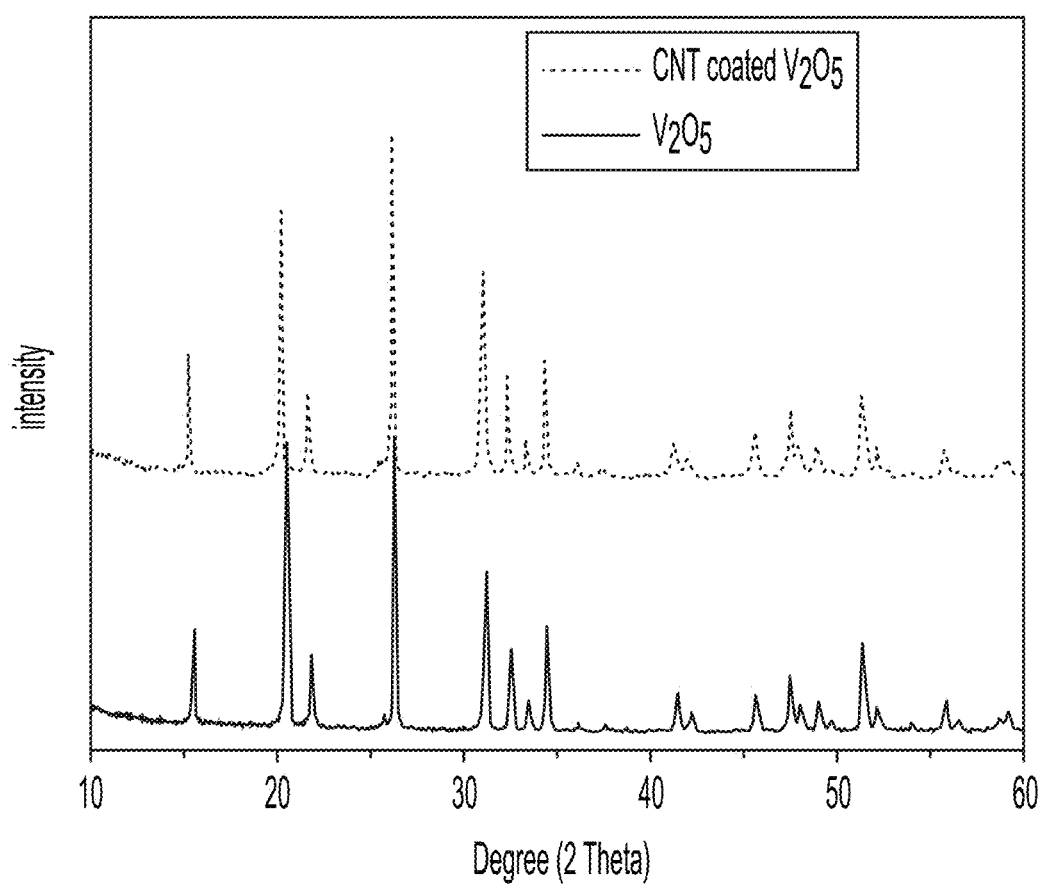
FIG. 10 illustrates XRD graphs of $V_2O_5$ and CNT (carbon nanotube)-coated $V_2O_5$, indicating that the CNT-coated $V_2O_5$ maintains the original structure of the $V_2O_5$, in accordance with the Examples herein.

FIG. 10 illustrates XRD graphs of $V_2O_5$ and CNT (carbon nanotube)-coated $V_2O_5$. The $V_2O_5$ powders were dissolved by $H_2O_2$ to form a uniform sol-gel. The carbon nanotubes were added to the sol-gel with magnetic stirring to achieve homogeneous mixing. Then, the mixture was dried in an oven to remove the water. The dried powders were calcinated at 350° C. in air for 2 hours to form CNT-coated $V_2O_5$. The XRD data in FIG. 10 shows that the CNT-coated $V_2O_5$ maintains the original pure-phase structure of the $V_2O_5$.

Figure 11:
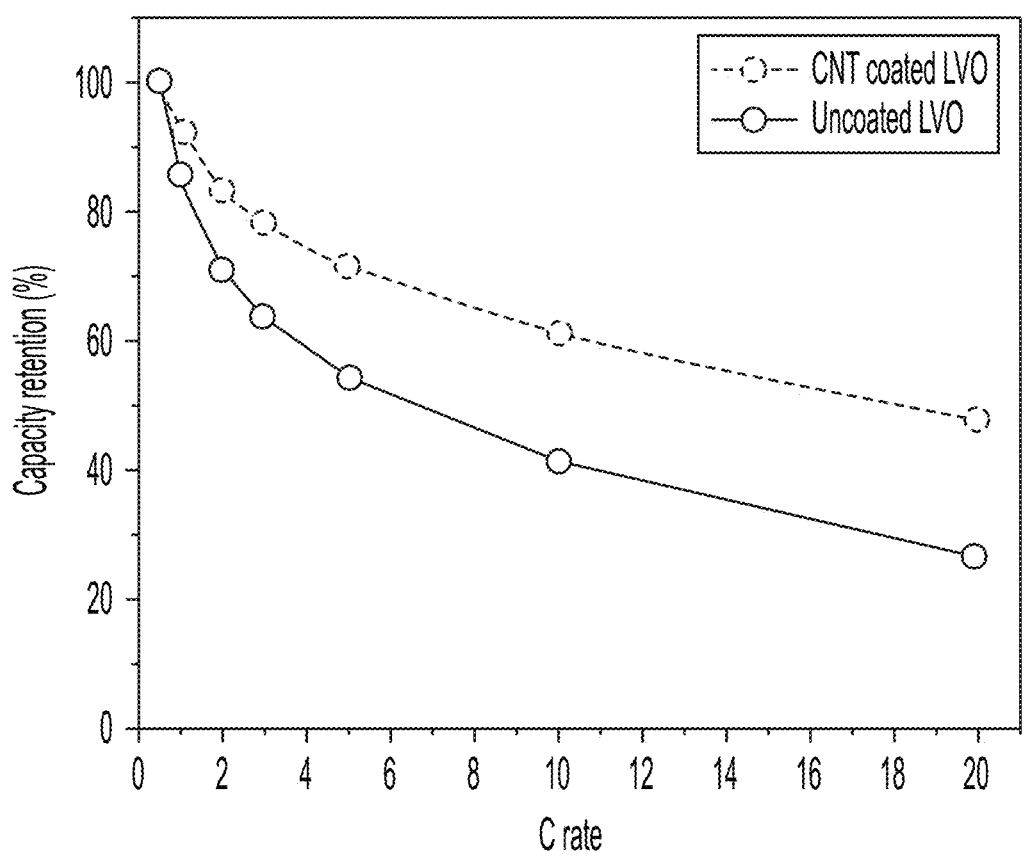
FIG. 11 illustrates capacity retention of $Li_3V_2O_5$ and CNT-coated $Li_3V_2O_5$ under different charge/discharge current rates, showing that the CNT-coated $Li_3V_2O_5$ has better fast charge capability, in accordance with the Examples herein.

FIG. 11 illustrates capacity retention of uncoated (bare) $Li_3V_2O_5$ and CNT-coated disordered rocksalt $Li_3V_2O_5$ under different charge/discharge current rates. The CNT-coated disordered rocksalt $Li_3V_2O_5$ was tested in a coin cell to evaluate its rate performance. As illustrated, the CNT-coated disordered rocksalt $Li_3V_2O_5$ exhibits much higher capacity retention compared to the uncoated disordered rocksalt $Li_3V_2O_5$. At 20 C, namely a 3-minute charge, the CNT-coated disordered rocksalt $Li_3V_2O_5$, and bare disordered rocksalt $Li_3V_2O_5$, exhibit 49% and 27% of their capacities at a 0.5 C rate, respectively. The data in FIG. 11 show that the CNT-coated $Li_3V_2O_5$ has better fast-charge capability than the uncoated $Li_3V_2O_5$.

Figure 12:
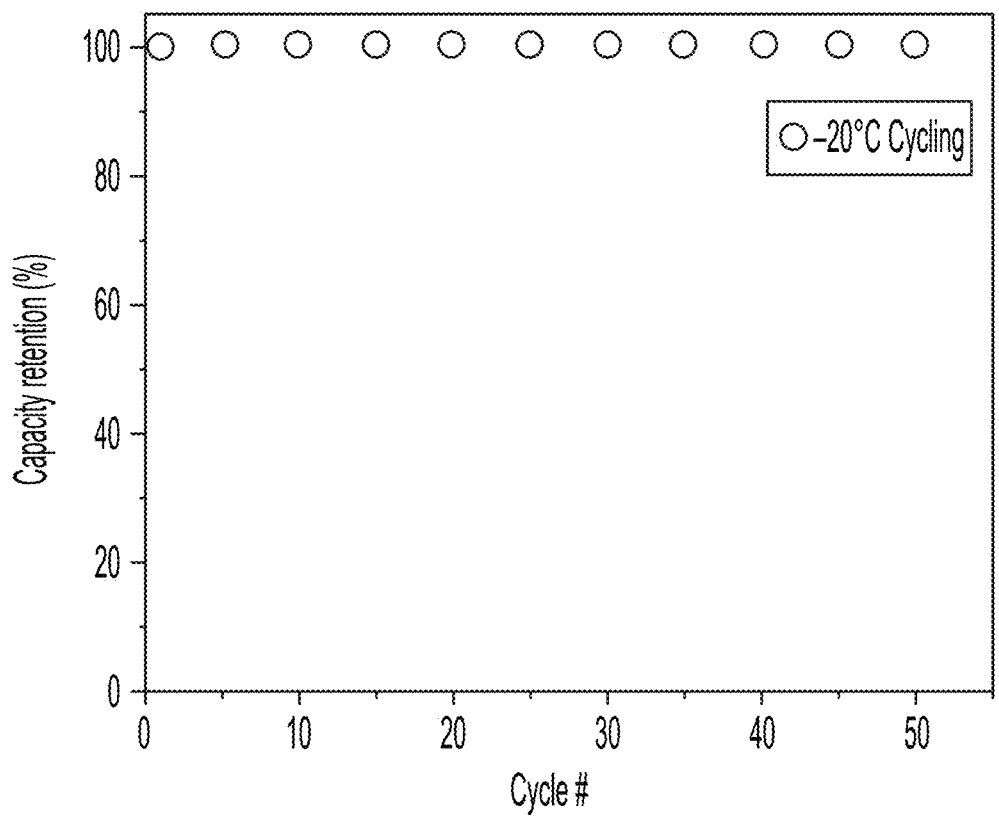
FIG. 12 illustrates a graph indicating the cycling stability of the disordered rocksalt $Li_3V_2O_5$ anode after more than 50 cycles at a temperature of −20° C., in accordance with the Examples herein.

FIG. 12 illustrates the cycling stability of the disordered rocksalt $Li_3V_2O_5$ anode material after 50 cycles at a low temperature of −20° C. The disordered rocksalt $Li_3V_2O_5$ was tested in a coin cell to evaluate its cycling performance at −20° C. As illustrated, the disordered rocksalt $Li_3V_2O_5$ was very stable at −20° C., with no capacity decay after 50 cycles.

Figure 13:
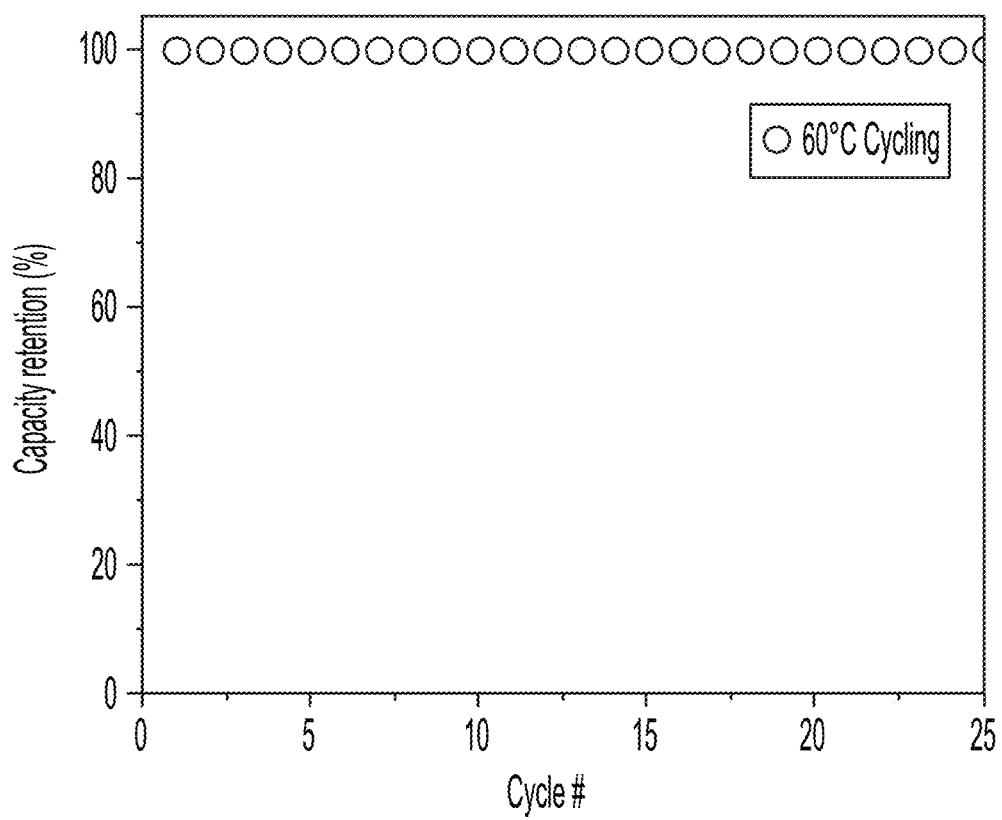
FIG. 13 illustrates a graph indicating the cycling stability of the $Li_3V_2O_5$ electrode after more than 25 cycles at a temperature of 60° C., in accordance with the Examples herein.

FIG. 13 illustrates the cycling stability of the disordered rocksalt $Li_3V_2O_5$ anode material after 25 cycles at a high temperature of 60° C. The disordered rocksalt $Li_3V_2O_5$ was tested in a coin cell to evaluate its cycling performance at 60° C. As illustrated, the disordered rocksalt $Li_3V_2O_5$ was very stable at 60° C., with no capacity decay after 25 cycles.

Figure 14:
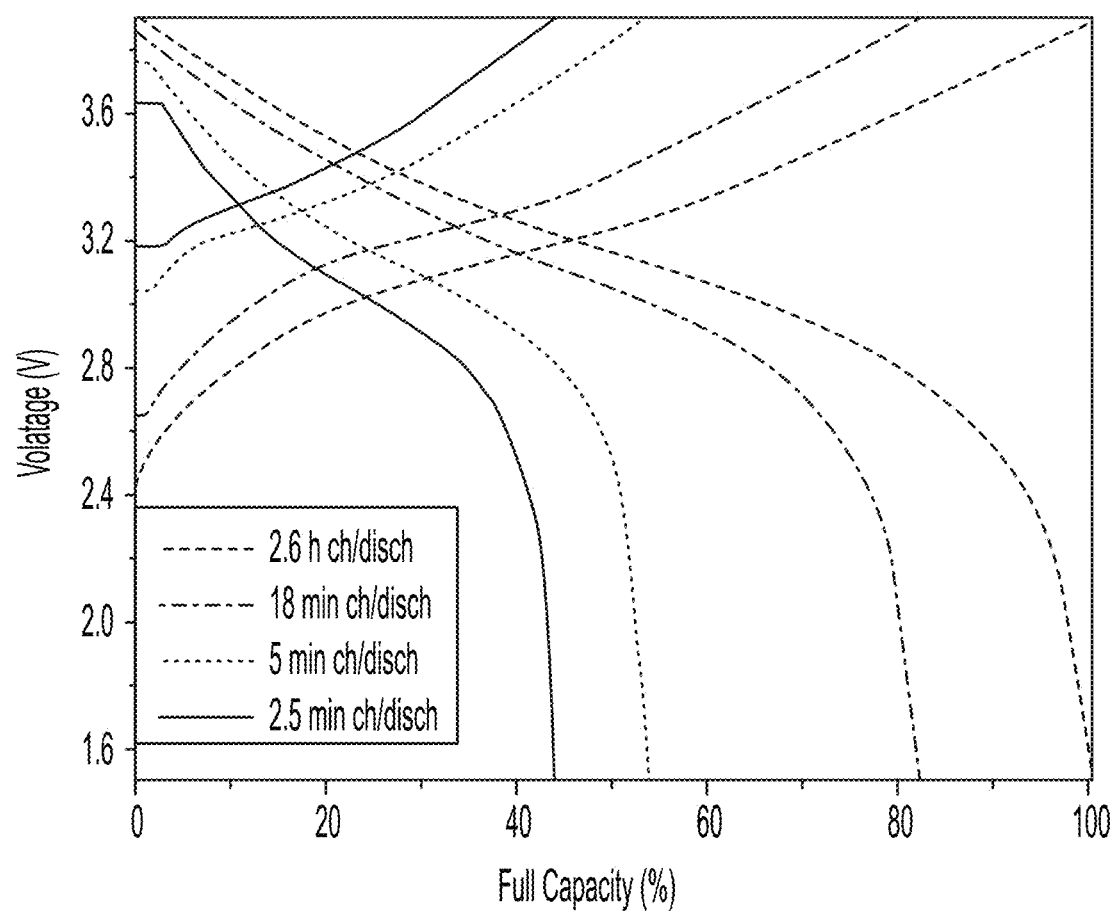
FIG. 14 illustrates a graph indicating the charge/discharge voltage profiles of disordered rocksalt $Li_3V_2O_5$||$LiNi_{0.8}Mn_{0.1}Co_{0.1}O_2$ full cell at different charge/discharge rates, showing fast charge capability, in accordance with the Examples herein.

The disordered rocksalt $Li_3V_2O_5$ was paired with a $LiNi_{0.8}Mn_{0.1}Co_{0.1}O_2$ cathode material to demonstrate the full cell performance. FIG. 14 illustrates the charge/discharge voltage profiles of the exemplary cell at different charge/discharge rates, showing fast charge capability. FIG.

Figure 15:
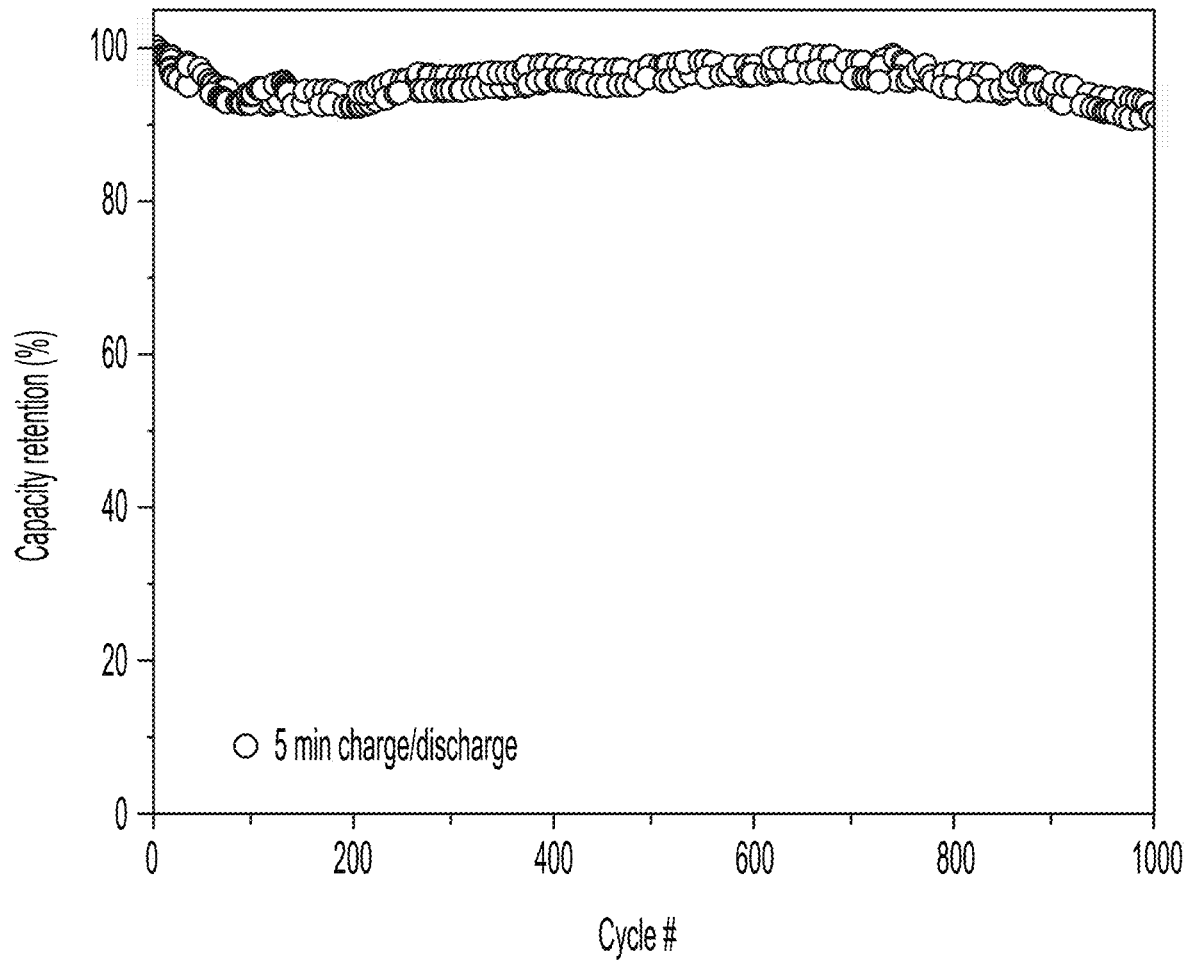
FIG. 15 illustrates a graph indicating the cycling performance of disordered rocksalt $Li_3V_2O_5$||$LiNi_{0.8}Mn_{0.1}Co_{0.1}O_2$ full cell when cycled at a 5-minute charge/discharge rate, showing long-term stability, in accordance with the Examples herein.

15 illustrates the cycling performance of the cell when cycled at a 5-minute charge/discharge rate, showing long-term stability. In particular, the battery delivered 45% of the capacity with a short charging period of 2.5 minutes, demonstrating its fast-charge capability. The battery also showed good cycling stability, maintaining a high capacity retention of about 92% for 1000 cycles at 5-minute charge/discharge rate. The cell performance data in FIGS. 14 and 15 demonstrate fast charge capability and long-term stability for the disordered rocksalt $Li_3V_2O_5$‖$LiNi_{0.8}Mn_{0.1}Co_{0.1}O_2$ cell.

Figure 16:
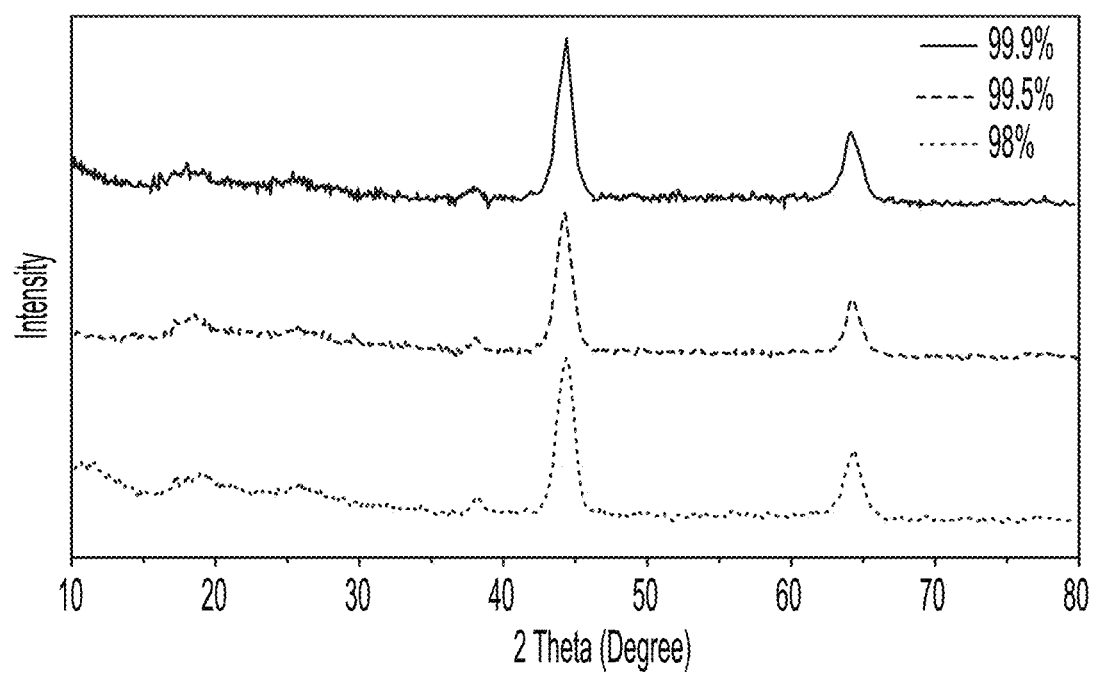
FIG. 16 illustrates a XRD graph of disordered rocksalt $Li_3V_2O_5$ prepared from $V_2O_5$ with different purities, in accordance with the Examples herein.

FIG. 16 illustrates a XRD graph of disordered rocksalt $Li_3V_2O_5$ prepared from $V_2O_5$ with different purities of 99.9 wt %, 99.5 wt %, and 98 wt % $V_2O_5$. As shown in FIG. 16, disordered rocksalt $Li_3V_2O_5$ powders synthesized from $V_2O_5$ powders with different starting $V_2O_5$ purities have all shown a pure disordered rocksalt phase for the $Li_3V_2O_5$ anode material.

Figure 17:
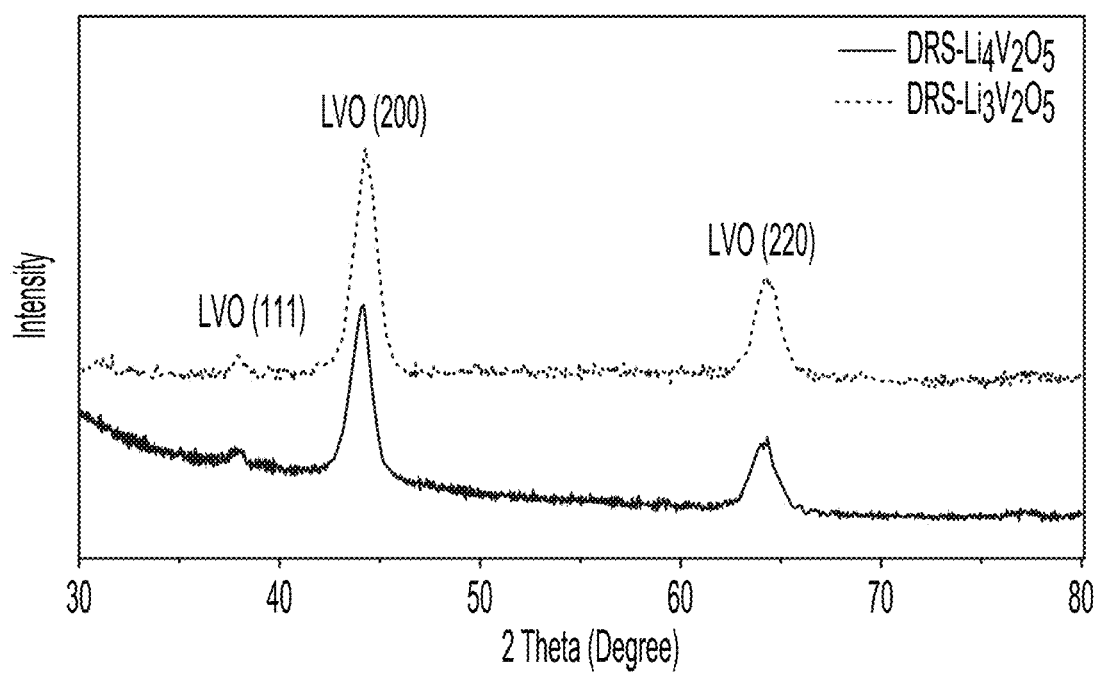
FIG. 17 illustrates a XRD graph of disordered rocksalt $Li_3V_2O_5$ and disordered rocksalt $Li_4V_2O_5$ synthesized via wet chemical reactions, in accordance with the Examples herein.

The concentration of Li in the disordered rocksalt $Li_aV_bO_c$ anode material can be controlled by adjusting the ratio of lithiation agent to $V_2O_5$. For example, successful synthesis of $Li_4V_2O_5$ with a pure disordered rocksalt structure has been demonstrated in FIG. 17. FIG. 17 illustrates a XRD graph of disordered rocksalt $Li_3V_2O_5$ as well as disordered rocksalt $Li_4V_2O_5$ synthesized via wet chemical reactions. The (200) peak of the disordered rocksalt $Li_4V_2O_5$ slightly on to left of the (200) peak for the disordered rocksalt $Li_3V_2O_5$ is evidence of the higher Li content in the disordered rocksalt $Li_4V_2O_5$, which contains 4 moles of lithium versus $Li_3V_2O_5$ which contains 3 moles of lithium.

Figure 18:
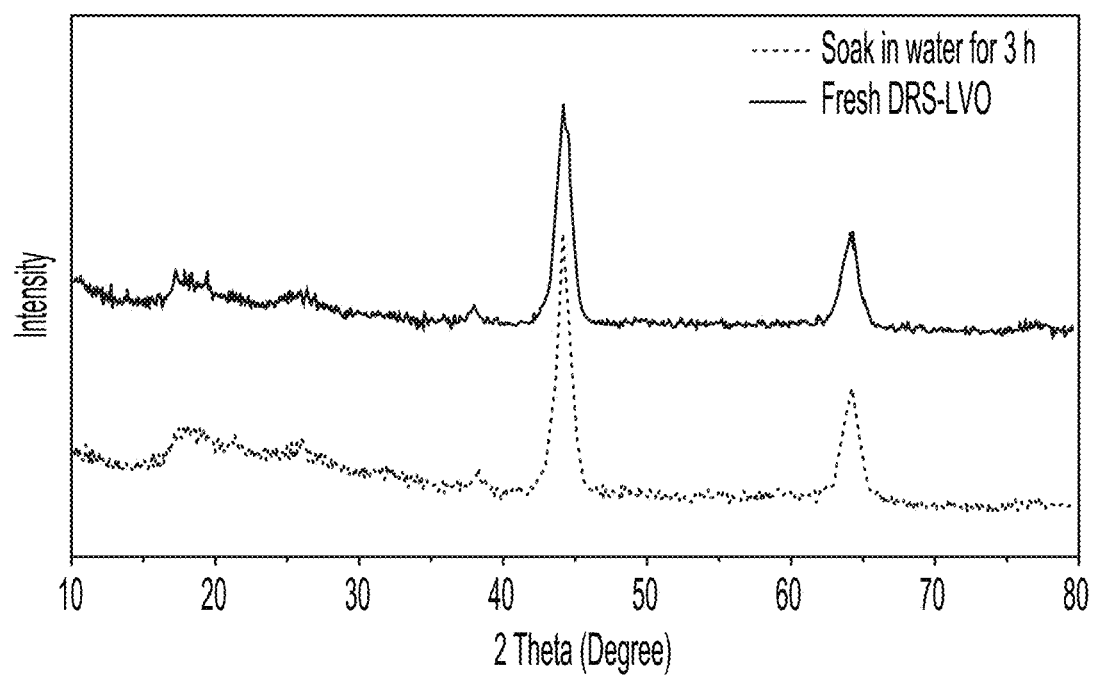
FIG. 18 illustrates a XRD graph showing water stability of the disordered rocksalt $Li_3V_2O_5$, in accordance with the Examples herein.

To assess the compatibility of the disordered rocksalt lithium vanadium oxide with aqueous-based electrode slurry processing, the disordered rocksalt lithium vanadium oxide was soaked in the water for 3 hours. FIG. 18 is a XRD graph illustrating the water stability of the disordered rocksalt $Li_3V_2O_5$. The XRD data of the soaked disordered rocksalt lithium vanadium oxide in FIG. 18 shows a pure disordered rocksalt phase with no impurity. This result shows that the disordered rocksalt lithium vanadium oxide is chemically stable in water.

Figure 19:
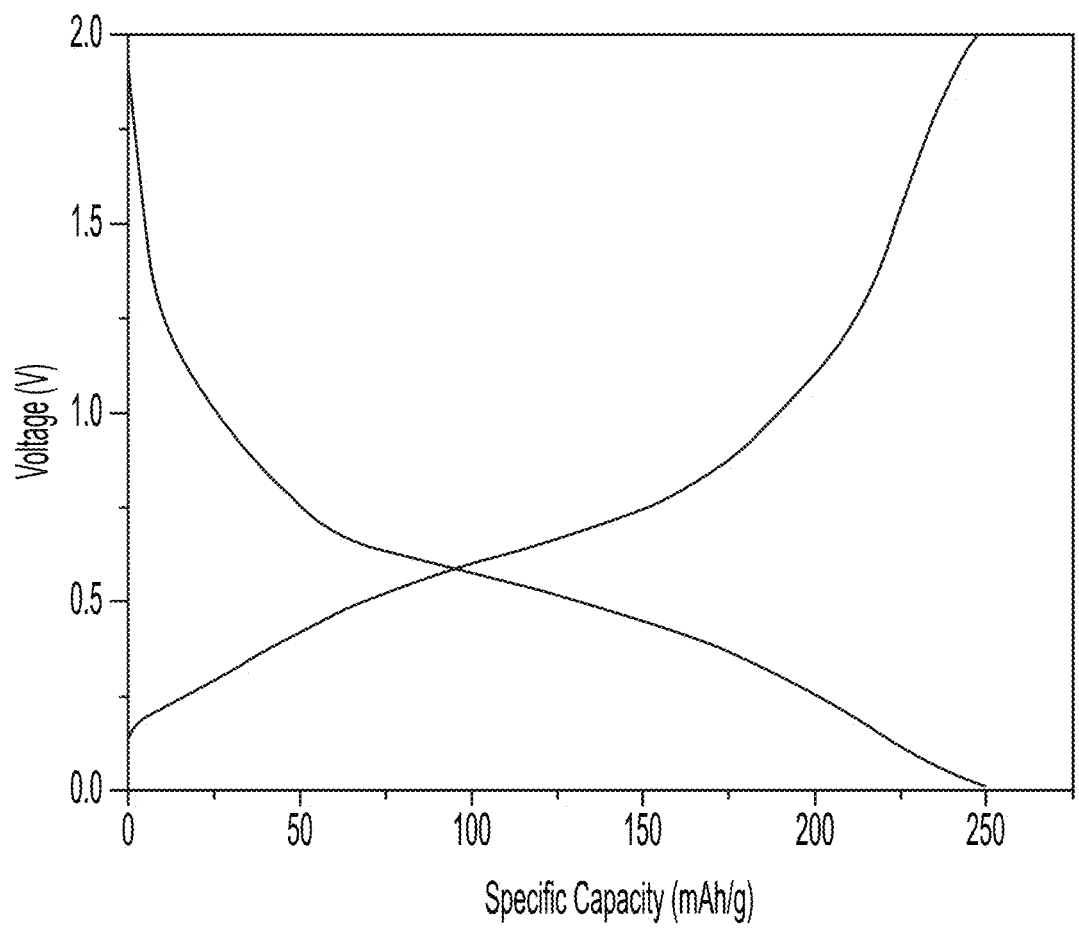
FIG. 19 illustrates the voltage profiles of the disordered rocksalt $Li_3V_2O_5$ at C/2 rate, in accordance with the Examples herein.
Figure 20:
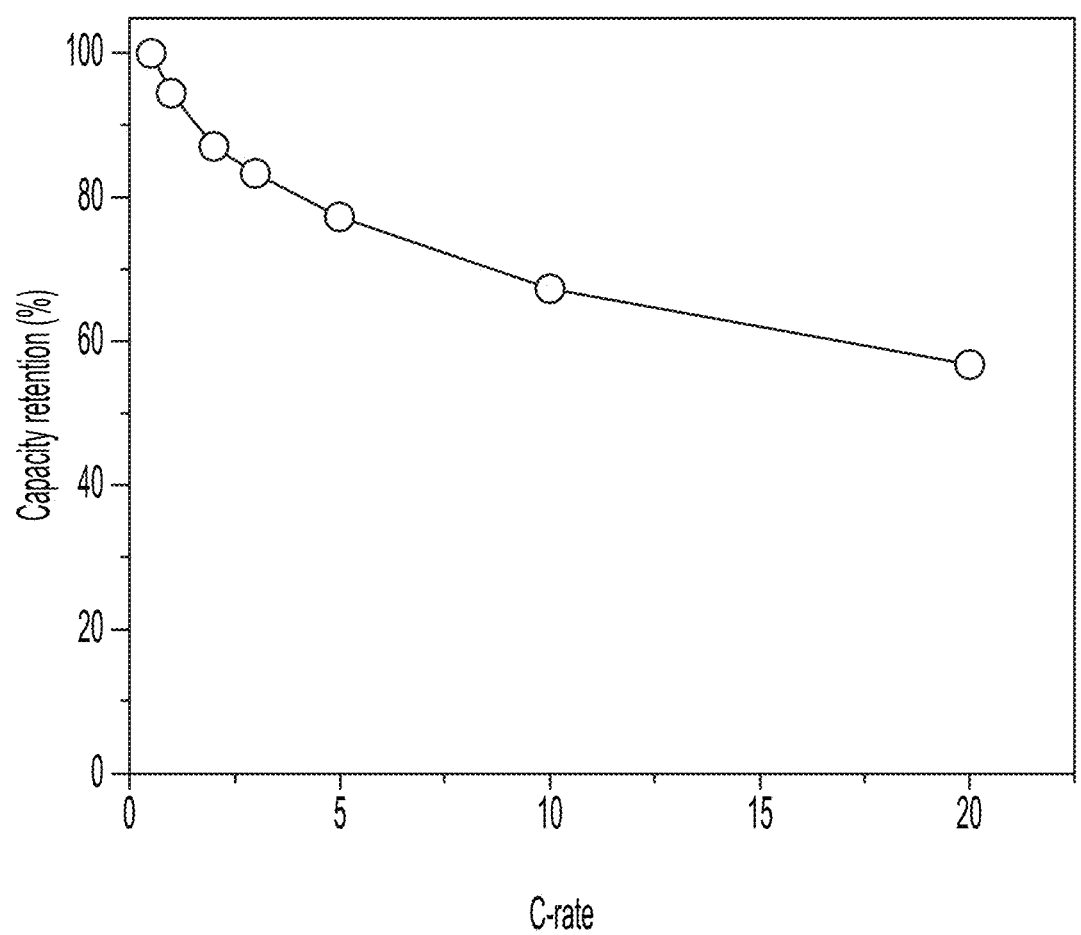
FIG. 20 illustrates the capacity retention of disordered rocksalt $Li_3V_2O_5$ under different charge/discharge current rates, in accordance with the Examples herein.

The disordered rocksalt $Li_3V_2O_5$ anode material was assembled into a coin cell with Li metal counter electrode. FIG. 19 illustrates the charge/discharge voltage profiles of the disordered rocksalt $Li_3V_2O_5$ at C/2 rate (100 mA/g current density) between 0.01 V and 2 V. The reversible capacity was 249 mA·h/g. The average working potential was around 0.58 V. The coin cell also displayed excellent rate performance. FIG. 20 illustrates the capacity retention of disordered rocksalt $Li_3V_2O_5$ under different charge/discharge current rates. As shown in FIG. 20, at a high C-rate of 20 C—which is a 3-minute charge—the disordered rocksalt $Li_3V_2O_5$ exhibited 57% of its capacity at a 0.5 C rate.

Figure 21:
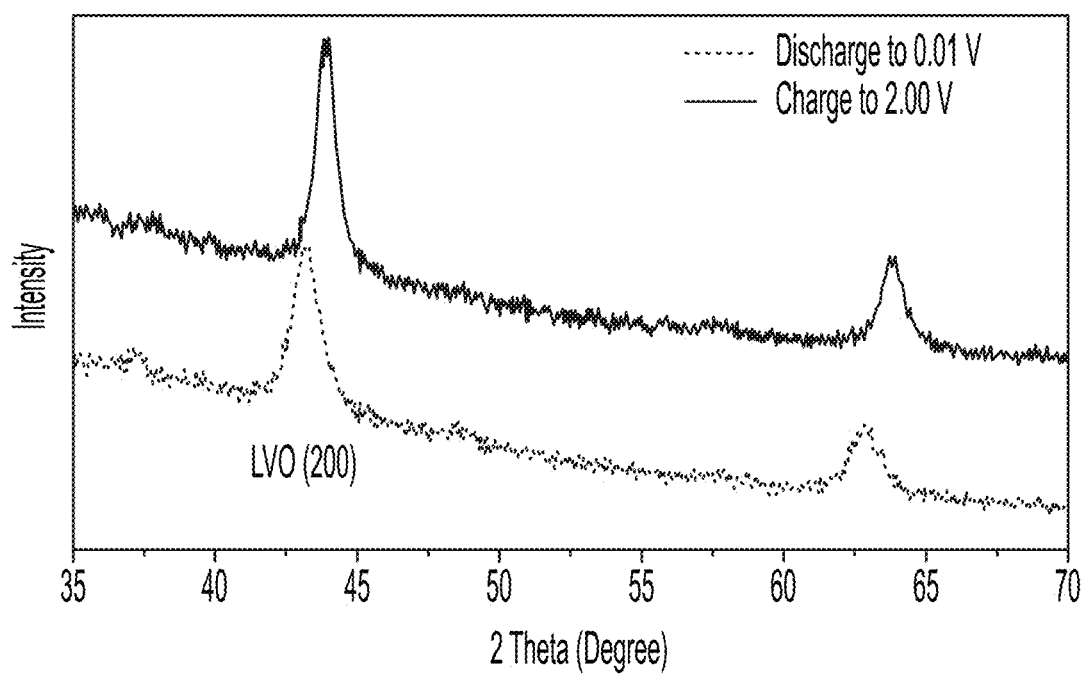
FIG. 21 illustrates a XRD graph of the disordered rocksalt $Li_3V_2O_5$ at charged and discharged states, in accordance with the Examples herein.

FIG. 21 illustrates a XRD graph of the disordered rocksalt $Li_3V_2O_5$ at charged and discharged states. The Li‖disordered rocksalt $Li_3V_2O_5$ batteries were cycled between 0.01 V and 2 V. The cells were stopped at 0.01 V and 2 V, which correspond to the discharged and charged states, respectively. The materials are collected from the disassembled batteries. The XRD pattern in FIG. 21 clearly present that the discharged and charged lithium vanadium oxides have a pure disordered rocksalt structure. The slight shift of the (200) peak of the lithium vanadium oxide suggest a small volume change of the disordered rocksalt $Li_3V_2O_5$ during charge and discharge.

Figure 22:
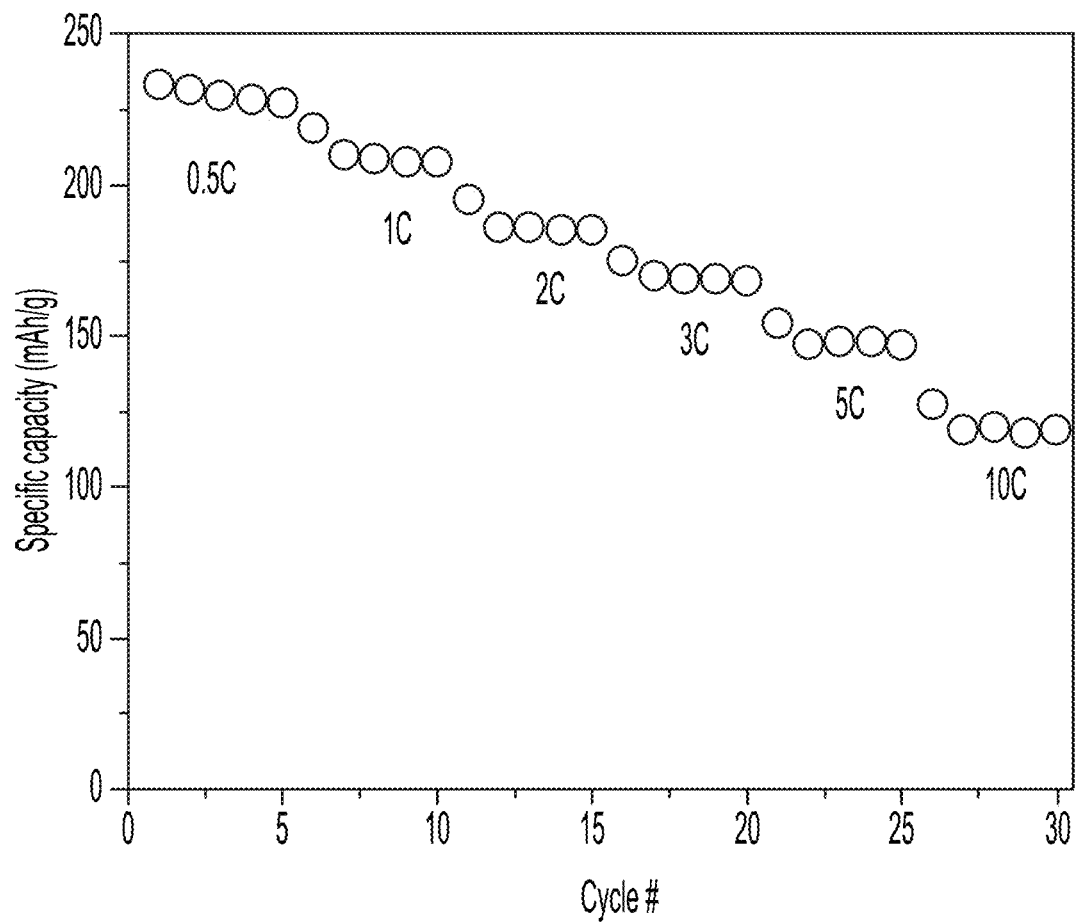
FIG. 22 illustrates the capacity retention of disordered rocksalt $Li_3V_2O_5$ using a CMC binder under different charge/discharge current rates, in accordance with the Examples herein.
Figure 23:
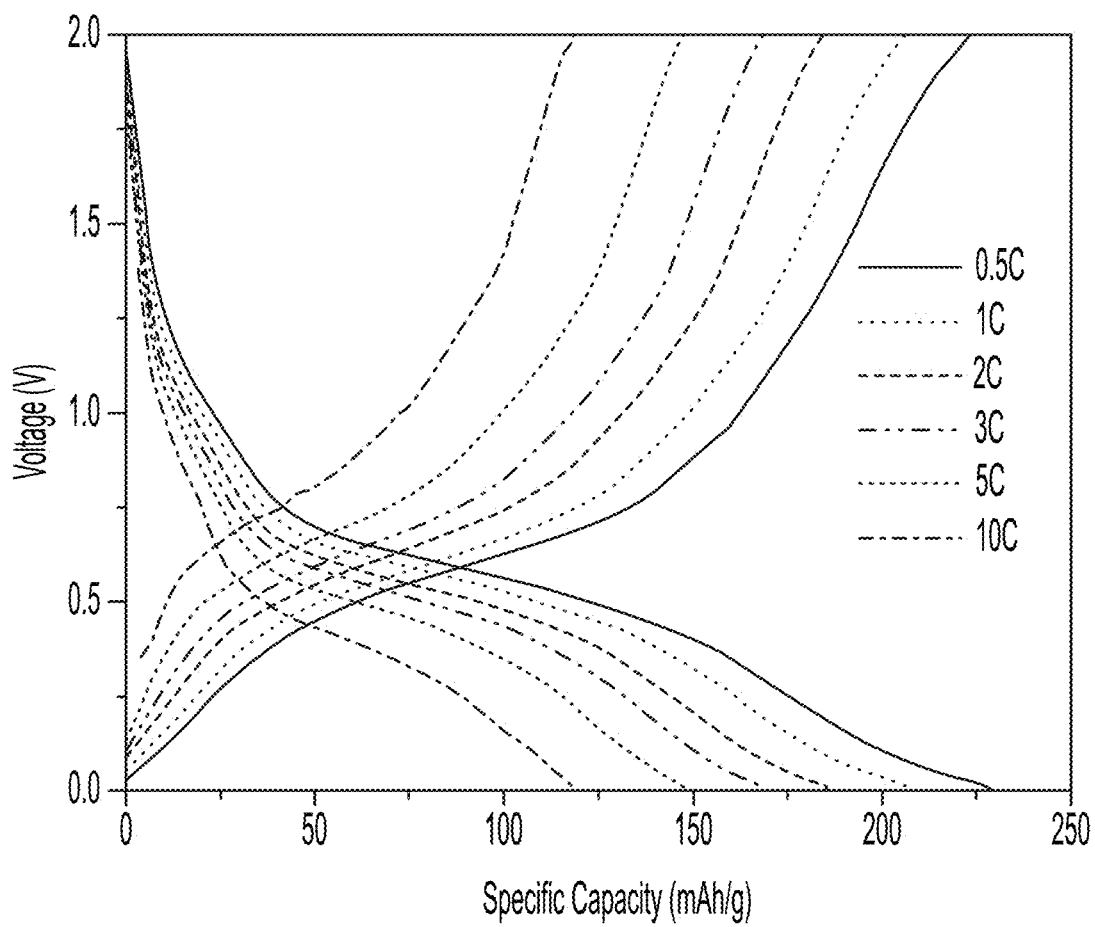
FIG. 23 illustrates the voltage profiles of the disordered rocksalt $Li_3V_2O_5$ under different charge/discharge current rates, in accordance with the Examples herein.

The disordered rocksalt $Li_3V_2O_5$ powders and conductive carbon were mixed with carboxymethyl cellulose (CMC)—water solution to form a slurry. The slurry was cast on Cu foil followed by drying to remove the water. The dried electrode was calendared to form an anode sheet. The disordered rocksalt $Li_3V_2O_5$ anode was assembled into a coin cell with Li metal counter electrode. FIG. 22 illustrates the capacity retention of the disordered rocksalt $Li_3V_2O_5$ using a CMC binder under different charge/discharge current rates. The specific capacity of the disordered rocksalt $Li_3V_2O_5$ was 233 mA·h/g at C/2, and even at a 10 C charge/discharge rate, the specific capacity was 119 mA·h/g, over 50% the specific capacity at C/2 rate. FIG. 23 illustrates the voltage profiles of the disordered rocksalt $Li_3V_2O_5$ under different charge/discharge current rates of C/2, 1C, 2 C, 3 C, 5 C, and 10 C.

Figure 24:
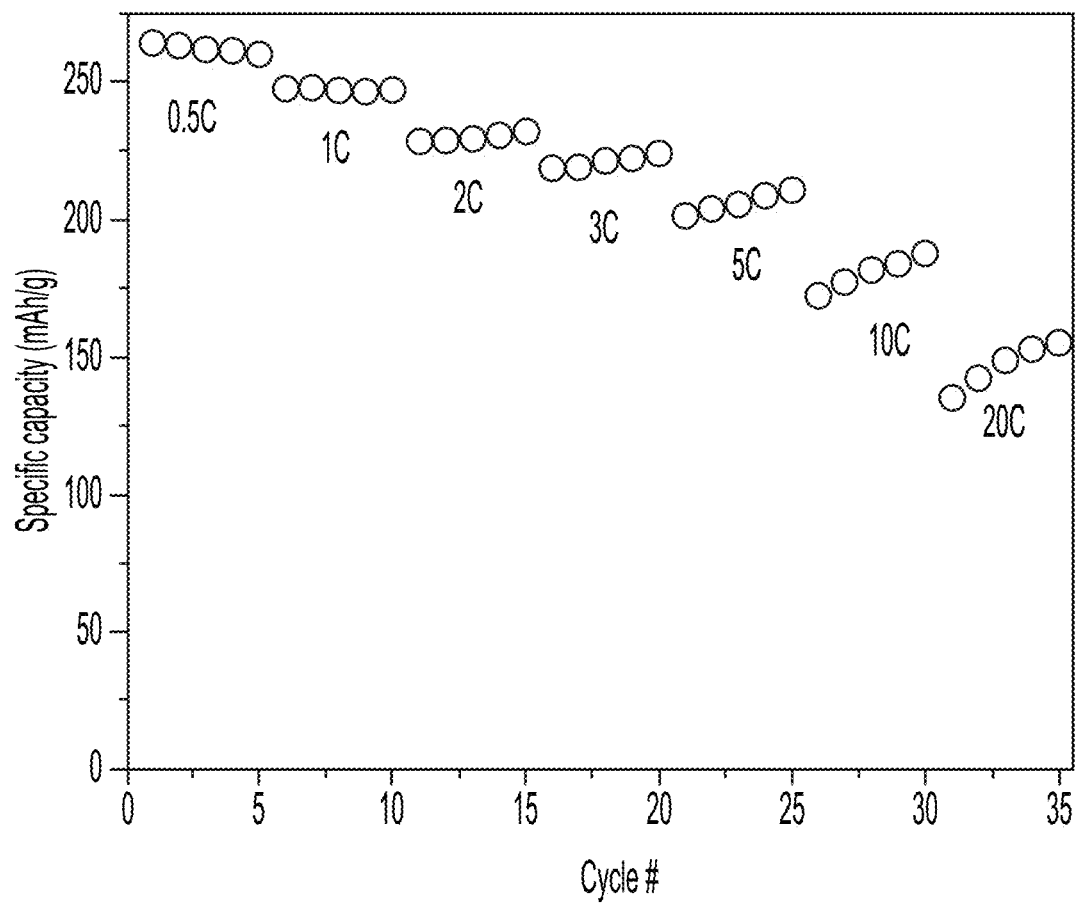
FIG. 24 illustrates the performance of disordered rocksalt $Li_3V_2O_5$ in carbonate electrolytes, and the capacity retention of the disordered rocksalt $Li_3V_2O_5$ under different charge/discharge current rates, in accordance with the Examples herein.
Figure 25:
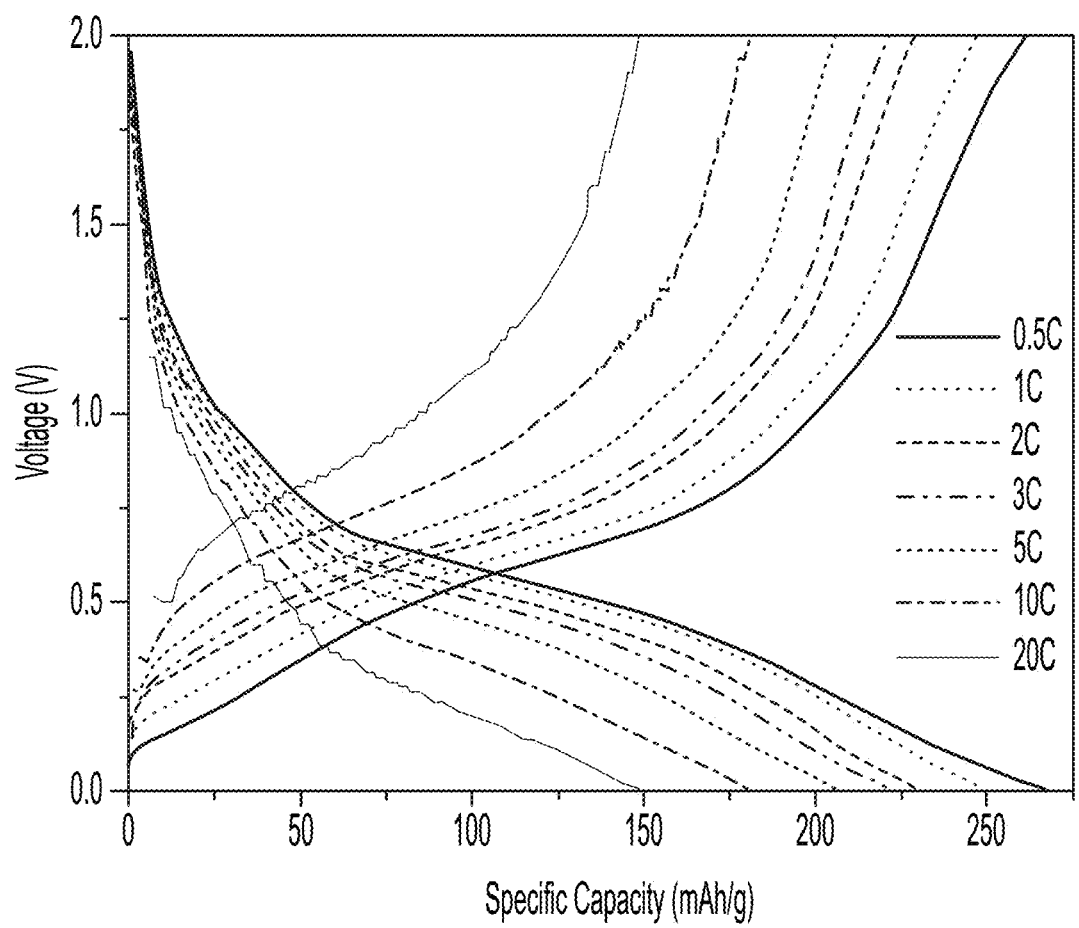
FIG. 25 illustrates the voltage profiles of the disordered rocksalt $Li_3V_2O_5$ under different charge/discharge current rates, in accordance with the Examples herein.

The disordered rocksalt $Li_3V_2O_5$ anode material was assembled into a coin cell with Li metal counter electrode. The electrolyte was 1 M $LiPF_6$ in ethylene carbonate:ethyl methyl carbonate:dimethyl carbonate with weight ratio 3:5:2. FIG. 24 shows the rate capability of the disordered rocksalt $Li_3V_2O_5$ anode material in carbonate electrolytes, and the capacity retention of the disordered rocksalt $Li_3V_2O_5$ under different charge/discharge current rates. According to FIG. 24, the disordered rocksalt $Li_3V_2O_5$ anode material demonstrated a specific capacity of 260 mA·h/g, 247 mA·h/g, 232 mA·h/g, 224 mA·h/g, 210 mA·h/g, 188 mA·h/g, and 155 mA·h/g, at C/2, 1C, 2 C, 3 C, 5 C, 10 C, and 20 C charge/discharge rate, respectively. FIG. 25 illustrates the voltage profiles of the disordered rocksalt $Li_3V_2O_5$ under different charge/discharge current rates (C/2, 1C, 2 C, 3 C, 5 C, 10 C, and 20 C). The average working potential was around 0.58 V.

Figure 26:
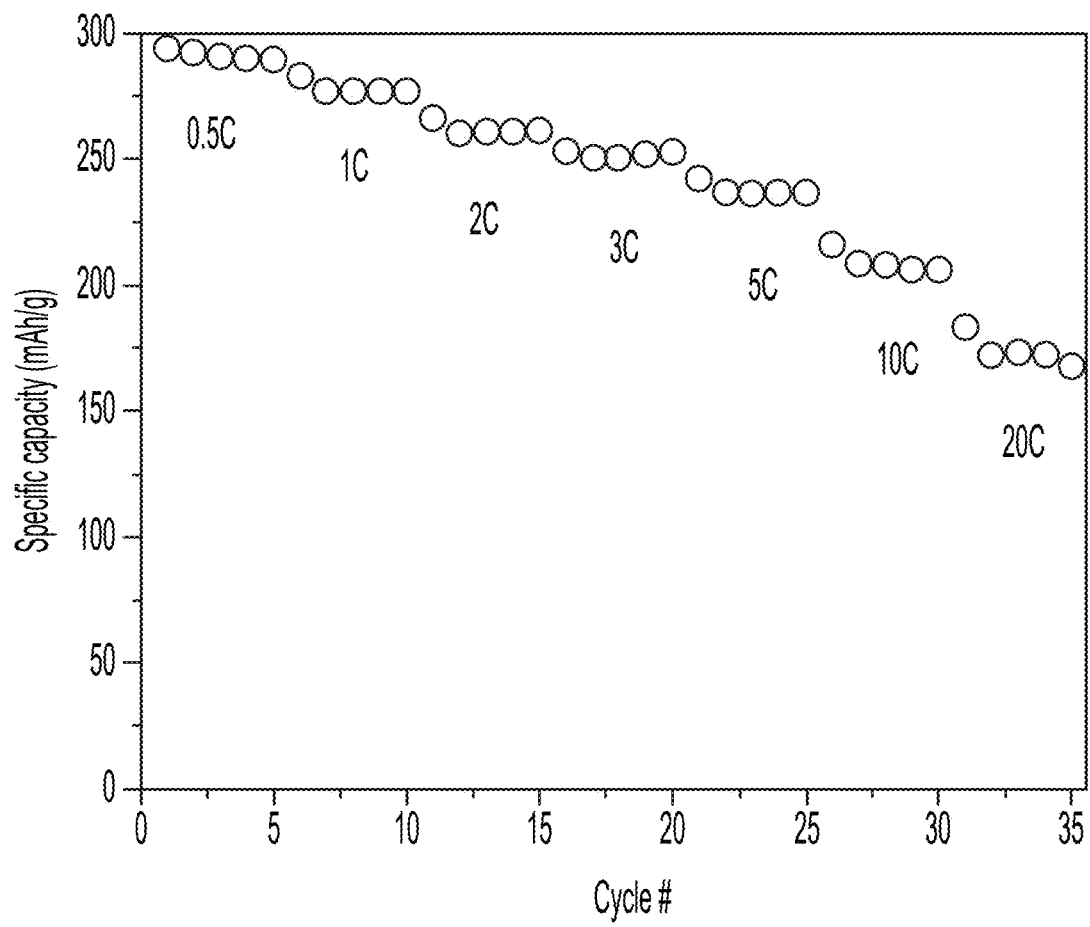
FIG. 26 illustrates the performance of disordered rocksalt $Li_3V_2O_5$ in ester-based electrolytes, and the capacity retention of the disordered rocksalt $Li_3V_2O_5$ under different charge/discharge current rates, in accordance with the Examples herein.
Figure 27:
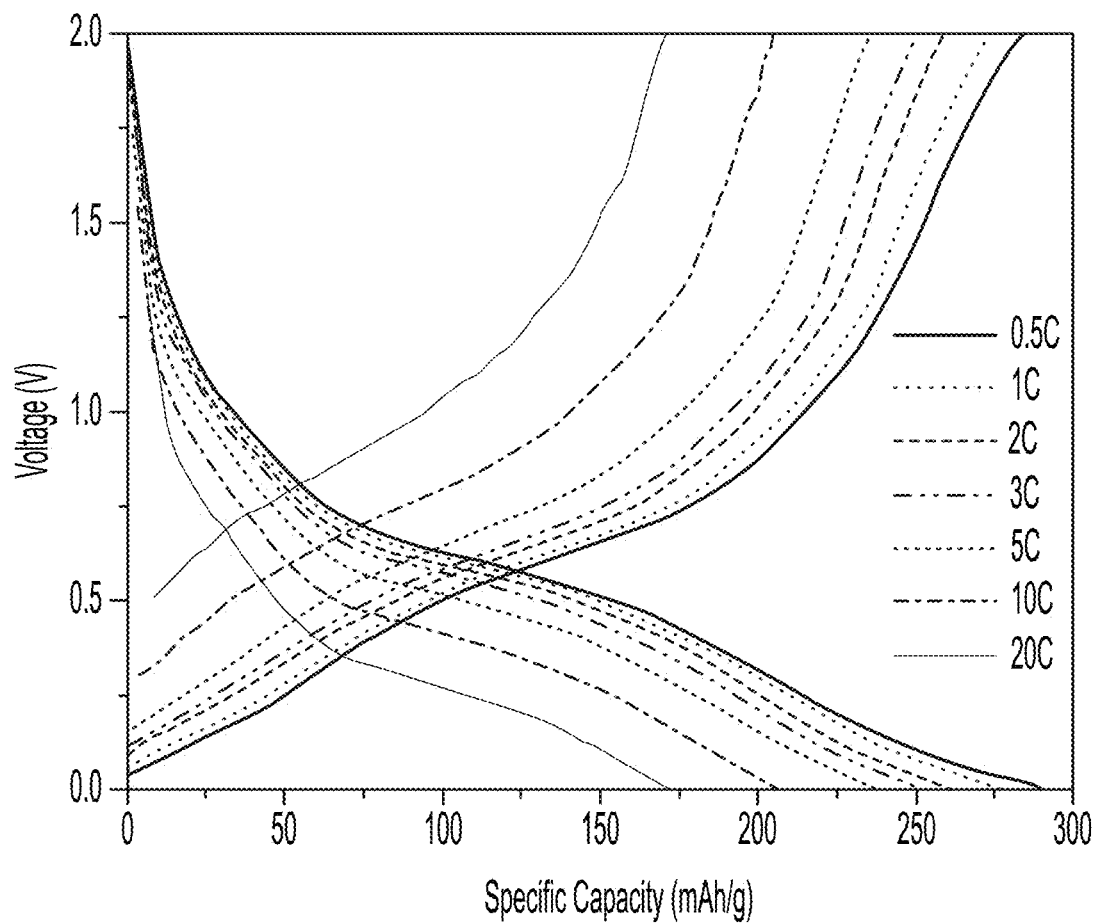
FIG. 27 illustrates the voltage profiles of the disordered rocksalt $Li_3V_2O_5$ under different charge/discharge current rates, in accordance with the Examples herein.
Figure 28:
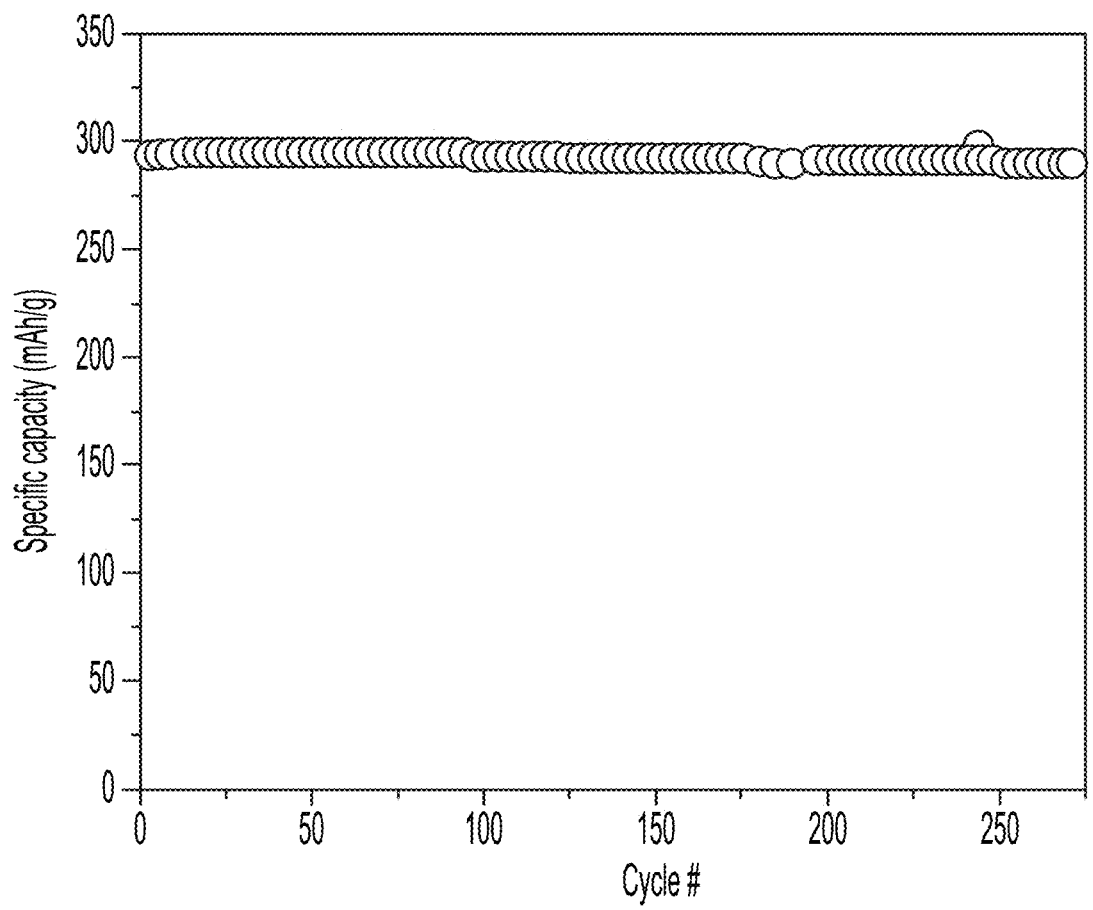
FIG. 28 illustrates the long-term cycling performance of the disordered rocksalt $Li_3V_2O_5$ at a rate of C/2, in accordance with the Examples herein.

The disordered rocksalt $Li_3V_2O_5$ anode material was assembled into a coin cell with Li metal counter electrode. The electrolyte was 1 M $LiPF_6$ in methyl propionate:fluoroethylene carbonate with volume ratio of 9:1. FIG. 26 illustrates the performance of the disordered rocksalt $Li_3V_2O_5$ in ester-based electrolytes, and the capacity retention of the disordered rocksalt $Li_3V_2O_5$ under different charge/discharge current rates. FIG. 26 shows the rate capability and specific capacity of 290 mA·h/g, 278 mA·h/g, 261 mA·h/g, 253 mA·h/g, 236 mA·h/g, 206 mA·h/g, and 172 mA·h/g, at C/2, 1C, 2 C, 3 C, 5 C, 10 C, and 20 C charge/discharge rate, respectively. FIG. 27 illustrates the voltage profiles of the disordered rocksalt $Li_3V_2O_5$ under different charge/discharge current rates. The average working potential was around 0.58 V. FIG. 28 illustrates the long-term cycling performance of the disordered rocksalt $Li_3V_2O_5$. According to FIG. 28, the disordered rocksalt $Li_3V_2O_5$ had a negligible capacity change after 274 cycles at a rate of C/2.

Figure 29:
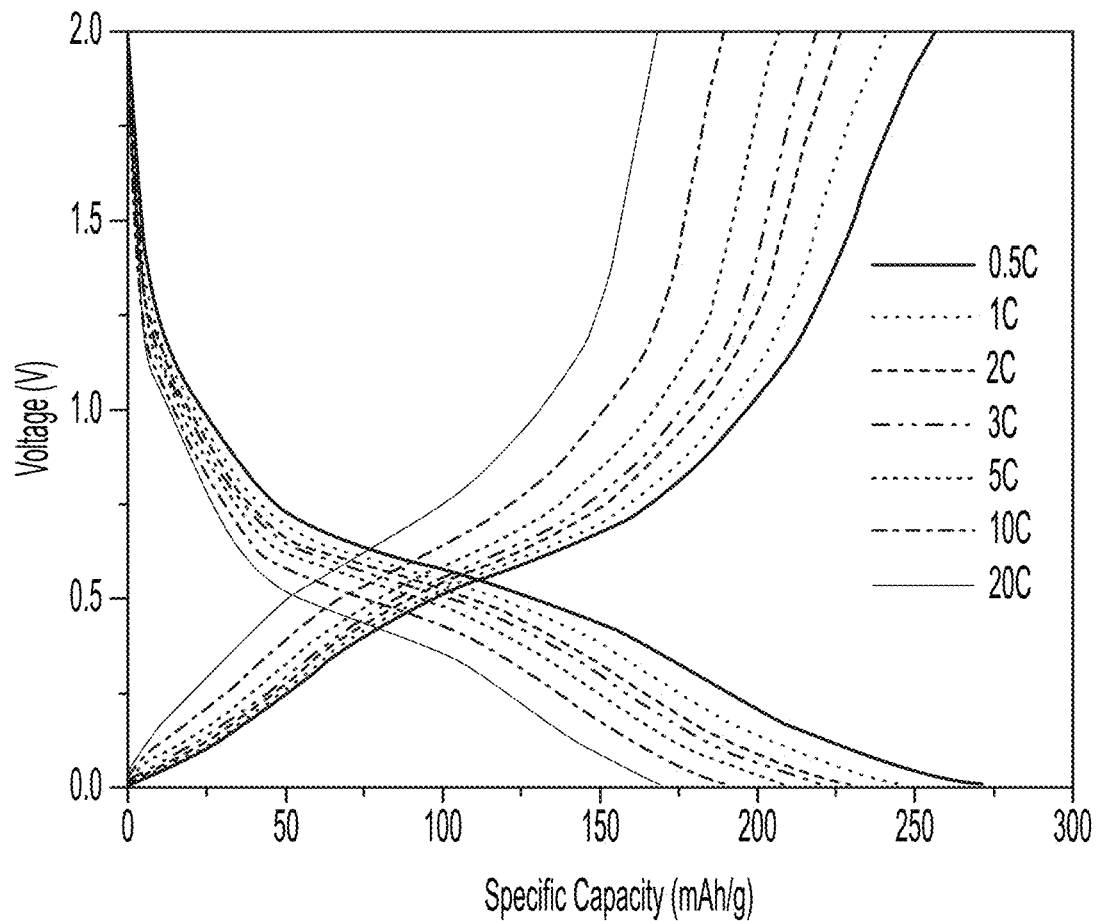
FIG. 29 illustrates the performance of disordered rocksalt $Li_3V_2O_5$ in ether-based electrolyte with localized high concentration, showing the voltage profiles of the disordered rocksalt $Li_3V_2O_5$ under different charge/discharge current rates, in accordance with the Examples herein.
Figure 30:
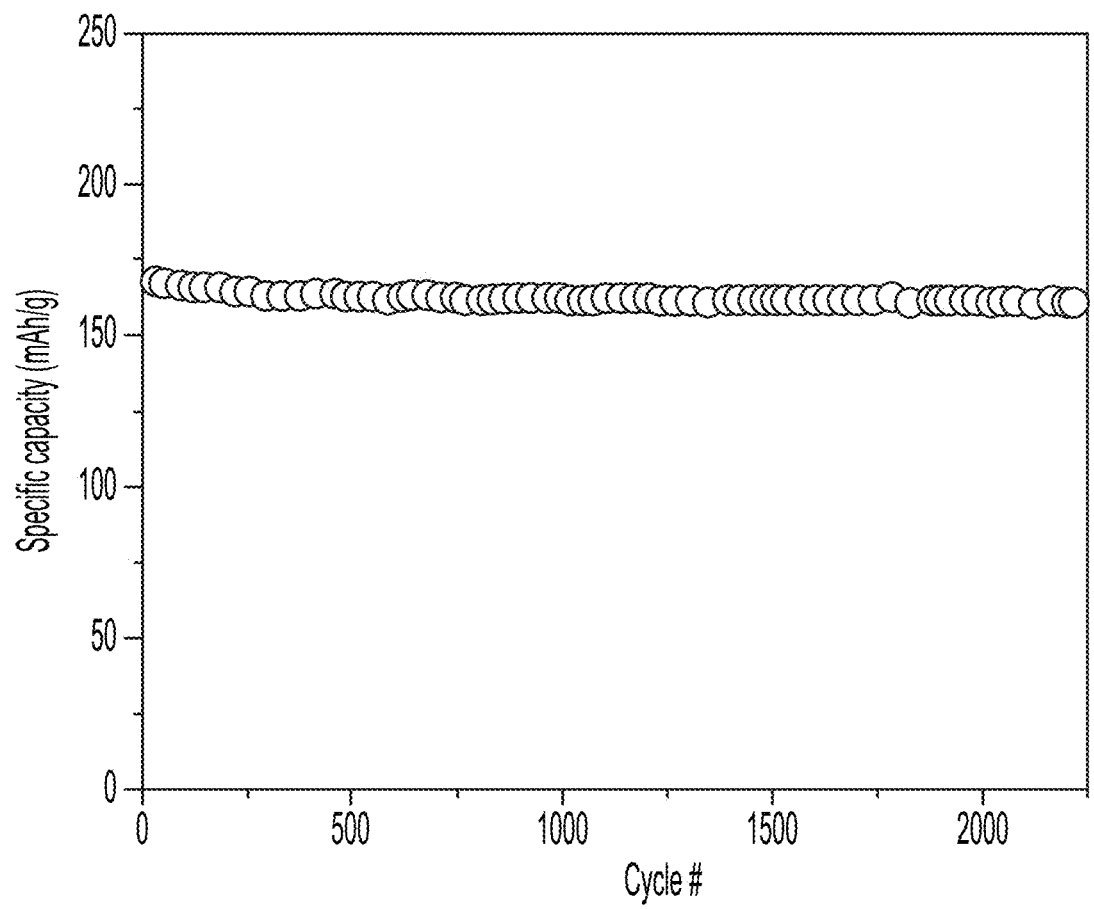
FIG. 30 illustrates the long-term cycling performance of the disordered rocksalt $Li_3V_2O_5$ at a rate of 20 C, in accordance with the Examples herein.

The disordered rocksalt $Li_3V_2O_5$ anode material was assembled into a coin cell with Li metal counter electrode. The electrolyte was 2 M LiFSI in 1,2-dimethoxyethane:bis(2,2,2-trifluoroethyl)ether with weight ratio of 1:4. FIG. 29 illustrates the performance of the disordered rocksalt $Li_3V_2O_5$ in an ether-based electrolyte, showing the voltage profiles of the disordered rocksalt $Li_3V_2O_5$ under different charge/discharge current rates. According to FIG. 29, the anode material demonstrated a specific capacity of 271 mA·h/g, 245 mA·h/g, 228 mA·h/g, 220 mA·h/g, 208 mA·h/g, 190 mA·h/g, and 168 mA·h/g, at C/2, 1C, 2 C, 3 C, 5 C, 10 C, and 20 C charge/discharge rate, respectively. The average working potential was around 0.56 V. FIG. 30 demonstrates the cycling stability of the disordered rocksalt $Li_3V_2O_5$. The disordered rocksalt $Li_3V_2O_5$ remarkably had a negligible capacity change after 2250 cycles at a high C-rate of 20 C.

Figure 31:
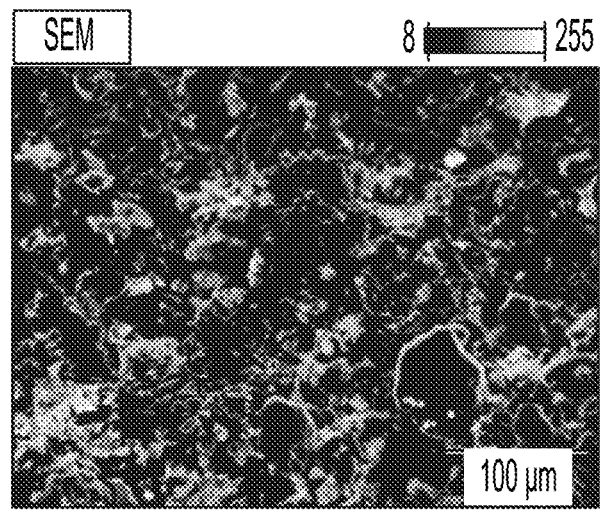
FIG. 31 illustrates the SEM and EDX analysis of the Li metal counter electrode from the cycled Li||disordered rocksalt $Li_3V_2O_5$ at a temperature of 60° C., in accordance with the Examples herein.
Figure 31:
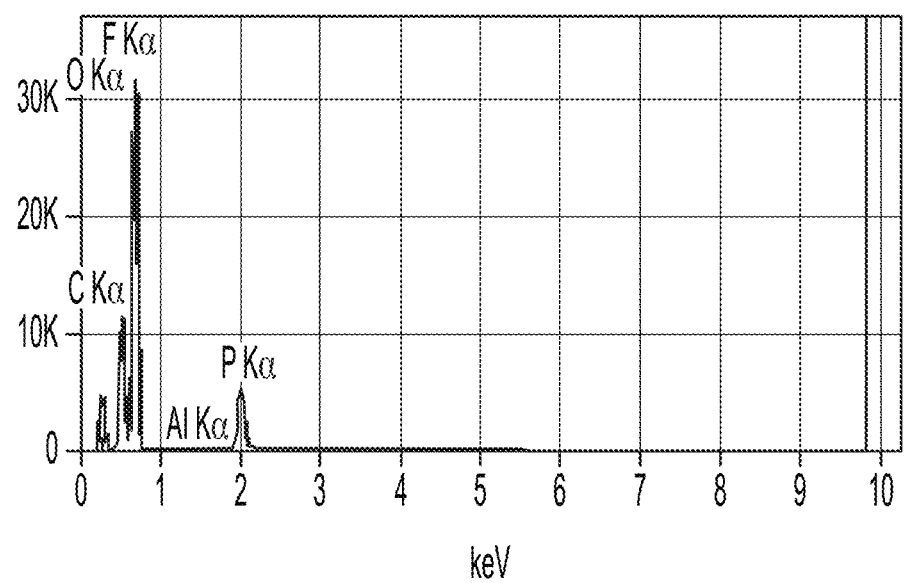
Figure 32:
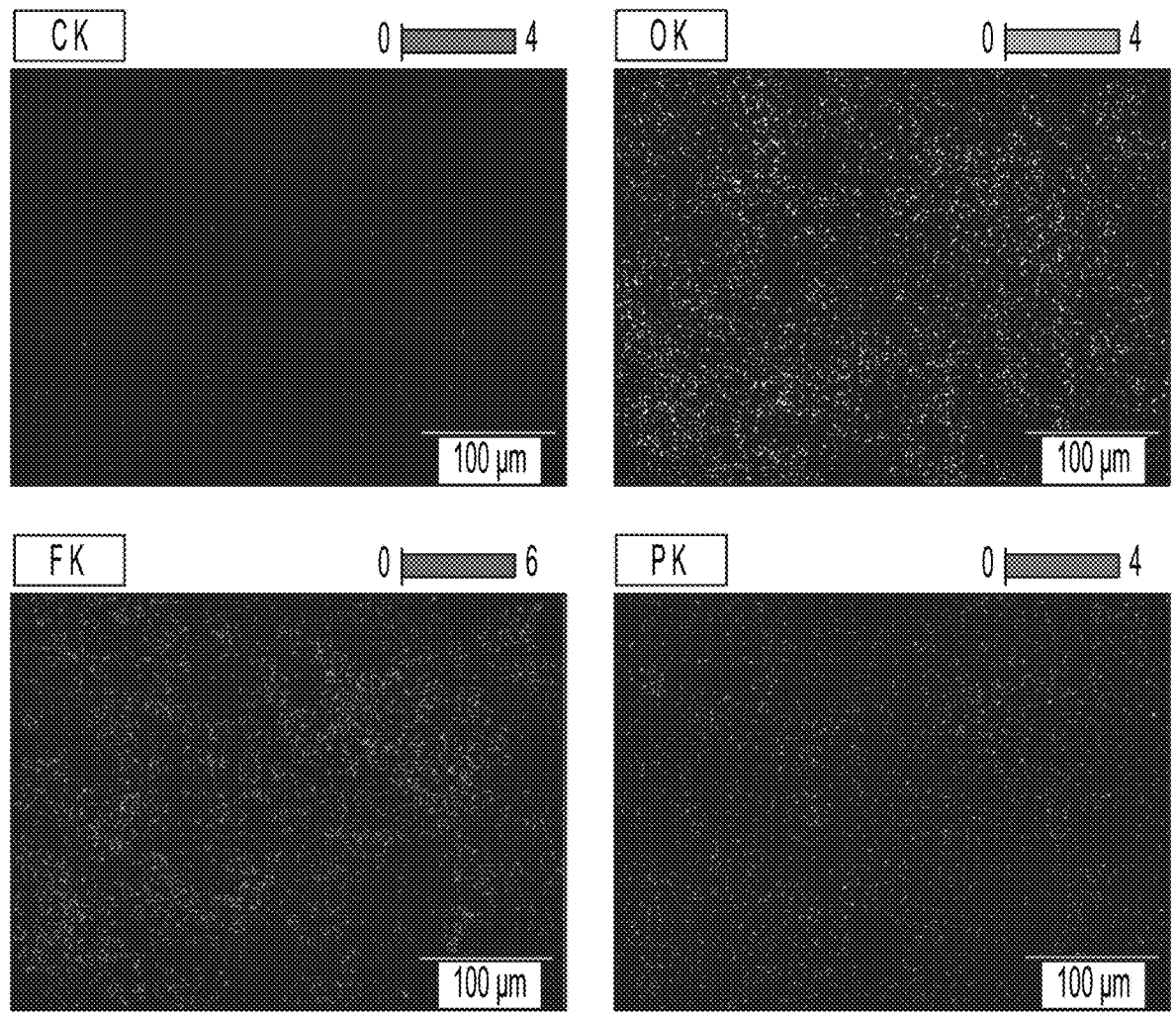
FIG. 32 illustrates EDX elemental analysis for C, O, F, and P of the Li metal counter electrode from the cycled Li||disordered rocksalt $Li_3V_2O_5$ at a temperature of 60° C., in accordance with the Examples herein.

A Li‖disordered rocksalt $Li_3V_2O_5$ battery was cycled at a temperature of 60° C. for 50 cycles. The electrolyte was 1 M $LiPF_6$ in ethylene carbonate:ethyl methyl carbonate:dimethyl carbonate with weight ratio 3:5:2. After 50 cycles, the cell was disassembled at room temperature to examine the stability of the disordered rocksalt $Li_3V_2O_5$ that had been operated at a high temperature (60° C.). The counter electrode Li was examined by scanning electron microscopy (SEM) and energy-dispersive X-ray spectroscopy (EDX). FIG. 31 illustrates the SEM and energy-dispersive X-ray spectroscopy (EDX) analysis of the Li metal counter electrode from the cycled Li‖disordered rocksalt $Li_3V_2O_5$ at a temperature of 60° C. FIG. 32 illustrates EDX elemental analysis for C, O, F, and P of the Li metal counter electrode from the cycled Li‖disordered rocksalt $Li_3V_2O_5$ at a temperature of 60° C. The EDX spectra and elemental mapping show C, O, P, F signals on Li metal due to electrolyte decomposition on Li metal to form a solid electrolyte interphase (SEI) layer. There is no vanadium (V) signal on the Li metal, suggesting that there was no V dissolution in the battery during high-temperature operation.

In this detailed description, reference has been made to multiple embodiments and to the accompanying drawings in which are shown by way of illustration specific exemplary embodiments of the technology. These embodiments are described in sufficient detail to enable those skilled in the art to practice the technology, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the technology. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein. This disclosure hereby incorporates by reference U.S. Patent App. Pub. No. 2021/0184210 A1, published on Jun. 17, 2021.

The embodiments, variations, and figures described above should provide an indication of the utility and versatility of the present technology. Other embodiments that do not provide all of the features and advantages set forth herein may also be utilized, without departing from the spirit and scope of the technology. Such modifications and variations are considered to be within the scope of the technology defined by the claims.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical, or physical partitioning and configurations can be implemented to implement the desired features of the technology disclosed herein. Additionally, with regard to flow diagrams, operational descriptions, and methods, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such features are presented as being a part of a described embodiment. Thus, the breadth and scope of the technology disclosed herein should not be limited by any of the above-described exemplary embodiments. As will become apparent to one of ordinary skill in the art after reading this patent application, the illustrated embodiments and their various alternatives can be implemented without confinement to the illustrated examples.

What is claimed is:

1. A method of synthesizing an anode material, said method comprising:
    (a) applying a reducing agent to a precursor material, wherein said reducing agent
    comprises lithium, and wherein said precursor material comprises vanadium oxide,
    lithium vanadium oxide, or a combination thereof, thereby generating a reduced material;
    (b) introducing a surface coating onto said reduced material, after step (a) and/or
    during step (a), wherein said surface coating contains a species selected from the group
    consisting of carbon, a metal oxide, a metalloid oxide, a metal fluoride, a metalloid
    fluoride, a metal phosphate, a metalloid phosphate, and combinations thereof; and
    (c) recovering an anode material comprising a plurality of anode-material
    particles, wherein said anode-material particles comprise an internal phase containing
    lithium vanadium oxide and said surface coating disposed on external surfaces of said
    internal phase, wherein said lithium vanadium oxide has a composition given by $Li_aV_bO_c$,
    wherein a=0.001-10, b=1-3, c=1-9, and a, b, and c are selected to charge-balance
    said $Li_aV_bO_c$, wherein said $Li_aV_bO_c$ is capable of being reversibly lithiated;
    wherein said method further comprises:
    dissolving said reduced material to form a sol-gel;
    mixing a precursor of said surface coating with said sol-gel to form a homogeneous mixture;
    drying said homogeneous mixture, thereby forming a dried powder;
    calcining said dried powder in air, wherein said precursor of said surface coating is converted into said surface coating; and
    recovering said anode-material particles.

2. The method of claim 1, wherein 10 wt % to 100 wt % of said $Li_aV_bO_c$ has a disordered rocksalt structure in the Fm$\bar{3}$m space group.

3. The method of claim 1, wherein said precursor material comprises $V_2O_5$, $Li_{0.001}V_2O_5$, $LiV_2O_5$, $Li_2V_2O_5$, $Li_3V_2O_5$, $Li_4V_2O_5$, $Li_5V_2O_5$, or a combination thereof.

4. The method of claim 1, wherein said reducing agent is selected from the group consisting of butyl lithium ($LiC_4H_9$), lithium naphthalene ($LiC_{10}H_8$), lithium anthracenide ($LiC_{14}H_9$), and combinations thereof.

5. The method of claim 4, wherein said reducing agent is lithium naphthalene prepared by dissolving said lithium into a solution containing naphthalene and a solvent, wherein said solvent is selected from the group consisting of tetrahydrofuran, 1,2-dimethoxyethane, dimethyl carbonate, and combinations thereof.

6. The method of claim 1, wherein said surface coating contains said carbon in sp form, $sp^2$ form, and/or $sp^3$ form, and optionally wherein said carbon is in the form of graphene, graphite, carbon nanotubes, carbon fibers, ultrafine carbon, carbon black, nanodiamonds, hard carbon, soft carbon, or a combination thereof.

7. The method of claim 1, wherein said method further comprises incorporating said anode material into an anode.

8. The method of claim 7, wherein said method further comprises incorporating said anode into a cell.

9. The method of claim 8, wherein said method further comprises incorporating said cell into a module.

10. The method of claim 8, wherein said method further comprises incorporating said cell into a pack.

11. The method of claim 8, wherein said method further comprises incorporating said cell into a device.

12. The method of claim 8, wherein said method further comprises incorporating said cell into an electric vehicle.

13. The method of claim 8, wherein said method further comprises repeatedly charging and discharging said cell over multiple charge-discharge cycles.

14. The method of claim 13, wherein said multiple charge-discharge cycles is at least 1,000 charge-discharge cycles.

15. The method of claim 13, wherein said multiple charge-discharge cycles is at least 2,000 charge-discharge cycles.

16. The method of claim 13, wherein said multiple charge-discharge cycles is at least 5,000 charge-discharge cycles.

17. The method of claim 13, wherein said multiple charge-discharge cycles is at least 10,000 charge-discharge cycles.

* * * * *